(12) United States Patent
Hattori et al.

(10) Patent No.: US 7,641,973 B2
(45) Date of Patent: *Jan. 5, 2010

(54) CONDUCTIVE MEMBER FOR IMAGE-FORMING APPARATUS

(75) Inventors: Takayuki Hattori, Ilyogo (JP); Kenichi Uesaka, Hyogo (JP); Jun Ochi, Hyogo (JP); Masakazu Tanaka, Hyogo (JP); Katsumi Terakawa, Hyogo (JP); Yogun Ki, Hyogo (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/720,281

(22) Filed: Nov. 25, 2003

(65) Prior Publication Data

US 2004/0105983 A1     Jun. 3, 2004

(30) Foreign Application Priority Data

Nov. 27, 2002   (JP)   ............................. 2002-344366
Feb. 17, 2003   (JP)   ............................. 2003-038820

(51) Int. Cl.
*B32B 27/00*   (2006.01)
(52) U.S. Cl. ....................... 428/421; 428/480; 428/500; 428/521; 264/176.1; 264/241; 264/464; 524/500
(58) Field of Classification Search ........................ None
See application file for complete search history.

(56) References Cited

U.S. PATENT DOCUMENTS

| | | | | |
|---|---|---|---|---|
| 4,929,388 A | * | 5/1990 | Wessling | 252/500 |
| 5,878,313 A | * | 3/1999 | Takagi et al. | 399/279 |
| 6,697,587 B2 | * | 2/2004 | Harada | 399/111 |
| 6,906,257 B2 | * | 6/2005 | Saccomanno et al. | 174/36 |
| 7,141,183 B2 | * | 11/2006 | Hattori et al. | 252/500 |

FOREIGN PATENT DOCUMENTS

| | | |
|---|---|---|
| JP | 10-169641 | 6/1998 |
| JP | 11-181311 A | 7/1999 |
| JP | 2001-139795 A | 5/2001 |
| JP | 2002-304064 | 10/2002 |

* cited by examiner

*Primary Examiner*—Monique R Jackson
(74) *Attorney, Agent, or Firm*—Birch, Stewart, Kolasch & Birch, LLP

(57) ABSTRACT

A conductive layer of a conductive member for an image-forming apparatus is composed of a conductive polymer composition containing an ionic-conductive addition salt. The conductive polymer composition has a continuous phase and one or more uncontinuous phases including at least one first uncontinuous phase. The continuous phase and the uncontinuous phase form a sea-island structure. A salt capable of dissociating into cations and anions is unevenly distributed to the first uncontinuous phase. A polymer composing the first uncontinuous phase has a higher degree of affinity for the salt capable of dissociating into cations and anions than a polymer composing the continuous phase to prevent the salt (or the cations, the anions) from shifting out of the first uncontinuous phase or out of the polymer composition. The conductive polymer composition can contain melamine cyanurate so that it is flame-retardant.

31 Claims, 11 Drawing Sheets

CONDUCTIVE MEMBER FOR IMAGE-FORMING APPARATUS

This Nonprovisional application claims priority under 35 U.S.C. § 119(a) on Patent Application No(s). 2002-344366 and 2003-038820 filed in Japan on Nov. 27, 2002 and Feb. 17, 2003, respectively, the entire contents of which are hereby incorporated by reference.

BACKGROUND OF THE INVENTION

Field of the Invention

The present invention relates to a conductive member such as a conductive roller and a conductive belt for use in an image-forming apparatus; and a method of manufacturing the conductive member. More particularly, the present invention is intended to improve the degree of the dependence of the electrical resistance of a conductive polymer composition on environment and the change of the electrical resistance with time to thereby obtain a preferable image reliably. The conductive polymer composition is used to compose a conductive layer of a conductive member such as the conductive roller and the conductive belt for use in the image-forming apparatus such as a copying apparatus, a laser beam printer, a facsimile, and the like.

As a method of imparting electrical conduction to the conductive member such as the conductive roller and the conductive belt, the following two methods are known: In one of the methods, an electroconductive elastomer composition containing a conductive filler such as powder of metal oxides or carbon black is used. In the other method, an ionic-conductive elastomer composition such as urethane rubber, acrylonitrile-butadiene rubber (NBR), and epichlorohydrin rubber is used.

In the case where the electroconductive polymer composition containing an electroconductive filler such as powdered metal oxide, the carbon black or the like is used, the electrical resistance thereof changes rapidly in a semi-conductive region owing to a slight change of an addition amount of the conductive filler. Thus it is very difficult to control the electrical resistance of the electroconductive polymer composition. In addition, it is difficult to disperse the conductive filler uniformly in the polymer composition. Thus the roller has variations in the electrical resistance value in its circumferential and longitudinal directions. In this case, the belt has variations inside its surface (in-plane variation).

That is, the flow (intensity) of electrical current changes in dependence on the dispersion state of particles of the conductive filler. Thus if there are variations in the dispersion state of particles, it is difficult to control the electrical resistance value. Consequently there are large variations in the electrical resistance value in the conductive roller and the conductive belt. With a secondary aggregation of particles, there are larger variations in the electrical resistance value. Carbon black makes the belt black, which makes it difficult to visually detect the stain of the belt.

In the case where the belt is made electroconductive by the use of the metal oxide, for example, conductive zinc white, the belt is frail if the charging amount increases owing to a low electrical resistance. There is a problem in the dispersion state of particles of the conductive filler. Thus it is difficult to control the electrical resistance value. It is very difficult to adjust the electrical resistance value of the belt to $10^4$ Ω·cm to $10^{12}$ Ω·cm.

The above-described problem of the roller and the belt causes large variations in the electrical resistance value between members of an image-forming apparatus. The electrical resistance value of the conductive roller and the conductive belt depends on a voltage applied thereto and is not constant. In the case where the carbon black is used as the conductive filler, the variation of the electrical resistance value is great. Thus it is difficult to accomplish mechanical control of an image-forming process including charging, development, transfer, and fixing, which may lead to the increase of the manufacturing cost. The use of carbon makes coloring difficult.

That being the case, application of an ionic-conductive roller or an ionic-conductive belt to the image-forming apparatus such as the copying apparatus, the facsimile, and the printer are preferred recently because the image-forming apparatuses are required to provide a high-quality image and save energy. Thus various proposals are made.

The proposal disclosed in Japanese Patent Application Laid-Open No. 10-169641 relates to the semi-conductive polymeric elastic material whose electrical resistance value during successive energization is specified in consideration of different environments. A quaternary ammonium salt is added to the polymeric material which is the base component of the semi-conductive polymeric elastic material.

However, the ionic-conductive roller or the ionic-conductive belt composed of the semi-conductive polymeric elastic material disclosed in Japanese Patent Application Laid-Open No. 10-169641 is incapable of sufficiently reducing the degree of dependence on environment (temperature and humidity) in its electrical resistance value, although the rise of the electrical resistance value thereof is suppressed during successive energization by adding the quaternary ammonium salt having particular anions to the polymeric material. Another problem of the semi-conductive polymeric elastic material is that a photosensitive member is stained in dependence on the kind of the salt, the situation in which the ionic-conductive roller or the ionic-conductive belt is used, and the contents of the semi-conductive polymeric elastic composition.

It is necessary to consider the problem of the dependence on environment in its electrical resistance value and the stain of the photosensitive member owing to shift of the added salt in addition to the reduction of the electrical resistance value during successive energization.

Conductive oligomer containing a polyether structure such as a polyethylene oxide and a conductive plasticizer (Mn<10000) is known as ionic-conductive agents. These ionic-conductive agents bleed or bloom because they are not fixed in the polymer composition. In the case where the polymer composition is used for the conductive roller and the conductive belt for the copying apparatus, the printer, and the like, these ionic-conductive agents shift to the periphery of the photosensitive member and stain it, thus smearing an image or modifying it.

In a polymer composition in which a metal salt such as lithium perchlorate and an ionic-conductive addition salt such as quaternary ammonium salts is used, ions of the dissociated salts move to an electrode during successive energization in dependence on the amount of the salts added to the base polymer and the compatibility between the polymer composition and the salts. As a result, the electrical resistance value may rise considerably. Further the addition salts separate out to the surface of a conductive member such as a conductive roller, thus staining the photosensitive member. In the case where a medium such as a low molecular weight polyether compound or a low molecular weight polar compound is used to disperse the addition salts in the polymer, the addition salts are capable of moving readily in the polymer, thus improving the electrical conduction performance. However, the addition salts separate out to the surface of the polymer composition easily during successive energization. In addition, the medium consisting of the low molecular weight compound shift to the surface of the polymer composition, thus causing stain of the photosensitive member owing to its shift and fixing of toner when the conductive member is used for a long time. Thus the conductive member cannot be put into practical use. Actually, these problems occur in the image-forming apparatus when it is used successively for a long time.

An endless belt (seamless belt) is disclosed in Japanese Patent Application Laid-Open No. 2002-304064. This ionic-conductive endless belt is composed of a resinous composition containing at least one kind of thermoplastic resin and at least one kind of hydrophilic resin not compatible with the thermoplastic resin. The resinous composition is extruded to form the endless belt. The viscosity of the thermoplastic resin is set higher than that of the hydrophilic resin at the extrusion temperature.

However, the ionic-conductive endless belt disclosed in Japanese Patent Application Laid-Open No. 2002-304064 has a problem that the volume resistivity depends greatly on environment and rises greatly during successive energization. In this case, it is difficult to control the voltage for transfer, which makes the mechanism of the image-forming apparatus complicated and requires a large power source. Thus the image-forming apparatus consumes a large electrical power and hence the manufacturing cost is high.

If the polymer composition of the ionic-conductive roller or the ionic-conductive belt contains a low molecular weight antistatic agent having a function of a surface-active agent, there is a fear that bleeding causes stain of the photosensitive member. If the polymer composition is very hygroscopic, the electrical resistance changes greatly owing to change in humidity. It is difficult to handle sodium perchlorate (NaClO$_4$) in kneading with a thermoplastic elastomer. In addition, the sodium perchlorate is expensive.

In recent years, the conductive belt is demanded to be flame-retardant in consideration of environment. Because the conductive belt is mounted inside the image-forming apparatus at a high voltage and temperature, there is a fear that the use state of the conductive belt is restricted in dependence on the condition of environment inside the image-forming apparatus, if the belt is flammable and insufficiently flame-retardant. Conductive belts manufactured currently are good in electrical conduction and durability. Thus they can be used in normal use. However, there is still room for improvement in fire retardance.

To make the conductive belt composed of the thermoplastic resin flame-retardant, a flame-retardant agent is added thereto. A halogen-containing flame-retardant agent and a phosphate flame-retardant agent are used.

When the belt contains the halogen-containing flame-retardant agent, toxic gases such as dioxin are generated when the belt is subjected to a high temperature in discarding it. When the belt containing the phosphate flame-retardant agent is used at a high temperature for a long time, the phosphate flame-retardant agent oozes out to the surface of the belt and stains a photosensitive member.

A transport belt, a transfer belt, an intermediate transfer belt, a fixing belt, a developing belt, and a base belt of a photosensitive member for use in an image-forming apparatus are preferentially demanded to be flame-retardant. There is a demand that the conductive belt is made flame-retardant without using a flame-retardant agent not containing halogen so that the conductive belt does not pollute environment in use.

SUMMARY OF THE INVENTION

The present invention has been made in view of the above-described problems. Therefore it is an object of the present invention to provide a conductive member, in the group which includes a roller or a belt for use in an image-forming apparatus, which has a sufficiently low electrical resistance, has a low degree of dependence on environment (temperature and humidity) in its electrical resistance, and has a low degree of rise in its electrical resistance during successive energization.

It is another object of the present invention to provide a image-forming apparatus which has preferable electrical characteristics, consumes a small electrical power, and provides a preferable high-quality image for a long time.

It is still another object of the present invention to provide a flame-retardant conductive belt which has preferable flame-retardant property without adversely affecting its other performances such as electrical conduction, has a low degree of rise in its electrical resistance during successive energization, has slight variations in an electrical resistance inside the belt, and has a low degree of dependence on environment in the electrical resistance.

To achieve the object, the present invention provides a conductive member, for use in an image-forming apparatus, in the group which includes a conductive roller or a conductive belt having a conductive layer formed of a conductive polymer composition containing an ionic-conductive addition salt.

The conductive layer has a continuous phase and one or more uncontinuous phases including at least one first uncontinuous phase. The continuous phase and the uncontinuous phase form a sea-island structure. A salt capable of dissociating into cations and anions is unevenly distributed in the first uncontinuous phase. A polymer composing the first uncontinuous phase has a higher degree of affinity for the salt capable of dissociating into cations and anions than a polymer composing the continuous phase. The conductive layer has a volume resistivity not less than $10^4 (\Omega \cdot cm)$ nor more than $10^{12} (\Omega \cdot cm)$, when the volume resistivity is measured at a voltage of 100V applied to said conductive polymer composition in accordance with the method specified in JIS K6911.

Paying attention to the disposition of the salt capable of realizing a low electrical resistance and the affinity between the salt and polymers, the present inventors have made investigations and experiments on polymers composing the conductive member and the ionic-conductive addition salt to be added thereto. As a result, they have found a phase structure capable of maintaining preferable electrical characteristic owing to the action of the ions and preventing the salt (or the cations, the anions) from shifting out of the conductive polymer composition.

More specifically, the conductive layer has the phase structure composed of the continuous phase and one or more uncontinuous phases. The salt, capable of dissociating into cations and anions, having a high conductivity and electrical resistance-decreasing performance is present in the uncontinuous phase. The polymer composing the uncontinuous phase has a higher degree of affinity for the salt capable of dissociating into cations and anions than the polymer composing the continuous phase. Thereby when an electrical field is applied to the conductive polymer composition, it is possible to enhance the degree of freedom of the salt (the cations, the anions) in the uncontinuous phase and prevent the salt (or the cations, the anions) from shifting out of the uncontinuous phase or out of the conductive polymer composition, with the conductive polymer composition maintaining a low electrical resistance. Thus it is possible to prevent the salt (or the cations, the anions) from shifting to the outside of the conductive polymer composition and prevent the electrical resistance from rising during successive energization. Further since the salt is present in the uncontinuous phase, the conductive polymer composition is hardly affected adversely by environment such as temperature and humidity. Furthermore since the polymer composition is ionic-conductive, it has slight variations in its electrical resistance and is dependent on a voltage to a low extent.

Attempts of distributing the salt to the continuous phase by other inventors have been hitherto made to reduce the electrical resistance of the entire polymer composition as much as possible. Paying attention to the affinity between the salt and the polymer and the disposition of the salt, the present inventors have devised the above-described structure. Then it is possible to reduce the degree of dependence on environment (temperature and on humidity) in the electrical resistance of the conductive polymer composition, with the conductive polymer composition maintaining a low electrical resistance and reduce the degree of rise in its electrical resistance during successive energization.

In particular, according to the present invention, ions of the salt used in the present invention have a high dissociation degree, and the salt shows a high conductivity. Even if an electrical field is kept applied to the conductive polymer composition, the flow of the salt out of the uncontinuous phase or out of the conductive polymer composition is suppressed. Thus it is possible to obtain excellent conduction by addition of a small amount of the salt having a high conduction without separating out the salt (or the cations, the anions) to the surface thereof or increasing the electrical resistance thereof greatly. Therefore it is possible to greatly reduce the degree of influence on other properties of the conductive polymer composition such as its compression set, hardness and the like. Consequently the conductive polymer composition can be very usefully used to compose the conductive member such as a conductive roller and a conductive belt for use in an image-forming apparatus such as a copying apparatus and a printer.

The structure of the continuous phase and that of the uncontinuous phase composed of the polymer composition can be observed in a phase mode of a scanning probe microscope (SPM) of an atomic force microscope (AFM) type.

The uncontinuous phase can consist of a first uncontinuous phase and a second uncontinuous phase. Very little salt is added to the second uncontinuous phase. Thus it is possible to alter the structure of the phase of the conductive layer. Then very little salt is added to the continuous phase.

In addition to these conditions, it is preferable that the affinity between the salt and the polymer of the first uncontinuous phase is set higher than the affinity between the salt and the polymer of the continuous phase and that the affinity between the salt and the polymer of the continuous phase is set higher than the affinity between the salt and the polymer of the second uncontinuous phase. It is also preferable that the electrical resistance (volume resistivity) of the first uncontinuous phase is set lower than that of the continuous phase and that the electrical resistance of the continuous phase is set lower than that of the second uncontinuous phase.

The affinity between the salt and the polymer of each phase can be evaluated from the volume resistivity ($\rho_{v1}$, $\rho_{v2}$, $\rho_{v3}$ which will be described later) of the polymer of each phase not containing the salt and from the volume resistivity of the polymer of each phase containing the salt. It can be said that the lower the volume resistivity, the higher the affinity between the salt and the polymer.

By constructing the conductive member as described above, it is possible to suppress the rate of the first uncontinuous phase to which the salt capable of dissociating into anions and cations is distributed without greatly deteriorating the conduction performance of the conductive polymer composition. Consequently the entire conductive polymer composition is capable of keeping a low volume resistivity, even though the addition amount of the salt capable of dissociating into anions and cations is reduced.

Preferably, the first uncontinuous phase and the second uncontinuous phase are so formed that the first uncontinuous phase surrounds the second uncontinuous phase. Each of the first uncontinuous phase, the second uncontinuous phase, and the continuous phase may be formed of two or more kinds of polymers and may be composed of a plurality of small phases, provided that such constructions satisfy the gist of the present invention and its operation and effect.

It is preferable that supposing that the volume resistivity of the polymer composing the first uncontinuous phase to which the salt capable of dissociating into cations and anions is distributed is $\rho v_1$ and that the polymer composing the continuous phase is $\rho v_2$, the following equation establishes:

$$0.2 \leq \log_{10} \rho v_2 - \log_{10} \rho v_1 \leq 5$$

If the value of the above equation is less than 0.2, the salt capable of dissociating into cations and anions is apt to shift to the continuous phase. On the other hand, if the value of the above equation is more than 5, it is difficult to allow the conductive polymer composition to have a low electrical resistance and obtain the homogeneous conductive polymer composition. Consequently the conductive roller composed of the conductive polymer composition has a very nonuniform electrical resistance on its circumferential surface. In the case where one of the phases is composed of a mixture of two or more kinds of polymer components, the volume resistivity of the mixture is set as that of the polymer composing the phase. Herein, the volume resistivity means the volume resistivity of the polymer not containing the salt. The value of the equation of $\log_{10} \rho v_2 - \log_{10} \rho v_1$ is more favorably not less than 0.5 nor more than 4 and most favorably not less than 1 nor more than 3.

It is favorable that the ratio of the weight of the polymer composing the uncontinuous phase to the weight of the polymer composing the continuous phase is set to 5:95 to 75:25.

If the mixing ratio of the polymer composing the uncontinuous phase is less than the lower limit of the above-described range, the volume fraction of the uncontinuous phase is so low that it is impossible to sufficiently reduce the volume resistivity of the entire conductive polymer composition or the electrical resistance value of the conductive member such as the conductive roller or the conductive belt formed by molding the conductive polymer composition. On the other hand, if the mixing ratio of the polymer composing the continuous phase is more than the upper limit of the above-described range, it is impossible to make the continuous phase present, even if a dynamic crosslinking method or the like is used.

The above weight ratio is more favorably 10:90 to 60:40 and most favorably 20:80 to 45:55.

In the present invention, the electrical resistance value of the conductive polymer composition can be controlled to some extent by fixing the addition amount of the salt capable of dissociating into anions and cations and altering the ratio between the continuous phase and the uncontinuous phase. By using the dynamic crosslinking method, the uncontinuous phase can be composed of a component having a comparatively high volume fraction. Thus it is possible to increase the weight ratio of the polymer composing the uncontinuous phase.

It is preferable that the volume fraction of the continuous phase is set higher than that of the second uncontinuous phase and that the volume fraction of the second uncontinuous phase is set higher than that of the first uncontinuous phase.

It is favorable that not less than 0.01 parts by weight nor more than 20 parts by weight of the salt capable of dissociating into anions and cations is added to 100 parts by weight of the entire polymer component.

If less than 0.01 parts by weight of the salt capable of dissociating into anions and cations is added to 100 parts by weight of the entire polymer component, it is impossible to obtain a sufficient effect of reducing the electrical resistance. On the other hand, if more than 20 parts by weight of the salt capable of dissociating into anions and cations is added to 100 parts by weight of the entire polymer component, it is impossible to obtain a sufficient effect of reducing the electrical resistance for the increase of the amount of the salt. The salt capable of dissociating into anions and cations should be added more favorably at not less than 0.2 parts by weight nor more than 10 parts by weight and most favorably at not less than 0.4 parts by weight nor more than 6 parts by weight to 100 parts by weight of the entire polymer component.

It is favorable that the salt capable of dissociating into cations and anions has an electrical conductivity of not less than 2.3 mS/cm, when the electrical conductivity is measured at a concentration of a salt of 0.1 mol/liter at 25° C. in a mixed solvent of propylene carbonate (PC) and dimethyl carbonate (DME) (mixing ratio between PC and DME is 1:2 in volume fraction). This conductivity of the salt capable of dissociating into anions and cations is proportional to the concentration of dissociated ions and the mobility thereof. If the conductivity of the salt capable of dissociating into anions and cations is less than 2.3 mS/cm, it is difficult to obtain a low electrical resistance. It is more favorable that the conductivity of the salt capable of dissociating into anions and cations is not less than 3.5 mS/cm. The higher the conductivity, the more favorable. But the upper limit of the conductivity of the salt actually present is about 4.5 mS/cm.

The following salts are preferable as the salt having the conductivity not less 2.3 mS/cm: $CF_3SO_3Li$ (:2.3 mS/cm), $C_4F_9SO_3Li$ (:2.3 mS/cm), $(CF_3SO_2)_2Nli$ (:4.0 mS/cm), $(C_2F_5SO_2)_2Nli$ (:3.8 mS/cm), $(C_4F_9SO_2)(CF_3SO_2)NLi$ (:3.5 mS/cm), $(FSO_2C_6F_4)(CF_3SO_2)Nli$ (:3.0 mS/cm), $(C_8F_{17}SO_2)(CF_3SO_2)Nli$ (:3.2 mS/cm), $(CF_3CH_2OSO_2)_2Nli$ (:3.0 mS/cm), $(CF_3CF_2CH_2OSO_2)_2Nli$ (:3.0 mS/cm), $(HCF_2CF_2CH_2OSO_2)_2Nli$ (2.9 mS/cm), $((CF_3)_2CHOSO_2)_2Nli$ (:3.1 mS/cm), $(CF_3)SO_2)_3Cli$ (:3.6 mS/cm), $(CF_3CH_2OSO_2)_3Cli$ (:2.9 mS/cm), and $LiPF_6$ (:4.4 mS/cm). In the above, (: numerical value mS/cm) denotes the value of conductivity.

It is preferable to use these salts each having a high conductivity because the conductive polymer composition has a low electrical resistance value by the use of a small amount thereof. The use of these salts allow the effect of the present invention to be displayed outstandingly: These salts each having a high conductivity move readily in the system.

Thus if the present invention is not used, a conductive polymer composition containing a salt having a high conductivity has a much higher degree of rise in its electrical resistance value during successive use than a conductive polymer composition containing a salt having a low conductivity.

As the salt capable of dissociating into anions and cations, it is possible to use anion-containing salts having fluoro groups (F—) and sulfonyl groups (—$SO_2$—). For example, a lithium salt, a potassium salt, a quaternary ammonium salt, and an imidazolium salt containing anions such as bis (fluoroalkylsulfonyl) imide ions, tris (fluoroalkylsulfonyl)methide ions, and fluoroalkylsulfonic acid ions can be preferably used. Since the functional groups such as the fluoro group and the sulfonyl group of these salts have electron attraction property, the anions can be stabilized to a high extent and show a high dissociation degree. Thereby the conductive polymer composition is capable of obtaining a very low electrical resistance value by addition of a small amount of these salts.

The dielectric constant and the electrostatic capacity of the quaternary ammonium salt and the imidazolium salt can be altered by changing the functional group such as the alkyl group to be replaced. For example, the electrostatic capacity thereof can be reduced.

It is preferable that at the least one of anions having the fluoro group and the sulfonyl group are selected from among the group of bis(fluoroalkylsulfonyl) imide ion, tris (fluoroalkylsulfonyl)methide ion, fluoroalkylsulfonic acid ion, and particularly bis(trifluoromethanesulfonyl) imide ion, tris (trifluoromethanesulfonyl)methide ion, trifluoromethanesulfonic acid ion.

The use of these salts reduces the degree of dependence on environment in the volume resistivity and the like. Further the anions of the salts show a very high dissociation degree. In addition, the salts are compatible with the polymer such as EO-PO-AGE copolymer and epichlorohydrin rubber composing the uncontinuous phase. The bis(fluoroalkylsulfonyl) imide ion and tris (fluoroalkylsulfonyl)methide ion are capable of greatly reducing the degree of dependence on environment in the volume resistivity and the like.

Cations of any one of the alkali metals, the group 2A metals, and transition metals, and amphoteric metals are preferable as the anion-containing salt having the fluoro group and the sulfonyl group. The alkali metals is particularly preferable in that they have small ionization energy and are capable of readily forming stable cations. In addition to cations of metals, the conductive polymer composition may contain salts having cations shown by the following formulas 2 and 3. The reference symbols $R_1$ through $R_6$ show alkyl group having 1 to 20 carbon atoms or its derivatives. $R_1$ through $R_4$ may be identical to or different from each other. Similarly, $R_5$ and $R_6$ may be identical to or different from each other. It is particularly preferable to use a salt containing trimethyl-type quaternary ammonium cations consisting of three of $R_1$ through $R_6$ and one alkyl group or its derivative having favorably 4 to 20 carbon atoms and more favorably 6 to 20 carbon atoms. This is because three methyl groups, having strong electron-donating property, of the salt is capable of stabilizing the positive electrical charge of nitrogen atoms. In addition, the alkyl group or its derivative is capable of improving compatibility of the salt with the ionic-conductive elastomer component. In the cations shown by the chemical formula 3, it is preferable that $R_5$ or $R_6$ consists of methyl group or ethyl group because the alkyl group or its derivatives $R_5$ or $R_6$ having a stronger electron-donating property is capable of stabilizing the positive electrical charge of nitrogen atoms. By stabilizing the positive electrical charge of the nitrogen atoms, it is possible to increase the degree of stability of the cations and thereby form salts having a higher dissociation degree and superior conductance-imparting performance.

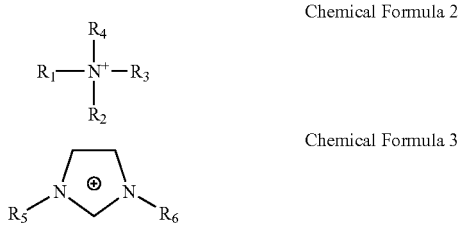

Chemical Formula 2

Chemical Formula 3

For the above-described reason, as the anion-containing salt having the fluoro group and the sulfonyl group, it is optimum to select at least one salt from among the group of an alkali metal salt of bis(trifluoromethanesulfonyl) imide, an alkali metal salt of tris (trifluoromethanesulfonyl)methide, and an alkali metal salt of trifluoromethanesulfonic acid.

Salts whose anions consist of bis(fluoroalkylsulfonyl) imide ions and tris (fluoroalkylsulfonyl)methide ions are preferable. Particularly bis(trifluoromethanesulfonyl) imide lithium is very stable at high temperatures. Therefore different from lithium perchlorate and quaternary ammonium perchlorate conventionally used, it is unnecessary to take an explosion-proof measure. In this respect, the above salts are superior in that by using them, it is possible to reduce the manufacturing cost and secure safety.

It is preferable that the salt capable of dissociating into anions and cations is added to the polymer component without the intermediary of a medium which consists of a low molecular weight polyether-containing compound whose molecular weight is not more than 10000 or a low molecular weight polar compound whose molecular weight is not more than 10000. When the medium is used successively for a long time, the electrical resistance value rises greatly and the energization characteristic deteriorates. Further the medium separates out and stains the photosensitive member. As the low molecular weight polyether-containing compound whose molecular weight is not more than 10000, low molecular weight (several hundreds to several thousands) polyethylene glycol, polypropylene glycol, and polyether polyol are listed. As the low molecular weight polar compound whose molecular weight is not more than 10000, polyester polyol, adipate, and phthalate are listed.

Known methods can be used to add the salt capable of dissociating into anions and cations to the polymer component without the intermediary of the above-described medium. For example, after dry blend is performed with a Henshell mixer, a tumbler or the like, fusion mixing of a mixture including the salt capable of dissociating into anions and cations and the polymer component is carried out with a mono-axial extruder, a biaxial extruder, a Banbury mixer or a kneader. In adding the salt capable of dissociating into anions and cations to a polymer of a thermoplastic resin or a thermoplastic elastomer at a high temperature, the adding (mixing) operation can be performed in an atmosphere of an inactive gas such as nitrogen to prevent deterioration of the polymer.

It is preferable that the conductive polymer composition of the present invention is a vulcanized rubber composition or a thermoplastic elastomer composition because an appropriate degree of elasticity can be applied thereto. Resin may be used as the polymer.

It is preferable that the polymer composing the first uncontinuous phase to which the salt capable of dissociating into anions and cations is distributed contains at least one of the following polymers as its main component because the ether bond and the cyan group thereof are capable of highly stabilizing cations generated from the salt, which enhances the affinity between the salt and the polymer: A polyoxyalkylene copolymer, a polymer having the cyan group, and an epichlorohydrin polymer. By enhancing the affinity between the salt and the polymer composing the first uncontinuous phase, it is possible to effectively drop the electrical resistance value of the entire conductive polymer composition and prevent the salt from separating out of the system and the electrical resistance value from rising during successive use of the conductive member composed of the conductive polymer composition.

As the polymer composing the first uncontinuous phase, it is preferable to use ethylene oxide-propylene oxide-allyl glycidyl ether copolymer (EO-PO-AGE copolymer) or/and epichlorohydrin rubber. As the epichlorohydrin rubber, it is possible to list an epichlorohydrin-ethylene oxide copolymer, an epichlorohydrin-ethylene oxide-allyl glycidyl ether copolymer, an epichlorohydrin-ethylene oxide-propylene oxide-allyl glycidyl ether copolymer, an epichlorohydrin-ethylene oxide-propylene oxide copolymer, and an epichlorohydrin-allyl glycidyl ether copolymer.

In addition, a polyethylene oxide block polyamide copolymer and a polyether ester amide copolymer have a high affinity for the salt to be used in the present invention. Thus these copolymers can be used preferably as the polymer composing the first uncontinuous phase.

More specifically, it is preferable that the first uncontinuous phase contains polyether polymer, that the continuous phase contains low-nitrile NBR, and that the second uncontinuous phase contains EPDM. It is preferable that the conductive member contains 50 wt % to 90 wt % of the low-nitrile NBR, 10 wt % to 40 wt % of the ethylene-propylene-diene copolymer (EPDM) rubber, 0.5 wt % to 25 wt % of the polyether polymer, and 0.1 wt % to 2 wt % of the salt.

In the case where the EO-PO-AGE copolymer is used, it is possible to set the copolymerization ratio of ethylene oxide, propylene oxide, and allyl glycidyl ether in such a way as to reduce the volume resistivity, while maintaining the properties (compression set, hardness) of the conductive polymer composition. The copolymerization ratio of the ethylene oxide is favorably not less than 55 mol % nor more than 95 mol % and more favorably not less than 65 mol % nor more than 92 mol %. The ethylene oxide-propylene oxide-allyl glycidyl ether copolymer shows an ionic conduction, when oxonium ions and metal cations (for example, cations such as lithium ions contained in added salt) of the copolymer are stabilized by the ethylene oxide unit and the propylene oxide unit and transported by a segment motion of the molecular chain of stabilized portions thereof. The ethylene oxide unit has higher performance than the propylene oxide unit in stabilizing the oxonium ions and the metal cations. Thus it is preferable that the copolymerization ratio of the ethylene oxide unit is high because more ions can be stabilized to thereby realize a low electrical resistance. However, if the copolymerization ratio of the ethylene oxide unit exceeds 95 mol %, the ethylene oxide unit crystallizes and makes it difficult to transportions. Consequently the electrical resistance rises.

In the case where the EO-PO-AGE copolymer is used, the copolymerization ratio of the allyl glycidyl ether is preferably not less than 1 mol % nor more than 10 mol %. If the copolymerization ratio of the EO-PO-AGE copolymer is less than 1 mol %, bleeding and the stain of the photosensitive member are apt to occur. On the other hand, if the copolymerization ratio of the EO-PO-AGE copolymer is more than 10 mol %, the number of crosslinking points increases after vulcanization is performed, which makes it difficult to realize a low electrical resistance. Further the conductive polymer composition is liable to deteriorate in its tensile strength, fatigue characteristic, and flexural resistance. The number-average molecular weight of the EO-PO-AGE copolymer is set to favorably not less than 10000 and more favorably not less than 50000 to prevent occurrence of bleeding and the stain of the photosensitive member.

It is preferable that as the polymer composing the continuous phase, low-nitrile NBR or/and moderate-high-nitrile NBR or polyester thermoplastic elastomer is used. Thereby it is possible to provide the conductive polymer composition with a very low electrical resistance value and prevent the salt capable of dissociating into anions and cations from shifting out of the conductive polymer composition and the electrical resistance from rising during successive energization. As the material for the continuous phase, the low nitrile NBR is particularly preferable because it allows the conductive polymer composition to have a comparatively low electrical resistance value and reduces the degree of dependence of the viscoelasticity on temperature in the vicinity of the room temperature owing to its low Tg (glass transition temperature), which reduces the degree of dependence on environment in the volume resistivity. The glass transition temperature of these polymers is favorably not more than −40° C. and more favorably not more than −50° C. The lower the Tg, the better. But considering cost, the Tg is not less than −120° C. or not less than −100° C. or not less than −80° C.

It is preferable that the second uncontinuous phase in which the salt capable of dissociating into anions and cations is not present contains low-polar rubber as its main component. It is preferable that the low-polar rubber is selected from among ethylene-propylene-diene copolymer (EPDM), ethylene propylene rubber (EPM), butyl rubber (IIR), styrene butadiene rubber (SBR). Thereby it is possible to allow the conductive polymer composition to be ozone-resistant. Thus the conductive member, composed of the conductive polymer composition, which is used for the image-forming apparatus is resistant to ozone generated therein.

It is preferable that not only the polymer for use in the continuous phase but also the polymer for use in the second uncontinuous phase has a low glass transition temperature Tg to reduce the degree of dependence of the viscoelasticity of the entire system on temperatures in the neighborhood of the room temperature and the degree of dependence on environment in the electrical resistance value. It is preferable that the polymer for use in the first uncontinuous phase has also a low glass transition temperature Tg. The glass transition temperature Tg of these polymers is favorably not more than −40° C. and more favorably not more than −50° C. As in the case of the polymer composing the continuous phase, it is preferable that the lower limit of the polymer for use in the first uncontinuous phase and the second uncontinuous phase is as low as possible. But actually the lower limit of the polymer for use in the first uncontinuous phase and the second uncontinuous phase is favorably not less than −120° C., more favorably not less than −100° C., and most favorably not less than −80° C.

By single-ionizing a part of ions generated from the added salt with an anion adsorbing agent, it is possible to stabilize the electrical conduction of the conductive polymer composition and improve the electrical conduction when the salt is used in a small amount. As anion-adsorbing agents, the following known compounds can be used:

Synthesized hydrotalcite containing Mg and Al as its main component; a Mg—Al-containing inorganic ion exchanger, a Sb-containing inorganic ion exchanger, Ca-containing inorganic ion exchanger; and copolymers having ion seats for fixing anions to chains. For example, synthesized hydrotalcite (trade name: Kyoward 2000, Kyoward 1000 produced by Kyowa Chemical Industry), and anion-exchanging ion exchange resin (trade name: Dianon DCAll produced by Nippon Rensui Inc.).

In the case where a polymer containing halogen such as chlorine is used, it is preferable to add an acid-receiving agent such as hydrotalcite thereto to prevent deterioration of the halogen-containing polymer owing to a dehydrochlorination reaction and corrosion of a kneader. The hydrotalcite should be added to 100 parts by weight of the halogen-containing polymer favorably at not less than 1 parts by weight nor more than 15 parts by weight and more favorably at not less than 3 parts by weight nor more than 12 parts by weight.

Sulfur is preferable as a vulcanizing agent to be added to the polymer component because it allows realization of a low electrical resistance. In addition to the sulfur and organic sulfur-containing compounds, peroxides can be used singly or in combination with the sulfur and the organic sulfur-containing compounds. In the case where EPDM or EPM is used as the low-polar rubber forming the second uncontinuous phase, the peroxide is capable of effectively vulcanizing the phase formed of these rubbers.

As the organic sulfur-containing compound, it is possible to use tetraethylthiuram disulfide and N,N-dithiobismorpholine. As the peroxide, it is possible to use dicumyl peroxide and benzoyl peroxide. In performing vulcanization and foaming, the sulfur is more favorable than the organic sulfur-containing compounds and peroxides, because the sulfur allows the vulcanization speed and the foaming speed to be favorably balanced with each other. The vulcanizing agent is added to the rubber component favorably at not less than 0.5 parts by weight nor more than 5 parts by weight and more favorably at not less than 1 part by weight nor more than 3 parts by weight for 100 parts by weight of the rubber component.

The following vulcanizing accelerators may be added to the polymer component: Inorganic accelerators such as slaked lime, magnesia (MgO), litharge (PbO); and organic accelerators shown below.

As the organic accelerator, it is possible to use the following substances in appropriate combinations: thiazoles such as 2-melcapto.benzothiazole and dibenzothiazyl disulfide; sulfinamides such as N-cyclohexyl-2-benzothiazolesulfene; thiurams such as tetramethylthiuram monosulfide, tetramethylthiuram disulfide, tetraethylthiuram disulfide, and dipentamethylenethiuram tetrasulfide; and thioureas.

The vulcanizing accelerators should be added to the polymer component favorably at not less than 1 part by weight nor more than 5 parts by weight and more favorably at not less than 2 parts by weight nor more than 4 parts by weight for 100 parts by weight of the polymer component.

The following vulcanizing accelerating assistants may be added to the polymer component: Metal oxides such as zinc white; fatty acids such as stearic acid, oleic acid, cotton seed fatty acid; and known vulcanizing accelerating assistant.

To allow the conductive polymer composition to be flexible, not less than three parts by weight nor more than 12 parts by weight of a chemical blowing agent may be added to 100 parts by weight of the polymer component. A softener such as oil and an age resistor may be added to the polymer component.

To improve the mechanical strength of the conductive polymer composition, fillers may be used as necessary in a range in which they do not affect the electrical resistance and other properties of the conductive polymer composition adversely. As the fillers, it is possible to use powdered substances such as silica, carbon black, clay, talc, calcium carbonate, magnesium carbonate, and aluminum hydroxide. It is favorable to add not less than 5 parts by weight nor more than 60 parts by weight of the filler to 100 parts by weight of the polymer component.

It is favorable that the conductive polymer composition of the present invention does not contain salts containing chlorine or bromine.

According to the present invention, a material not containing chlorine and bromine is used as the polymer. According to the present invention, salts such as lithium perchlorate, sodium perchlorate, and quaternary ammonium perchlorate all containing chlorine and bromine are not used. Thereby there is no fear that the conductive polymer composition corrodes the surface of a metal shaft of the conductive roller or rust or stain the surface of the metal shaft thereof. Further it is easy to treat the conductive polymer composition in discarding the conductive member. That is, the conductive member of the present invention is composed of the material not polluting environment.

It is favorable that the conductive polymer composition of the present invention forming the conductive layer of the conductive member has a compression set not more than 30% when the compression set is measured at a temperature of 70° C. for 22 hours to 24 hours at a compression rate of 25% in accordance with Permanent set testing methods for rubber, vulcanized or thermoplastic specified in JIS K6262. If the compression set is more than 30%, the conductive member, for example, the conductive roller and the conductive belt composed of the molded or formed conductive polymer composition is likely to have a large dimensional change. Thus the conductive member does not seem to be practically used. It is more favorable that the compression set measured in the above-described conditions is not more than 25%. The smaller the compression set, the better. But actually the lower limit value of the compression set is about 1% in consideration of the level of the present mixing technique and measuring accuracy.

The conductive polymer composition that composes the conductive layer of the conductive member of the present invention has a volume resistivity of $10^{4.0}$ to $10^{12.0}$ ($\Omega \cdot cm$) and more favorably $10^{6.0}$ to $10^{10.0}$ ($\Omega \cdot cm$) and most favorably $10^{7.5}$ to $10^{9.5}$ ($\Omega \cdot cm$). If the volume resistivity is more than $10^{12.0}$ ($\Omega \cdot cm$), the conductive member composed of the conductive polymer composition is incapable of obtaining a preferable electrical conduction and thus cannot be put into practical use, and further has a low efficiency in transfer, charging, and toner supply operations. On the other hand, if the volume resistivity is less than $10^{4.0}$($\Omega \cdot cm$), it is difficult to hold the electrical charge, and the conductive member is incapable of functioning as a member of the image-forming apparatus.

The conductive member having the conductive layer is molded into the shape of a roller or an endless belt to form the conductive roller or the conductive belt for use in an image-forming apparatus.

The conductive member such as the conductive roller and the conductive belt are manufactured as follows: The salt capable of dissociating into anions and cations and the polymer composing the uncontinuous phase to which the salt capable of dissociating into anions and cations is dispersed are kneaded or uniformly mixed with each other to obtain a mixture. Thereafter the polymer composing the continuous phase and other polymers composing the uncontinuous phase are added to the mixture. Thereafter all the components are kneaded to obtain a conductive polymer composition.

Then the conductive polymer composition is molded by heating it. Thereby the conductive member such as the conductive roller or the conductive belt is produced.

As described above, the salt capable of dissociating into anions and cations is distributed to the desired polymer. The conductive polymer composition whose uncontinuous phase is composed of the polymer in which the salt capable of dissociating into anions and cations is present is extruded into a desired configuration of a roller or a belt. Thereby the conductive member having the conductive layer showing a preferable electrical conduction can be easily manufactured.

When an electrical resistance value R ($\Omega$) of the conductive roller is measured by applying a constant voltage of 1000V thereto for 96 hours successively at a temperature of 23° C. and a relative humidity of 55%, $\Delta \log_{10} R = \log_{10} R(t=96 \text{ hours}) - \log_{10} R(t=0 \text{ hour})$ indicating the rise amount of the electrical resistance value R ($\Omega$) is set to not more than 0.5. If the above-specified index value of the rise amount of the electrical resistance value of the conductive roller is more than 0.5, the conductive roller has a large increase in its electrical resistance during successive use of the conductive roller. Thus a large power source is required. Hence it cannot be put into practical use. The smaller the index value of the rise amount, the better. But actually the index value showing the rise amount of the electrical resistance value is not less than 0.01 or not less than 0.05 or not less than 0.08 in consideration of measuring accuracy and the level of the present mixing technique.

When the conductive polymer composition is formed into the conductive belt, it is preferable that when the volume resistivity $\rho v$ ($\Omega \cdot cm$) of a sample of the conductive belt having a thickness of 0.25 mm is measured by applying a constant voltage of 1000V thereto for five hours successively at a temperature of 23° C. and a relative humidity of 55%, $\Delta \log_{10} \rho v = \log_{10} \rho v(t=5 \text{ hours}) - \log_{10} \rho v(t=0 \text{ hour})$ indicating the rise amount of the volume resistivity is set to not more than 0.5. If the rise amount of the volume resistivity is more than 0.5, problems similar to those which occur in the conductive roller occur. The smaller the rise amount of the volume resistivity, the better. But actually the index value showing the rise amount thereof is not less than 0.01 or not less than 0.1 or not less than 0.3 in consideration of measuring accuracy and the level of the present mixing technique.

It is preferable that when an electrical resistance value R ($\Omega$) of the conductive roller is measured at a temperature of 10° C. and a relative humidity of 15% and at a temperature of 32.5° C. and a relative humidity of 90%, $\Delta \log_{10} R = \log_{10} R$ (temperature of 10° C. and relative humidity of 15%)$-\log_{10} R$ (temperature of 32.5° C. and relative humidity of 90%) indicating a dependence degree on environment in the electrical resistance value is set to not more than 1.7.

It is preferable that when a volume resistivity $\rho v$ ($\Omega \cdot cm$) of the conductive belt is measured at a temperature of 10° C. and a relative humidity of 15% and at a temperature of 32.5° C. and a relative humidity of 90%, $\Delta \log_{10} \rho v = \log_{10} \rho v$ (temperature of 10° C. and relative humidity of 15%)$-\log_{10} \rho v$ (temperature of 32.5° C. and relative humidity of 90%) indicating a dependence degree on environment in the volume resistivity is set to not more than 1.7.

If the index value showing the dependence degree on environment in the electrical resistance value of the conductive roller or the volume resistivity of the conductive belt is more than 1.7, a large power unit is required because the electrical resistance value changes greatly in dependence on the change of environment in which the conductive member is used. Consequently the image-forming apparatus consumes much electrical power and hence the manufacturing cost increases.

The index value indicating the dependence degree on environment in the electrical resistance value of the conductive roller is favorably not more than 1.4, more favorably not more than 1.3, and most favorably not more than 1.2. The smaller the index value, the better. But actually the index value is not less than 0.1 or not less than 0.5 or not less than 0.8 in consideration of measuring accuracy and the level of the present mixing technique.

The index value indicating the dependence degree on environment in the volume resistivity of the conductive roller is favorably not more than 1.6. The smaller the index value, the better. But actually the index value is not less than 0.1 or not less than 0.5 or not less than 1.0 in consideration of measuring accuracy and the level of the present mixing technique. The conductive member for use in the image-forming apparatus of the present invention reduces the degree of dependence of the electrical resistance value and the volume resistivity on environment to a higher extent than a member composed of a conventional ionic-conductive rubber composition or composed of a non-thermoplastic reactive curing type ionic-conductive urethane composition.

It is preferable that when the conductive polymer composition is formed into the conductive roller, the expansion ratio thereof is set to not less than 100% nor more than 500% and the hardness thereof is set not more than 60 degrees when the hardness is measured by the durometer of type E specified in JIS K6253. Thereby the flexibility of the conductive roller can be improved. In the case where the conductive roller is used as a transfer roller, the transfer roller does not cause a toner image to be irregular when the transfer roller presses a transfer member. Thus a preferable image can be obtained. In the case where the conductive layer is formed as a cellular material layer having a large surface area, the present invention is capable of preventing migration stain to the photosensitive member or the like and suppressing the rise of the electrical resistance during energization. As will be understood from the description of the examples and the comparison examples which will be made later, the degree of the rise of the electrical resistance of the foamed conductive roller during energization is much larger than the degree of the rise of a solid conductive roller. However, the conductive member (foamed conductive member) of the present invention is capable of suppressing the rise of the electrical resistance. The expansion ratio of the conductive layer is more favorably not less than 150% nor more than 300% and most favorably not less than 200% nor more than 270%. The hardness (measured by durometer of type E) of the cellular material layer is more favorably not less than 20 degrees nor more than 40 degrees and most favorably not less than 25 degrees nor more than 35 degrees.

The conductive roller may have one cylindrical conductive layer disposed on the periphery of a columnar metal shaft. However, the conductive roller may have or two or three rubber layers in addition to the conductive layer to adjust the electrical resistance of the conductive roller and protect the surface thereof. In this case, it is possible to appropriately adjust the mixing ratio of the components of each layer, the layering order, and the thickness of each layer. The metal shaft may be made of metal such as aluminum, aluminum alloy, SUS, iron or of ceramics. The surface of the conductive roller may be irradiated with ultraviolet rays or coated with a coating material to prevent powdered paper or toner from attaching thereto.

The conductive roller is used inside the image-forming apparatus. More specifically, the conductive roller is used as a charging roller for uniformly charging the photosensitive member, a developing roller for attaching toner to the photosensitive member, and a transfer roller for transferring a toner image to paper or an intermediate transfer belt from the photosensitive member, and a toner supply roller for transporting the toner, and a developing roller for driving a transfer belt from the inner side thereof.

The conductive roller can be produced by using conventional methods. For example, the conductive elastomer composition (kneaded components) is preformed tubularly with a single-axis extruder. Then the preform is vulcanized at 160° C. for 15 to 70 minutes. Thereafter a metal shaft is inserted into a hollow portion of the vulcanized tube. After the surface of the tube is polished, the tube is cut to a predetermined size to obtain a roller. An optimum vulcanizing time period should be set by using a vulcanization testing rheometer (for example, Curelastometer). The vulcanization temperature may be set around 160° C. in dependence on necessity. To suppress the stain of the photosensitive member and reduce the compression set of the conductive elastomer composition, it is preferable to set conditions of the vulcanization temperature and the vulcanization time period appropriately so that sufficient vulcanization can be accomplished. The conductive polymer composition may be vulcanized in a vulcanizing can pressurized by water vapor. It is possible to carry out a successive vulcanization method in dependence on a mixing ratio. A secondary vulcanization may be performed as necessary. The electrical resistance value of the conductive roller is favorably not less than $10^{3.5}\Omega$ nor more than $10^{11.0}\Omega$ and more favorably not less than $10^{4.0}\Omega$ nor more than $10^{9.0}\Omega$, and most favorably not less than $10^{4.5}\Omega$ nor more than $10^{8.5}\Omega$, when a voltage of 1000V is applied thereto.

The conductive belt may have one conductive layer. However, the conductive roller may have two or three rubber layers on the inner peripheral surface of the conductive layer or the peripheral surface thereof in addition to the conductive layer to adjust the electrical resistance of the conductive belt and protect the surface thereof. In this case, it is possible to appropriately adjust the mixing ratio of the components of each layer, the layering order, and the thickness of each layer. The surface of the conductive belt may be irradiated with ultraviolet rays or coated with a coating material to prevent powdered paper or toner from attaching thereto.

The conductive belt is used for the image-forming apparatus. More specifically, the conductive belt is used as the transfer belt, the intermediate transfer belt, a fixing belt, and a belt for the photosensitive member.

In the case where the conductive roller is used as the transfer belt or the intermediate transfer belt, to scrape toner which has left thereon, change the degree of adhesiveness and removability of toner, and control the surface energy, it is preferable to form a known material composed of the base polymer of urethane, acrylic, rubber latex or the like and fluorocarbon resin dispersed therein and apply the material to the surface thereof by using known methods such as electrostatic deposition, spray coating, dipping, brushing, and the like. The thickness of the coating layer is preferably 1 μm to 20 μm. Thereby the belt has a higher function.

The conductive belt is formed by using known methods: The conductive polymer composition (kneaded components) is extruded from a resin extruder in the shape of a belt at 200° C. to 270° C. and favorably at 200° C. to 250° C. and more favorably at 220° C. to 240° C. Then the extruded conductive polymer composition is cooled.

It is preferable to set the thickness of the extruded belt to 50 μm to 500 μm. The thickness of the belt can be variably set in the extruding operation by appropriately adjusting the gap of a die lip and the delivery of the thermoplastic composition and the take-off speed of the belt.

If the thickness of the belt is less than 50 μm, the belt is apt to expand. Consequently, supposing that the belt is used as an intermediate transfer belt in an image-forming apparatus to form an image by superimposing toner in different colors, a positional deviation is liable to occur. On the other hand, if the thickness of the belt is more than 500 μm, the belt has a high flexural rigidity, which makes it difficult to suspend the belt on a driving shaft. The surface roughness Rz of the belt is favorably not more than 2.0 μm and more favorably not more than 1.8 μm to enhance transfer efficiency, transporting performance, and toner-cleaning performance.

It is particularly preferable that the conductive belt is flame-retardant.

In the case where the conductive belt is used as the flame-retardant belt, the conductive polymer composition is formed of a thermoplastic composition containing 50 to 95 parts by weight of a polyester thermoplastic elastomer added to 100 parts by weight of an entire polymer component, 15 wt % to 40 wt % of melamine cyanurate serving as a flame-retardant additive added to 100 wt % of the conductive polymer composition, 0.01 parts by weight to three parts by weight of the anion-containing salt, shown by a chemical formula 1, added to 100 parts by weight of the entire polymer component, and not less than 5 parts by weight nor more than 50 parts by weight of a copolymer, having a polyether block, added to 100 parts by weight of the polyester thermoplastic elastomer. The conductive polymer composition has a volume resistivity of not less than $1.0 \times 10^6$ Ω·cm nor more than $1.0 \times 10^{12}$ Ω·cm.

Chemical Formula 1

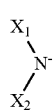

Where $X_1$ and $X_2$ denote functional group which contains C, F—, and —$SO_2$— and in which the number of carbon atoms is one to eight.

Since the belt having the above structure contains the copolymer having the polyether block, the polyether structure stabilizes ions of the salt contained in the conductive polymer composition. That is, the anion-containing salt, shown by the chemical formula 1, displaying an ionic conduction is selectively captured by the copolymer having the polyether block and dispersed in the polyester thermoplastic elastomer in the form of the sea-island structure. The flame-retardant additive consisting of the melamine cyanurate contained in the conductive polymer composition does not adversely affect the volume resistivity of the belt and the degree of dependence of the volume resistivity on environment and thus does not change the electrical resistance value of the belt. Thus the flame-retardant additive is capable of imparting fire retardance to the belt without deteriorating the electrical conduction thereof.

The salt can be prevented from flowing out of the polymer when an electrical field is applied to the conductive belt, with the conductive belt keeping flame-retardant. Thus it is possible to prevent the salt from shifting out of the polymer and the electrical resistance value from rising during successive energization. That is, it is possible to reduce the electrical resistance value of the conductive polymer composition and suppress the rise of the volume resistivity thereof during successive energization.

Since the flame-retardant belt has superior fire retardance, it can be used in the image-forming apparatus at a high voltage and a high temperature without being restricted in use conditions. Thus the flame-retardant belt contributes to formation of a high-quality image. Further the electrical resistance value of the flame-retardant belt can be easily adjusted. Furthermore inside the flame-retardant belt, there are slight variations in the electrical resistance value. Thereby it is possible to reduce the degree of dependence on environment in the electrical resistance value and the rise of the electrical resistance value during successive energization.

When the flame-retardant belt is used as an intermediate transfer belt, it provides preferable transfer performance for a long time without giving rise to a positional deviation in transfer and defective transfer. The flame-retardant belt can be used as a transport belt, a developing belt, a fixing belt, and a base belt of a belt-shaped photosensitive member. These belts provide more favorable performance than conventional ones.

The anion-containing salt shown by the chemical formula 1 is stabilized as anions by the electron attraction property of the fluoro group and the sulfonyl group of the functional group of $X_1$ and $X_2$ of the chemical formula 1, and the anions show a high dissociation degree. Thereby the conductive polymer composition is capable of obtaining a very low electrical resistance value by adding a small amount of the anion-containing salt to the entire polymer component. The anion-containing salt is chemically and electrochemically stable for electrodes or the like and is safe. Further the anion-containing salt can be used in a wide range of temperature, allows the electrical resistance to be adjusted easily, and allows the electrical resistance value inside the conductive belt to have slight variations. In particular, the anion-containing salt can be readily captured into a polyether segment. Therefore the electrical resistance value of the conductive belt is dependent on environment to a low extent and hardly stains the photosensitive member. Furthermore the anion-containing salt is easily commercially available. The anion-containing salt is powdery at the room temperature and can be kneaded easily. The anion-containing salt allows the conductive polymer composition to have a smooth extruded surface. Particularly the anion-containing salt allows a polymer of polyether polyester to have a smooth extruded surface.

In the salt shown by the chemical formula 1, $X_1$ and $X_2$ are functional groups which contain all of C, F—, and —$SO_2$— and have one to eight carbon atoms. In terms of stability, cost, and handling properties, it is preferable that $X_1$ of the chemical formula 1 is $C_{n1}H_{m1}F_{(2n1-m1+1)}$—$SO_2$— and that $X_2$ of the chemical formula 1 is $C_{n2}H_{m2}F_{(2n2-m2+1)}$—$SO_2$— (n1 and n2 are integers not less than 1, and m1 and m2 are integers not less than 0).

It is preferable that the cation making a pair with the anion, shown by the chemical formula 1, which constitutes the salt is the cation of any one of alkali metals, group 2A metals, and transition metals, and amphoteric metals. The alkali metals are more favorable than the other metals, because the alkali metals have small ionization energy and thus form stable cations readily. Lithium is preferable as the metal which constitutes the cations because lithium has a high conduction degree. In addition to the cations of the metals, salts shown by the chemical formulas 2 and 3 are preferable.

Of the anion-containing salts shown in the chemical formula 1, lithium-bis(trifluoromethanesulfonyl) imide $(CF_3SO_2)$ is very favorable, because its melting point is 228° C. which falls in the range of kneading temperature and belt-processing temperature (200° C. to 270° C. and favorably 200° C. to 240° C.) and can be captured easily into a polyether segment. In addition, the above-described salts may be used singly or in combination.

The copolymer having the polyether block is added favorably at not less than 5 parts by weight nor more than 50 parts by weight and more favorably at not less than 10 parts by weight nor more than 50 parts by weight thereof to 100 parts by weight of the polyester thermoplastic elastomer.

If less than 5 parts by weight of the copolymer is added to 100 parts by weight of the polyester thermoplastic elastomer, it is difficult to realize a sufficiently low volume resistivity, with the rise of the volume resistivity of the conductive polymer composition being suppressed during successive energization. On the other hand, if the more than 50 parts by weight of the copolymer is added to 100 parts by weight of the polyester thermoplastic elastomer, the proper elasticity and excellent durability of the polyester thermoplastic elastomer which is the main component of the belt deteriorate and the moldability is apt to deteriorate.

The weight of the copolymer having the polyether block is favorably 1.6 to 3333 times and more favorably 10 to 3000 times as large as that of the anion-containing salt shown by the chemical formula 1. Thereby the conductive polymer composition is capable of maintaining preferable extruded surface and obtaining preferable electrical characteristics. If the weight of the copolymer having the polyether block is less than the above-described lower limit, ions are not stabilized sufficiently by the copolymer having the polyether block, and the salt is incapable of dispersing into the copolymer having the polyether block sufficiently. Consequently it is difficult to suppress the rise of the electrical resistance value during the successive energization. On the other hand, if the weight of the copolymer having the polyether block is more than the upper limit, the concentration of the salt becomes low and it is difficult to reduce the electrical resistance value of the belt sufficiently.

The copolymer having the polyether block is capable of securing compatibility with the polymer which is the base component of the conductive polymer composition to some extent owing to structures other than the polyether. Therefore the copolymer having the polyether block allows the conductive polymer composition to have preferable properties and processability.

Since the conductive polymer composition contains the anion-containing salt shown by the chemical formula 1, it is easy to adjust the electrical resistance value and possible to prevent fluctuation of the electrical resistance value inside the belt and reduce the degree of dependence on environment in the electrical resistance value. That is, it is possible to reduce the electrical resistance value efficiently, with the conductive polymer composition having preferable extruded surface.

The glass transition temperature Tg of the copolymer having the polyether block is set to not more than favorably $-40°$ C. and more favorably not more than $-50°$ C. The lower the glass transition temperature Tg, the better. If the glass transition temperature Tg is more than $-40°$ C., the degree of dependence on environment in the volume resistivity is apt to be high.

When the glass transition temperature Tg of the copolymer is low, the degree of dependence of the change in the modulus of elasticity of the belt on temperature is low in the temperature region in which the conductive belt is used. Thereby it is possible to reduce the degree of dependence on environment in the volume resistivity. The glass transition temperature Tg of the copolymer having the polyether block is not less than $-80°$ C. in consideration of the fact that the copolymer having the polyether block of the present invention is mass-produced and readily commercially available.

It is preferable that the glass transition temperature Tg of the polyester thermoplastic elastomer is not more than $-40°$ C.

It is preferable that the copolymer having the polyether block is selected from among a polyethylene oxide block copolymer and/or a polyether ester amide copolymer. These copolymers have a high affinity for the anion-containing salt shown by the chemical formula 1 and allow the conductive polymer composition to have a preferable electrical resistance value and allow the polyester thermoplastic elastomer which is the base component of the conductive polymer composition to have preferable property. In addition, it is possible to use a resin-type antistatic agent such as polyester block polyolefin resin. A salt such as sodium perchlorate may be added to the copolymer.

Polyethylene oxide block polyamide copolymers are very favorable. Polyethylene oxide block nylon copolymer is particularly favorable. More specifically, polyethylene oxide block nylon 11 copolymer, polyethylene oxide block nylon 12 copolymer, and polyethylene oxide block nylon 6 copolymer can be used. A plurality of polymers may be used in combination.

A mixture of the polyethylene oxide block polyamide copolymer and a polyamide homopolymer can be used. A mixture of the polyethylene oxide block polyamide copolymer and a polyamide homopolymer having the same structure as that of the amide of the polyethylene oxide block polyamide copolymer may be used. The mixture which has fused at a high temperature during a molding operation is cooled and forms a phase structure. While the mixture is forming the phase structure, the polyamide homopolymer solidifies fibrously earlier than the polyethylene oxide block polyamide copolymer. Then the polyethylene oxide block polyamide copolymer is arranged effectively in the polyamide homopolymer owing to compatibility therebetween. Thereby the volume resistivity can be reduced effectively.

That is, a mixture of polyethylene oxide block nylon 12 copolymer and nylon 12 and a mixture of polyethylene oxide block nylon 6 copolymer and nylon 6 are preferable because these mixtures are capable of reducing the volume resistivity effectively.

As described above, not less than 15 wt % not more than 40 wt % of the melamine cyanurate is added to the entire weight of the flame-retardant belt. If less than 15 wt % of the melamine cyanurate is added to the entire weight of the flame-retardant belt, it is impossible to allow the belt to be sufficiently flame-retardant. On the other hand, if more than 40 wt % of the melamine cyanurate is added to the entire weight of the flame-retardant belt, the belt obtained by molding the conductive polymer composition is frail. It is favorable that not less than 20 wt % nor more than 35 wt % of the melamine cyanurate is added to the entire weight of the flame-retardant belt.

Because the decomposition temperature of the melamine cyanurate is not less than $300°$ C., the melamine cyanurate is present in the form of powder up to $300°$ C. Thus the melamine cyanurate does not bleed or bloom from the surface of the belt at temperatures at which the image-forming apparatus is used.

The melamine cyanurate is a nitrogen-containing flame-retardant additive. When the conductive polymer composition is burnt, the melamine cyanurate is decomposed by the heat of combustion, and oxygen is replaced with nitrogen gas. That is, the melamine cyanurate has an action of preventing combustion. Thus there is no fear of generation of halogen-caused harmful gases. That is, the belt hardly pollutes environment.

The flame-retardant belt contains the polyester thermoplastic elastomer as its main component. Thereby the flame-retardant belt has a proper degree of elasticity and flexibility and a proper degree of hardness. Further the flame-retardant belt is resistant to repeated flexing, i.e., it has a high degree of durability. The polyester thermoplastic elastomer is resistant to shock, heat, and oil and can be molded favorably. Therefore the flame-retardant belt is hardly modified by toner or the like and hardly stains the photosensitive member. The polyester thermoplastic elastomer has excellent colorability. Thus in combination with the action of the melamine cyanurate serving as an extender pigment, it is possible to obtain a white belt or belts in other colors. It is preferable to use the white belt as an intermediate transfer belt, because if toner attaches thereto, it can be easily detected. Thus the white belt is favorable for evaluating cleaning performance. It is preferable not to add additives such as carbon black making the belt black.

The addition of a lubricant improves moldability to a higher extent. That is, the flame-retardant seamless belt has a proper degree of flexibility in its thickness direction, hardly elongate longitudinally, and is resistant to vibrations. The conductive polymer composition contains favorably not less than 60 wt % and more favorably not less than 65 wt % of the polyester thermoplastic elastomer for the entire polymer component.

The polyester thermoplastic elastomer having a suitable grade in its hardness, modulus of elasticity, and moldability can be used in dependence on the characteristic demanded for the belt. For example, a polyester polyether thermoplastic elastomer, a polyester thermoplastic elastomer, and the like can be used singly or in combination.

The anion-containing salt is captured in such a way that cations thereof are captured in the vicinity of the ether linkage of polyether or the ester linkage of polyester. Therefore the salt hardly oozes out of the system. Thus a preferable electrical conduction can be shown. In a polyether polyester thermoplastic elastomer, the molecular chain which is a soft segment has slight variations in its modulus of elasticity between the state of a low temperature and humidity and the state of a high temperature and humidity. Therefore the polyether polyester thermoplastic elastomer allows the electrical resistance value to be dependent on environment to a low extent.

It is preferable that the polyester thermoplastic elastomer is a copolymer of a hard segment consisting of polyester having an aromatic ring and a low-melting point soft segment consisting of polyether and/or polyester. It is preferable that the polyester thermoplastic elastomer has a melting point of not less than 150° C. when it is formed of a high polymeric substance consisting of a high-melting point polyester segment component. It is preferable that the polyester thermoplastic elastomer has a melting point or a softening point at not more than 80° C. when it is formed of a high polymeric substance consisting of a low-melting point soft segment component.

As the component composing the high-melting point polyester segment having the aromatic ring, it is possible to use aromatic dicarboxylic acid such as terephthalic acid, isophthalic acid, diphenyl dicarboxylic acid, 2,6-naphthalene dicarboxylic acid; esters of the aromatic dicarboxylic acid; glycol whose number of carbon atoms is 1 to 25; and ester-forming derivatives of the glycol. It is preferable that the terephthalic acid is contained at not less than 70 mol % of the entire acidic constituent of the component composing the high-melting point polyester segment. As the glycol whose number of carbon atoms is one to 25, ethylene glycol, 1,4-butanediol, and ester-forming derivatives of the ethylene glycol and 1,4-butanediol can be listed. Other acidic constituents can be used as necessary, provided that mol % thereof is favorably not more than 30 mol % and more favorably not more than 25 mol %.

As the low-melting point soft segment, of the present invention, consisting of polyether, polyalkylenether glycol such as poly (ethylene oxide) glycol and poly (tetramethylene oxide) glycol can be listed. The poly (tetramethylene oxide) glycol is favorable because of its low melting point and moldability. It is particularly preferable that its molecular weight is 800 to 1500 in terms of its low-temperature characteristic. It is favorable that 15% to 75% of the poly (tetramethylene oxide) glycol is contained for the whole weight of the polyester thermoplastic elastomer.

It is preferable to use lactones as the low-melting point soft segment, of the present invention, consisting of polyester. Caprolacton is most favorable as the lactones. In addition, enanlacton and caprylolacton can be used as the lactones. These lactones can be used singly or in combination. The copolymerization ratio of the aromatic polyester and the lactones are selected according to use. A standard weight ratio between the aromatic polyester and the lactones is set to 97/3 to 5/95 and preferably 95/5 to 30/70.

As the thermoplastic composition, polymer components such as a known thermoplastic elastomer and thermoplastic resin can be used singly or in combination as necessary in addition to the polyester thermoplastic elastomer.

Phosphate whose melting point is not less than 80° C. can be contained in such a way that phosphorous thereof is not less than 0.1 wt % nor more than 0.4 wt % for the entire weight. By using the melamine cyanurate and the phosphate in combination, the flame-retardant seamless belt is allowed to have higher fire retardance without increasing the amount of the melamine cyanurate, a high strength, and a short after-flaming time period.

To improve the mechanical strength of the seamless belt, fillers may be used. As the fillers, it is possible to use calcium carbonate, silica, clay, talc, barium sulfate, and diatomaceous earth. It is possible to use fatty acids such as stearic acid, lauric acid, and the like; and softeners such as cottonseed oil, tall oil, asphalt substances, paraffin wax, and the like, provided that the addition of these fatty acids and the softeners does not cause liberation of additives, bleeding, blooming, and stain of the photosensitive member and the like owing to shifting thereof nor affect fire retardance and conductivity of the seamless belt adversely.

As described above, the flame-retardant belt has a volume resistivity not less than $10^6 \Omega \cdot cm$ nor more than $10^{11} \Omega \cdot cm$. It is favorable that the flame-retardant belt has the volume resistivity not less than $10^6$ $\Omega \cdot cm$ nor more than $10^{11}$ $\Omega \cdot cm$. Thereby the flame-retardant belt can be used widely as an intermediate transfer belt and a sheet-transporting belt. If the volume resistivity of the flame-retardant belt is less than $10^6$ $\Omega \cdot cm$, high current flows, which makes it difficult to hold the electrical charge. Consequently the flame-retardant belt may not function as a member of the image-forming apparatus. On the other hand, if the volume resistivity of the flame-retardant belt is more than $10^{12}$ $\Omega \cdot cm$, a high voltage is necessary for the process of transfer, charging, and toner supply. Further the transfer, charging, and toner supply operations are performed with low efficiency. Therefore the flame-retardant belt is unsuitable for putting it into practical use.

To adjust the volume resistivity of the flame-retardant belt to the range of $10^6 \Omega \cdot cm$ to $10^{12} \Omega \cdot cm$, the flame-retardant belt should contain not less than 0.01 parts by weight nor more than 3 parts by weight and more favorably not less than 0.05 parts by weight nor more than 2.7 parts by weight of the anion-containing salt shown by the chemical formula 1.

The addition of even a slight amount of the anion-containing salt shown by the chemical formula 1 has the effect of reducing the resistance value of the belt. If the flame-retardant belt contains less than 0.01 parts by weight of the anion-containing salt, it is difficult to adjust the resistance value of the belt. If the flame-retardant belt contains more than three parts by weight of the anion-containing salt, the effect of reducing the electrical resistance value can be hardly obtained, i.e., the electrical resistance value cannot be reduced further, an electrical field is applied to the belt during its use, and the salt oozes out owing to contact between the belt and the photosensitive member. Further in extruding the conductive polymer composition to form the belt, the conductive polymer composition is liable to adhere to the lip of a die and a sizing die. Thereby it is difficult to mold the conductive polymer composition.

Supposing that the volume resistivity of the flame-retardant belt measured immediately after a constant voltage of 1000V is applied to a sample of the flame-retardant belt having a thickness of 250 μm at a temperature of 23° C. and a relative humidity of 55% is ρv (t=0 hour) and that a volume resistivity measured after the voltage is applied to the sample for five hours successively is ρv (t=five hours), the following relationship establishes:

$$\log_{10}\rho v(t=5 \text{ hours}) - \log_{10}\rho v(t=0 \text{ hour}) \leq 0.5$$

So long as the above relationship establishes, the volume resistivity does not rise when a voltage is applied successively. Thus the flame-retardant belt has excellent electrical characteristics. The volume resistivity ρv(t=5 hours) may be equal to the volume resistivity ρv(t=0 hour). The smaller the value of $(\log_{10}\rho v(t=5 \text{ hours}) - \log_{10}\rho v(t=0 \text{ hour}))$, the better. The lower limit of the value of $(\log_{10}\rho v(t=5 \text{ hours}) - \log_{10}\rho v(t=0 \text{ hour}))$ is not less than 0.01 or not less than 0.1 or not less than 0.3 in consideration of measuring accuracy and the present technical level.

The flame-retardant belt is manufactured by fusing and kneading, by an extruder, a conductive master batch containing a copolymer having a polyether block as its main component and 1 wt % to 20 wt % of an anion-containing salt shown by a chemical formula 1, a flame-retardant additive, and a thermoplastic composition containing a polyester thermoplastic elastomer as its main component to form a mixture; and extruding the mixture from an annular die and molding the mixture into the shape of the seamless belt by using a sizing die.

By kneading the anion-containing salt shown by the chemical formula 1 into the copolymer having the polyether block to obtain the conductive master batch, the anion-containing salt is present in the copolymer having the polyether block. Thus it is possible to suppress the movement of the anion-containing salt during successive energization and reduce the rise of the electrical resistance. Further the flame-retardant belt is hardly susceptible to environment such as temperature or humidity, has slight variations in the electrical resistance, and is dependent on voltage to a low extent. In the case where the addition amount of the anion-containing salt is small, the electrical resistance value can be adjusted easily.

By kneading the conductive master batch, the flame-retardant additive, and the thermoplastic composition and extruding the mixture, the anion-containing salt is dispersed uniformly together with the copolymer having the polyether block. Thereby it is easy to obtain the flame-retardant seamless belt having slight variations in its electrical resistance value and a proper degree of elasticity and fire retardance.

If the conductive master batch contains less than 1 wt % of the anion-containing salt shown by the chemical formula 1, the conductive master batch does not function. On the other hand, if the conductive master batch contains more than 20 wt %, it is difficult to accomplish the kneading. The kneading can be performed by using a Banbury mixer, a kneader or the like. It is preferable to draw a strand with a biaxial extruder. The copolymer having the polyether block contained in the conductive master batch should be not less than 50 wt % or may be 100 wt % for the entire polymer component. The conductive master batch may contain a copolymer having a plurality of polyether blocks and a polymer such as polyester thermoplastic elastomer.

It is preferable that the flame-retardant additive and thermoplastic composition containing the polyester thermoplastic elastomer as its main component are kneaded and supplied to the extruder as a flame-retardant master batch and that the mixture of the conductive master batch and the flame-retardant master batch are extruded vertically from the annular die.

The thermoplastic composition fused by the extruder is introduced into the annular die and extruded from a die lip. Then the extruded fused thermoplastic composition is supplied to the sizing die disposed at the downstream side of the die lip, with the thermoplastic composition in contact with the sizing die to cool and harden it. Thereby the thermoplastic composition can be belt-shaped. Then the continuous cylindrical thermoplastic composition is cut by a cutting apparatus disposed at the downstream side of the sizing die. Thereby a belt having predetermined width is obtained. The fusing temperature of the extruder should be 200° C. to 270° C., favorably 200° C. to 250° C., and most favorably 220° C. to 240° C. More specifically, the conductive master batch, the flame-retardant master batch, and the polyester thermoplastic elastomer are dry-blended and kneaded by a biaxial extruder to obtain a material for the belt. Thereafter the strand is drawn to pelletize the material. The pellet is dried. The pellet is supplied to a hopper of a mono-axial extruder. By extruding it in this manner, it is easy to obtain a belt which is as thin as 250 μm and has a large diameter of φ168 mm and a width of 400 mm.

The fused thermoplastic composition is extruded vertically from the die lip. Thus it is not affected by gravity, and residual strain is reduced and the fused thermoplastic composition is introduced into the sizing die, with the fused thermoplastic composition keeping the cylindrical state. Thereby the obtained belt has a high dimensional accuracy. It is preferable that the extrusion direction is vertical.

The dispersibility of the flame-retardant agent such as the melamine cyanurate can be improved when it is kneaded into a polymer such as the polyester thermoplastic elastomer. Thereby the flame-retardant agent contained in the flame-retardant master batch does not form a granular structure owing to aggregation of the flame-retardant agent during an operation of molding the conductive copolymer composition into a belt. The generation of the granular structure can be prevented without using the flame-retardant master batch when kneading is performed effectively. However, the method of using the master batch can be carried out easily. The flame-retardant master batch should contain the flame-retardant agent favorably at 30 wt % to 70 wt % and more favorably at 40 wt % to 60 wt %.

As apparent from the foregoing description, the conductive layer of the present invention has the continuous phase and one or more uncontinuous phases. The salt capable of dissociating into cations and anions is distributed to only the uncontinuous phase. The polymer composing the first uncontinuous phase in which the salt capable of dissociating into cations and anions is present has a higher degree of affinity for the salt capable of dissociating into cations and anions than the polymer composing the continuous phase. Thereby when an electrical field is applied to the conductive polymer composition, it is possible to enhance the degree of freedom of the salt in the uncontinuous phase and suppress the flow of the salt out of the uncontinuous phase, with the conductive polymer composition maintaining a low electrical resistance. Thus it is possible to prevent the salt from shifting to the outside of the conductive polymer composition and prevent the electrical resistance from rising during successive energization. Further since the salt is present in the uncontinuous phase, the conductive polymer composition is hardly affected adversely by environment such as temperature and humidity. Furthermore since the polymer composition is ionic-conductive, it has slight variations in its electrical resistance and is dependent on a voltage to a low extent.

Even if an electrical field is kept applied to the conductive polymer composition, it is possible to obtain excellent electrical conduction by addition of a small amount of the salt having a high electrical conduction without separating out the salt to the surface thereof or increasing the electrical resistance value thereof greatly. Thus owing to the use of the conductive copolymer composition, there are slight variations in the electrical resistance value inside the conductive member. Further it is possible to reduce the degree of dependence on environment in the electrical resistance value and the rise of the electrical resistance value during successive energization. Moreover there is no problem in bleeding, blooming, and the stain of the photosensitive member, and migration stain thereof. Furthermore it is possible to greatly reduce the degree of influence on other properties of the conductive polymer composition such as its compression set, hardness and the like.

Although an image-forming apparatus such as a copying apparatus, a facsimile, and a printer having the roller or the belt of the present invention has a low electrical resistance value owing to ionic conduction, it has a slight rise in its electrical resistance value during successive energization, a low degree of dependence on environment in its electrical resistance value, and slight variations in the electrical resistance value inside the roller and the belt. Accordingly it is possible to obtain a uniform image and unnecessary to use a large power unit to cover the variation of the electrical resistance value. Thus the image-forming apparatus consumes a small electrical power. In addition, it is possible to reduce the range of control of the electrical resistance value which requires change of a voltage to be applied thereto. Therefore it is possible to simplify the construction of the image-forming apparatus and the control system thereof. Furthermore it is possible to reduce the number of operation tests in different temperatures and humidities and hence reduce the period of time and the cost required for development. Further members disposed on the periphery of the conductive roller and the conductive belt are given a small burden, and the image-forming apparatuses provide images reliably for a long time.

The flame-retardant belt is formed by molding the thermoplastic elastomer containing a specified amount of the polyester thermoplastic elastomer as its main component, a specified amount of the melamine cyanurate serving as the flame-retardant additive, a specified amount of the anion-containing salt, and a specified amount of the copolymer having the polyether block. Therefore the belt is provided with excellent fire retardance without affecting its volume resistivity adversely. Further it is possible to obtain a belt which has a smooth extruded surface, does not stain the photosensitive member, and has superior driving performance and durability owing to its proper degree of elasticity. The belt has a small rise in its electrical resistance value during successive energization. Thus when the belt is used as an intermediate transfer belt of the image-forming apparatus, it is possible to reduce the range of control of the electrical resistance value which requires change of a voltage to be applied thereto. Therefore owing to the use of the belt, the image-forming apparatus provides a preferable image, and the mechanism thereof can be simplified.

The melamine cyanurate is a nitrogen-containing flame-retardant agent. Thus there is no fear that harmful gases such as hydrogen chloride and the like are generated, and hence the belt hardly pollutes environment. Because the melamine cyanurate acts as an extender pigment, the color of the belt can be selected as desired. It is possible to obtain a white belt by adjusting the kind and amount of additives. Thus the belt can be preferably used as the intermediate transfer belt.

DETAILED DESCRIPTION OF THE PREFERRED EMBODIMENTS

The embodiments of the present invention will be described below with reference to the drawings.

The embodiments of the present invention will be described below.

Figure 1:
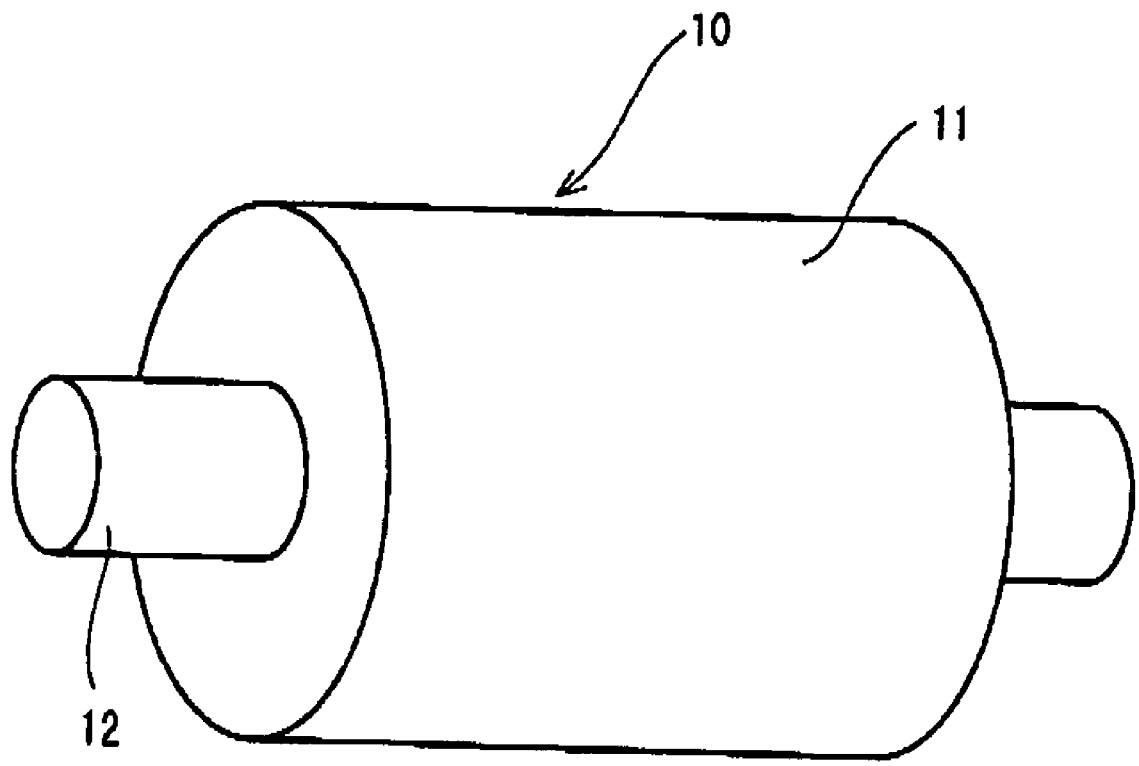
FIG. 1 is a schematic view showing a conductive roller having a conductive layer formed of a conductive polymer of a first embodiment of the present invention.

FIG. 1 shows a conductive roller 10 of a first embodiment for use in an image-forming apparatus. The conductive roller 10 has a cylindrical metal shaft 12 and a tubular conductive layer 11 disposed on the periphery of the metal shaft 12. The metal shaft 12 is inserted into the conductive layer 11 by press fit.

Figure 2:
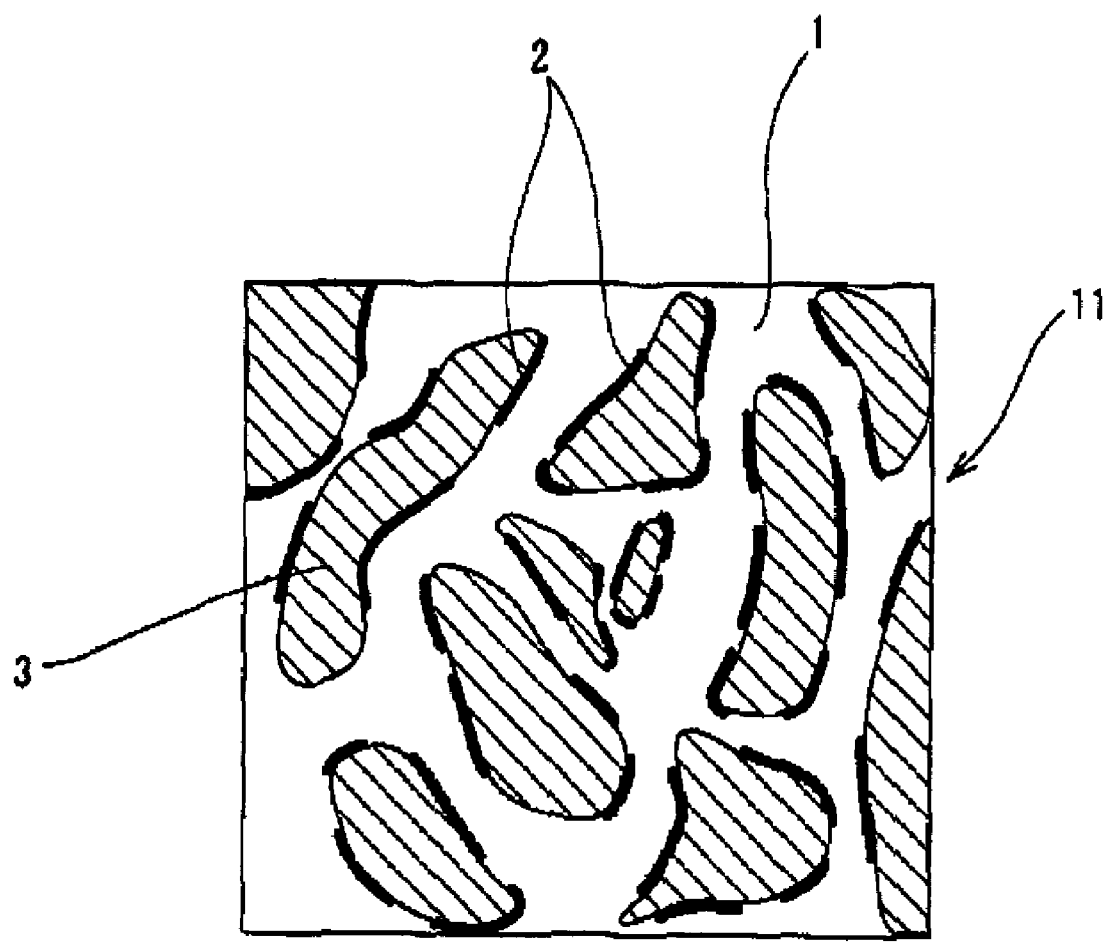
FIG. 2 is an illustrative view showing the structure of a conductive polymer composition forming the conductive layer.

FIG. 2 shows the structure of an ionic-conductive polymer composition forming the conductive layer 11. The ionic-conductive polymer composition has a continuous phase 1, a first uncontinuous phase 2, and a second uncontinuous phase 3. The three phases form a sea-island structure. The first continuous phase 2 and the second uncontinuous phase 3 are present almost uniformly in the continuous phase 1 in such a way that the first uncontinuous phase 2 surrounds the second uncontinuous phase 3. The second uncontinuous phase 3 does not necessarily have to be present.

Figure 3:
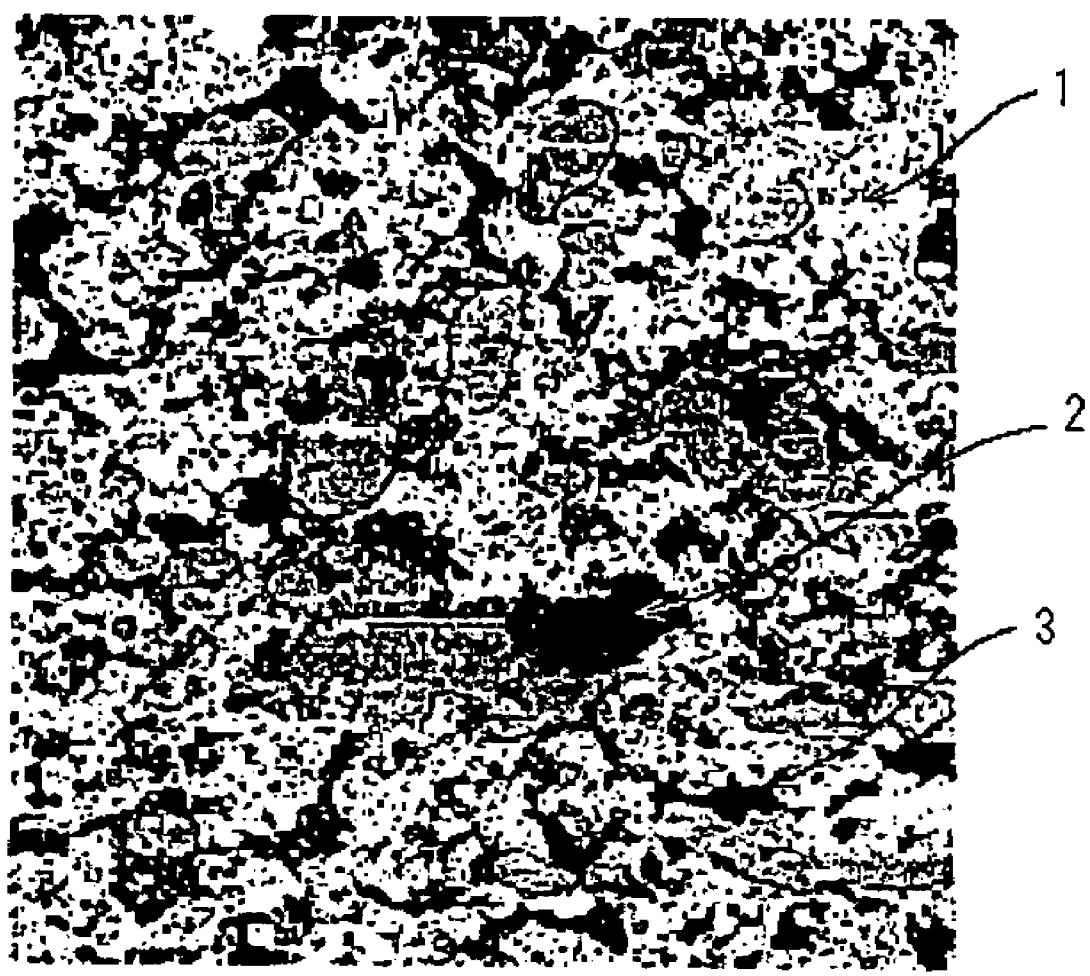
FIG. 3 shows the phase structure (morphology), shown in FIG. 2, of the conductive polymer composition.

FIG. 3 shows a morphology (length of one side: 10 μm) of the conductive polymer composition observed in a phase mode of a scanning probe microscope (SPM) of an atomic force microscope (AFM) type. With reference to FIG. 3, the continuous phase 1 shows the light color, whereas the first uncontinuous phase 2 shows the dark color. The second uncontinuous phase 3 shows a neutral color. The dark portion of FIG. 3 has a high modulus of elasticity, whereas the light portion has a low modulus of elasticity.

As shown in FIG. 3, the volume fraction of the continuous phase 1 is higher than that of the second uncontinuous phase 3 and that the volume fraction of the second uncontinuous phase 3 is higher than that of the first uncontinuous phase 2.

To allow the ionic-conductive polymer composition to have the sea-island structure as shown in FIGS. 2 and 3, the kind and amount of a polymer composing each phase are specified. Further the amount of a salt to be added to the polymer component and a method of adding the salt thereto are specified.

In the ionic-conductive polymer composition, not less than 0.01 parts by weight nor more than 20 parts by weight of the salt capable of dissociating into anions and cations is added to 100 parts by weight of the entire polymer component. The salt is preferentially distributed to the first uncontinuous phase 2. Very little salt is added to the second uncontinuous phase 3 and the continuous phase 1.

The affinity between the salt and the polymer of the first uncontinuous phase 2 is higher than the affinity between the salt and the polymer of the continuous phase 1. The affinity between the salt and the polymer of the continuous phase 1 is higher than the affinity between the salt and the polymer of the second uncontinuous phase 3.

More specifically, as the polymer composing the first uncontinuous phase 2, 10 parts by weight of EO-PO-AGE copolymer (EO:PO:AGE=90:4:6 (mol ratio)) is used, as will be described later in the example 2. As the polymer composing the continuous phase 1, 63 parts by weight of low-nitrile NBR is used. As the polymer composing the second uncontinuous phase 3 to which the salt capable of dissociating into cations and anions is very little added, 27 parts by weight of EPDM which is a low-polar and ozone-resistant rubber is used. That is, the affinity between the salt and the EP-PO-AGE copolymer is higher than the affinity between the salt and the low-nitrile NBR. The affinity between the salt and low-nitrile NBR is higher than the affinity between the salt and the EPDM.

Supposing that a volume resistivity of EO-PO-AGE copolymer composing the first uncontinuous phase 2 is $\rho v_1$, that of now-nitrile NBR composing the continuous phase 1 is $\rho v_2$, and that of EPDM composing the second uncontinuous phase 3 is $\rho V_3$, $\log_{10}\rho v_1$ is 7.9, $\log_{10}\rho v_2$ is 10.2, and $\log_{10}\rho V_3$ is 14.8. Thus $(\log_{10}\rho v_2 - \log_{10}\rho v_1)$ is 2.3.

The ratio between the weight of the polymers composing the first uncontinuous phase 2 and the second uncontinuous phase 3 and the polymer composing the continuous phase 1 is 37:63.

As the salt, capable of dissociating into anions and cations, which is added to the polymer component, 1.1 parts by weight of lithium-bis(trifluoromethanesulfonyl) imide which is an anion-containing salt having the fluoro group and sulfonyl group was used. The salt has an electrical conductivity of 4.0 mS/cm, when the electrical conductivity is measured at a concentration of a salt of 0.1 mol/liter at 25° C. in a mixed solvent of propylene carbonate (PC) and dimethyl carbonate (DME) (mixing ratio between PC and DME is 1:2 in volume fraction). The salt is added to the polymer component without the intermediary of a medium which consists of a low molecular weight polyether-containing compound whose molecular weight is not more than 10000 or a low molecular weight polar compound whose molecular weight is not more than 10000.

In the embodiment, lithium-bis(trifluoromethanesulfonyl) imide is used. It is possible to use potassium-bis (trifluoromethanesulfonyl) imide, hexyltrimethylammonium-bis (trifluoromethanesulfonyl) imide, 1-ethyl-3-methylimidazolium-bis(trifluoromethanesulfonyl) imide, and lithium-tris (trifluoromethanesulfonyl)methide.

The conductive polymer composition consists of a vulcanized rubber composition containing 9 parts by weight of carbon black as a filler, 5 parts by weight of zinc oxide, 1 part by weight of stearic acid, 1.5 parts by weight of powdered sulfur as a vulcanizing agent, 1.5 parts by weight of a vulcanizing accelerator, and 0.5 parts by weight of another kind of a vulcanizing accelerator.

The conductive roller 10, shown in FIG. 1, having the conductive layer 11 formed of the conductive polymer composition is manufactured by the following method:

Initially, the salt capable of dissociating into cations and anions and the EO-PO-AGE copolymer are kneaded at 60° C. for 3 minutes by using a kneader. The low-nitrile NBR, the EPDM, and additives are added to the mixture of the salt capable of dissociating into cations and anions and the EO-PO-AGE copolymer. Thereafter all the components are kneaded at 60° C. for 4 minutes by using an open roll or an enclosed mixer to form the conductive polymer composition.

The kneader does not necessarily have to be used, but the salt capable of dissociating into cations and anions and the EO-PO-AGE copolymer may be mixed with each other with a mixer such as a Henshell mixer or a tumbler.

The conductive polymer composition is supplied to a mono-axial extruder having ϕ60 mm and is extruded tubularly from the extruder to preform it. The obtained unvulcanized rubber tube is cut to a predetermined size to obtain a preform. The preform is supplied to a vulcanizing pan of a pressured water vapor type. The chemical blowing agent is gasified and the material becomes cellular, meanwhile, the rubber component is vulcanized at a rubber component-crosslinking temperature (160° C. for 15 to 70 minutes) to obtain a vulcanized rubber tube.

Vulcanizing conditions are determined by a Curelastometer or the like and adjusted appropriately to 95% torque rise time period t95 minutes as a guide.

To suppress the stain to the photosensitive member and reduce the compression set, it is preferable to set the vulcanization temperature and the vulcanization time period so that sufficient vulcanization can be accomplished.

After a hot-melt adhesive agent is applied to the metal shaft 12, the metal shaft 12 is inserted into the vulcanized rubber tube and bonded thereto. The surface of the rubber tube was polished to obtain the conductive layer 11 having a target dimension. The conductive layer 11 of the conductive roller 10 has an inner diameter of 6 mm, an outer diameter of 14 mm, and a length of 218 mm.

The conductive layer 11 has a compression set of 17%, when the compression set is measured at a temperature of 70° C. for 24 hours in accordance with Permanent set testing methods for rubber, vulcanized or thermoplastic, specified in JIS K6262. The conductive layer has a volume resistivity of $10^{9.0}$ (Ω·cm), when the volume resistivity is measured at a voltage of 100V applied thereto in accordance with the method specified in JIS K6911.

An electrical resistance of the conductive roller 10 is $10^{7.7}$Ω, when a voltage of 1000V is applied thereto. An electrical resistance value R (Ω) thereof is measured by applying the voltage of 1000V thereto for 96 hours successively at a temperature of 23° C. and a relative humidity of 55%. The rise amount of the electrical resistance shown by the following equation is set to 0.10: $\Delta \log_{10}R = \log_{10}R(\text{t}=96 \text{ hours}) - \log_{10}R(\text{t}=0 \text{ hour})$.

An electrical resistance R (Ω) of the conductive roller is measured at a temperature of 10° C. and a relative humidity of 15% and at a temperature of 32.5° C. and a relative humidity of 90%. The dependence degree of the electrical resistance on environment shown by the following equation is set to 0.9: $\Delta \log_{10}R = \Delta \log_{10}R(\text{temperature of } 10° \text{ C. and relative humidity of } 15\%) - A \log_{10}R(\text{temperature of } 32.5° \text{ C. and relative humidity of } 90\%)$.

The conductive layer 11 of the conductive roller 10 manufactured by the above-described method has the continuous phase 1, the first uncontinuous phase 2, and the second uncontinuous phase 3. The phases 1, 2, and 3 are present in such a way that the first uncontinuous phase 2 surrounds the second uncontinuous phase 3. The morphology of the conductive polymer composition is controlled in this manner, and the first uncontinuous phase 2 includes the high-performance salt in the EO-PO-AGE copolymer which is the main component thereof. The EO-PO-AGE copolymer and the high performance salt have high performance of reducing the electrical resistance. Therefore it is possible to prevent the salt from shifting out of the conductive roller 10 and the electrical resistance from rising during successive energization and allow the conductive polymer composition to have a low electrical resistance necessary for putting the conductive roller 10 into practical use.

Therefore it is possible to maintain a low electrical resistance, reduce the change of the electrical resistance in dependence on environment, the change of the electrical resistance owing to successive use, and reduce variations of the electrical resistance in dependence of portions of the conductive roller. Thereby the conductive roller is capable of stably forming preferable images and does not pollute environment. Therefore the conductive roller can be used suitably as a developing roller, a charging roller, and a transfer roller. Particularly, the conductive roller is suitable for the developing roller, the charging roller, and the transfer roller for use in a color copying apparatus or a color printer demanded to form a high-quality image.

The conductive polymer composition can be formed as a foamed roller having a cellular material layer by adding a blowing agent to the polymer component. In this case, the cellular material layer has an expansion ratio of not less than 100% nor more than 500% and a hardness of not more than 60 degrees, when the hardness is measured by the durometer of type E specified in JIS K6253.

In the conductive layer 11, the salt is very little distributed to the second uncontinuous phase 3 present in such a way as to surround the first uncontinuous phase 2. Therefore without deteriorating the electrical conduction of the conductive layer 11, it is possible to suppress the rise of the volume fraction of the first uncontinuous phase 2 to which the salt is distributed. Thereby even if the addition amount of the salt and that of the polymer composing the first uncontinuous phase 2 to which the salt is positively distributed are set small, the conductive roller is capable of obtaining a low volume resistivity and a low electrical resistance value. The anion-containing salt having the fluoro group and the sulfonyl group used as the salt capable of dissociating into anions and cations is expensive. Thus by reducing the addition amount of the salt, it is possible to suppress the rise of the cost.

Examples of the conductive roller and comparison examples were formed to measure the properties thereof.

The components shown in tables 1 through 4 were kneaded, extruded, vulcanized, shaped, and polished to form the conductive roller of each of the examples 1 through 11 and comparison examples 1 through 10. The conductive rollers were formed as transfer rollers for a laser beam printer of Laser Jet 4050 type produced by Hulet Packard Inc.

Rubber taken out as a ribbon from a kneader was extruded by a roller head extruder so that the rubber was sheet-shaped. After it was vulcanized at 160° C. for an optimum period of time by using a vulcanizing can, it was sliced to obtain a vulcanized rubber slab sheet, having a thickness of about 2 mm, which was used to evaluate the volume resistivity (volume specific resistance). Tables 1 through 4 show the results of evaluations made by using the rollers and the rubber slab sheets and evaluations of the rollers.

Using a differential scanning calorimeter DSC2910 manufactured by T.A.Instrument.Japan Inc., measurement was conducted with temperature being raised from −100° C. to 100° C. at the rate of 10° C./minute. Tables show the glass transition temperature (Tg (° C.)) of each polymer used in each of the examples 1 through 11 and comparison examples 1 through 10.

TABLE 1-1

| Components | Tg (° C.) | Detail of components (name(=trade name), maker) | | E1 | E2 | E3 | E4 |
|---|---|---|---|---|---|---|---|
| EO-PO-AGE copolymer (EO:PO:AGE = 90:4:6, Mn = 80000, Mw = 400000) | −63 | ZSN8030 | Zeon Corporation | 10 | 10 | 18 | 10 |
| Salt 1 | | lithium-bis (trifluoromethanesulfonyl)imide | | 1.1 | 1.1 | 4.4 | |
| Salt 2 | | lithium-tris (trifluoromethanesulfonyl) methide | | | | | 1.1 |
| acrylonitrile-butadiene rubber (content of acrylonitrile = 18%) | −52 | Nipol 401LL | Zeon Corporation | 63 | 63 | 57 | 63 |
| Salt 1 | | lithium-bis (trifluoromethanesulfonyl)imide | | | | | |
| EPDM | −50 | EPT4021 | Mitsui Chemicals | 27 | 27 | 25 | 27 |
| Epichlorohydrin rubber (EO:EP:AGE = 73:23:4, | −52 | Trial product | Daiso Co., Ltd. | | | | |

TABLE 1-1-continued

| Components | Tg (° C.) | Detail of components (name(=trade name), maker) | | E1 | E2 | E3 | E4 |
|---|---|---|---|---|---|---|---|
| Mn = 130000, Mw = 580000) | | | | | | | |
| Salt 1 | | lithium-bis (trifluoromethanesulfonyl)imide | | | | | |
| Hydrotalcite-like compound | | DHT-4A-2 | Kyowa Chemical Industry | | | | |
| Vulcanizing agent 2 (ethylene thiourea) | | Accel 22-S | Kawaguchi Chemical Industry Co., Ltd. | | | | |
| vulcanizing accelerator 3 (di-orthotolylguanidine) | | Nocceler DT | Ouchishinko Chemical Industrial Co., Ltd. | | | | |
| filler 1 | | Soft calcium carbonate | Maruo Calcium | | | | |
| filler 2 (HAF carbon) | | Sheast 3 | Tokai Carbon Co., Ltd. | 9 | 9 | 9 | 9 |
| Hydrotalcite-like compound | | DHT-4A-2 | Kyowa Chemical Industry | | | | |
| Zinc oxide | | Ginrei R | Toho Aen | 5 | 5 | 5 | 5 |
| Stearic acid | | 4931 | Uniqema Australia | 1 | 1 | 1 | 1 |
| Vulcanizing agent 1 | | Powdered sulfur | Tsurumi Kagaku Kogyo | 1.5 | 1.5 | 1.5 | 1.5 |
| Vulcanizing accelerator 1 | | Nocceler DM | Ouchishinko Chemical Industrial Co., Ltd. | 1.5 | 1.5 | 1.5 | 1.5 |
| Vulcanizing accelerator 2 | | Nocceler TS | Ouchishinko Chemical Industrial Co., Ltd. | 0.5 | 0.5 | 0.5 | 0.5 |
| Blowing agent 1 | | Neocellborn N#1000SW | Eiwa Chemical Ind. Co., Ltd. | 5 | | 5 | 5 |
| $\log_{10} \rho v_1$ | | | | 7.9 | 7.9 | 7.9 | 7.9 |
| $\log_{10} \rho v_2$ | | | | 10.2 | 10.2 | 10.2 | 10.2 |
| $\log_{10} \rho v_3$ | | | | 14.8 | 14.8 | 14.8 | 14.8 |
| $\log_{10} \rho v_2 - \log_{10} \rho v_1$ | | | | 2.3 | 2.3 | 2.3 | 2.3 |
| volume specific resistance (@100 V) | | | | 9.0 | 9.0 | 7.6 | 8.4 |
| Roller resistance (@1000 V) | | | | 7.7 | 7.7 | 6.1 | 7.2 |
| dependence of roller resistance on environment | | | | 1.1 | 0.9 | 0.9 | 0.9 |
| rise of resistance during successive energization | | | | 0.25 | 0.10 | 0.43 | 0.22 |
| circumferential nonuniformity | | | | 1.06 | 1.06 | 1.08 | 1.07 |
| Hardness | | | | 30 | 64 | 34 | 29 |
| Compression set (%) | | | | 18 | 17 | 20 | 16 |
| test for checking stain of photosensitive member | | | | ○ | ○ | ○ | ○ | where E denotes example.

TABLE 1-2

| Components | Tg (° C.) | Detail of components (name(=trade name), maker) | | E5 | E6 | E7 |
|---|---|---|---|---|---|---|
| EO-PO-AGE copolymer (EO:PO:AGE = 90:4:6, Mn = 80000, Mw = 400000) | −63 | ZSN8030 | Zeon Corporation | | 10 | |
| Salt 1 | | lithium-bis (trifluoromethanesulfonyl)imide | | | 1.1 | |
| Salt 2 | | lithium-tris (trifluoromethanesulfonyl) methide | | | | |
| acrylonitrile-butadiene rubber (content of acrylonitrile = 18%) | −52 | Nipol 401LL | Zeon Corporation | 80 | 90 | 40 |
| Salt 1 | | lithium-bis (trifluoromethanesulfonyl)imide | | | | |
| EPDM | −50 | EPT4021 | Mitsui Chemicals | | | |
| Epichlorohydrin rubber (EO:EP:AGE = 73:23:4, Mn = 130000, Mw = 580000) | −52 | Trial product | Daiso Co., Ltd. | 20 | | 60 |
| Salt 1 | | lithium-bis (trifluoromethanesulfonyl)imide | | 4.4 | | 1.2 |
| Hydrotalcite-like compound | | DHT-4A-2 | Kyowa Chemical Industry | | | 6 |
| Vulcanizing agent 2 (ethylene thiourea) | | Accel 22-S | Kawaguchi Chemical Industry Co., Ltd. | | | 1.2 |
| vulcanizing accelerator 3 (di-orthotolylguanidine) | | Nocceler DT | Ouchishinko Chemical Industrial Co., Ltd. | | | 1.0 |
| filler 1 | | Soft calcium carbonate | Maruo Calcium | 20 | | 20 |
| filler 2 (HAF carbon) | | Sheast 3 | Tokai Carbon Co., Ltd. | | 9 | |
| Hydrotalcite-like compound | | DHT-4A-2 | Kyowa Chemical Industry | 2 | | |
| Zinc oxide | | Ginrei R | Toho Aen | 5 | 5 | 5 |
| Stearic acid | | 4931 | Uniqema Australia | 1 | 1 | 1 |
| Vulcanizing agent 1 | | Powdered sulfur | Tsurumi Kagaku Kogyo | 1.5 | 1.5 | 1.5 |
| Vulcanizing accelerator 1 | | Nocceler DM | Ouchishinko Chemical Industrial Co., Ltd. | 1.5 | 1.5 | 1.5 |
| Vulcanizing accelerator 2 | | Nocceler TS | Ouchishinko Chemical Industrial Co., Ltd. | 0.5 | 0.5 | 0.5 |
| Blowing agent 1 | | Neocellborn N#1000SW | Eiwa Chemical Ind. Co., Ltd. | 5 | 5 | |

TABLE 1-2-continued

| Components | Tg (° C.) | Detail of components (name(=trade name), maker) | E5 | E6 | E7 |
|---|---|---|---|---|---|
| $\log_{10} \rho v_1$ | | | 7.8 | 7.9 | 7.8 |
| $\log_{10} \rho v_2$ | | | 10.2 | 10.2 | 10.2 |
| $\log_{10} \rho v_3$ | | | — | — | — |
| $\log_{10} \rho v_2 - \log_{10} \rho v_1$ | | | 2.4 | 2.3 | 2.4 |
| volume specific resistance (@100 V) | | | 8.6 | 9.3 | 6.3 |
| Roller resistance (@1000 V) | | | 7.4 | 8.0 | 4.4 |
| dependence of roller resistance on environment | | | 0.9 | 1.1 | 0.8 |
| rise of resistance during successive energization | | | 0.47 | 0.18 | 0.48 |
| circumferential nonuniformity | | | 1.09 | 1.07 | 1.10 |
| Hardness | | | 25 | 28 | 72 |
| Compression set (%) | | | 24 | 22 | 30 |
| test for checking stain of photosensitive member | | | ○ | ○ | ○ | where E denotes example.

TABLE 2

| Components | Tg(° C.) | Detail of components (name(=trade name), maker) | | E8 | E9 | E10 | E11 |
|---|---|---|---|---|---|---|---|
| E-PO-AGE copolymer (EO:PO:AGE = 90:4:6, Mn = 80000, Mw = 400000) | −63 | ZSN8030 | Zeon Corporation | 10 | 10 | 10 | 10 |
| Salt 3 | | potassium-bis (trifluoromethanesulfonyl) imide | | 1.1 | | | |
| Salt 4 | | hexyltrimethylammonium-bis (trifluoromethanesulfonyl) imide | Koei Chemical Co., Ltd. | | 1.1 | | |
| Salt 5 | | EMI-TFSI | Stella Chemifa Corporation | | | 1.1 | |
| Salt 6 | | EMI-BF$_4$ | Stella Chemifa Corporation | | | | 1.1 |
| acrylonitrile-butadiene rubber (content of acrylonitrile = 18%) | −52 | Nipol 401LL | Zeon Corporation | 63 | 63 | 63 | 63 |
| Salt 1 | | lithium-bis (trifluoromethanesulfonyl) imide | | | | | |
| EPDM | −50 | EPT4021 | Mitsui Chemicals | 27 | 27 | 27 | 27 |
| Epichlorohydrin rubber (EO:EP:AGE = 73:23:4, Mn = 130000, Mw = 580000) | −52 | Trial product | Daiso Co., Ltd. | | | | |
| Salt 1 | | lithium-bis (trifluoromethanesulfonyl) imide | | | | | |
| Hydrotalcite-like compound | | DHT-4A-2 | Kyowa Chemical Industry | | | | |
| Vulcanizing agent 2 (ethylene thiourea) | | Accel 22-S | Kawaguchi Chemical Industrial Co., Ltd. | | | | |
| vulcanizing accelerator 3 (di-orthotolylguanidine) | | Nocceler DT | Ouchishinko Chemical Industrial Co., Ltd. | | | | |
| filler 1 | | Soft calcium carbonate | Maruo Calcium | | | | |
| filler 2 (HAF carbon) | | Sheast 3 | Tokai Carbon Co., Ltd. | 9 | 9 | 9 | 9 |
| Hydrotalcite-like compound | | DHT-4A-2 | Kyowa Chemical Industry | | | | |
| Zinc oxide | | Ginrei R | Toho Aen | 5 | 5 | 5 | 5 |
| Stearic acid | | 4931 | Uniqema Australia | 1 | 1 | 1 | 1 |
| Vulcanizing agent 1 | | Powdered sulfur | Tsurumi Kagaku Kogyo | 1.5 | 1.5 | 1.5 | 1.5 |
| Vulcanizing accelerator 1 | | Nocceler DM | Ouchishinko Chemical Industrial Co., Ltd. | 1.5 | 1.5 | 1.5 | 1.5 |
| Vulcanizing accelerator 2 | | Nocceler TS | Ouchishinko Chemical Industrial Co., Ltd. | 0.5 | 0.5 | 0.5 | 0.5 |
| Blowing agent 1 | | Neocellborn N#1000SW | Eiwa Chemical Ind. Co., Ltd. | | | | |
| $\log_{10} \rho v_1$ | | | | 7.9 | 7.9 | 7.9 | 7.9 |
| $\log_{10} \rho v_2$ | | | | 10.2 | 10.2 | 10.2 | 10.2 |
| $\log_{10} \rho v_3$ | | | | 14.8 | 14.8 | 14.8 | 14.8 |
| $\log_{10} \rho v_2 - \log_{10} \rho v_1$ | | | | 2.3 | 2.3 | 2.3 | 2.3 |
| volume specific resistance (@100 V) | | | | 9.2 | 9.0 | 8.8 | 9.0 |
| Roller resistance (@1000 V) | | | | 7.9 | 7.7 | 7.5 | 7.7 |
| dependence of roller resistance on environment | | | | 0.8 | 1.0 | 0.8 | 1.2 |
| rise of resistance during successive energization | | | | 0.08 | 0.09 | 0.08 | 0.15 |
| circumferential nonuniformity | | | | 1.06 | 1.07 | 1.07 | 1.07 |
| Hardness | | | | 63 | 62 | 62 | 62 |
| Compression set (%) | | | | 17 | 19 | 20 | 19 |
| test for checking stain of photosensitive member | | | | ○ | ○ | ○ | ○ | where E denotes example.

TABLE 3-1

| Components | Tg(° C.) | Detail of components (name(=trade name), maker) | | CE1 | CE2 | CE3 |
|---|---|---|---|---|---|---|
| EO-PO-AGE copolymer(EO:PO:AGE = 90:4:6, Mn = 80000, Mw = 400000) | −63 | ZSN8030 | Zeon Corporation | | | |
| Salt 1 | | lithium-bis(trifluoromethanesulfonyl)imide | | | | |
| acrylonitrile-butadiene rubber (content of acrylonitrile: 18%) | −52 | Nipol 401LL | Zeon Corporation | 70 | 70 | 70 |
| Salt 1 | | lithium-bis(trifluoromethanesulfonyl)imide | | | 0.6 | 0.6 |
| EPDM | −50 | EPT4021 | Mitsui Chemicals | 30 | 30 | 30 |
| filler 2 (HAF carbon) | | Sheast 3 | Tokai Carbon Co., Ltd. | 9 | 9 | 9 |
| Hydrotalcite-like compound | | DHT-4A-2 | Kyowa Chemical Industry | | | |
| Zinc oxide | | Ginrei R | Toho Aen | 5 | 5 | 5 |
| Stearic acid | | 4931 | Uniqema Australia | 1 | 1 | 1 |
| Vulcanizing agent 1 | | powdered sulfur | Tsurumi Kagaku Kogyo | 1.5 | 1.5 | 1.5 |
| Vulcanizing accelerator 1 | | Nocceler DM | Ouchishinko Chemical Industrial Co., Ltd. | 1.5 | 1.5 | 1.5 |
| Vulcanizing accelerator 2 | | Nocceler TS | Ouchishinko Chemical Industrial Co., Ltd. | 0.5 | 0.5 | 0.5 |
| Blowing agent 1 | | Neocellborn N#1000SW | Eiwa Chemical Ind. Co., Ltd. | 5 | 5 | |
| $\log_{10} \rho v_1$ | | | | 14.8 | 14.8 | 14.8 |
| $\log_{10} \rho v_2$ | | | | 10.2 | 10.2 | 10.2 |
| $\log_{10} \rho v_3$ | | | | — | — | — |
| $\log_{10} \rho v_2 - \log_{10} \rho v_1$ | | | | −4.6 | −4.6 | −4.6 |
| volume specific resistance (@100 V) | | | | 10.7 | 9.0 | 9.0 |
| Roller resistance (@1000 V) | | | | 9.8 | 7.6 | 7.6 |
| dependence of roller resistance on environment | | | | 1.4 | 1.1 | 0.9 |
| rise of resistance during successive energization | | | | 0.05 | 1.1 | 0.91 |
| circumferential nonuniformity | | | | 1.15 | 1.10 | 1.08 |
| Hardness | | | | 29 | 28 | 63 |
| Compression set (%) | | | | 21 | 20 | 20 |
| test for checking strain of photosensitive member | | | | ○ | ○ | ○ | where CE denotes comparison example.

TABLE 3-2

| Components | Tg(° C.) | Detail of components (name(=trade name), maker) | | CE4 | CE5 | CE6 |
|---|---|---|---|---|---|---|
| EO-PO-AGE copolymer(EO:PO:AGE = 90:4:6, Mn = 80000, Mw = 400000) | −63 | ZSN8030 | Zeon Corporation | | 100 | 8 |
| Salt 1 | | lithium-bis(trifluoromethanesulfonyl)imide | | | 2 | 0.9 |
| acrylonitrile-butadiene rubber (content of acrylonitrile: 18%) | −52 | Nipol 401LL | Zeon Corporation | 100 | | |
| Salt 1 | | lithium-bis(trifluoromethanesulfonyl)imide | | 2 | | |
| EPDM | −50 | EPT4021 | Mitsui Chemicals | | | 92 |
| filler 2 (HAF carbon) | | Sheast 3 | Tokai Carbon Co., Ltd. | 9 | 9 | 9 |
| Hydrotalcite-like compound | | DHT-4A-2 | Kyowa Chemical Industry | | | |
| Zinc oxide | | Ginrei R | Toho Aen | 5 | 5 | 5 |
| Stearic acid | | 4931 | Uniqema Australia | 1 | 1 | 1 |
| Vulcanizing agent 1 | | powdered sulfur | Tsurumi Kagaku Kogyo | 1.5 | 1.5 | 1.5 |
| Vulcanizing accelerator 1 | | Nocceler DM | Ouchishinko Chemical Industrial Co., Ltd. | 1.5 | 1.5 | 1.5 |
| Vulcanizing accelerator 2 | | Nocceler TS | Ouchishinko Chemical Industrial Co., Ltd. | 0.5 | 0.5 | 0.5 |
| Blowing agent 1 | | Neocellborn N#1000SW | Eiwa Chemical Ind. Co., Ltd. | | | |
| $\log_{10} \rho v_1$ | | | | — | — | 7.9 |
| $\log_{10} \rho v_2$ | | | | 10.2 | 7.9 | 14.8 |
| $\log_{10} \rho v_3$ | | | | — | — | — |
| $\log_{10} \rho v_2 - \log_{10} \rho v_1$ | | | | — | — | 6.9 |
| volume specific resistance (@100 V) | | | | 7.7 | 6.7 | 12.3 |
| Roller resistance (@1000 V) | | | | 6.3 | 4.9 | 11.2 |
| dependence of roller resistance on environment | | | | 0.6 | 0.6 | 1.1 |
| rise of resistance during successive energization | | | | 1.2 | 1.2 | 0.05 |
| circumferential nonuniformity | | | | 1.09 | 1.12 | 16.9 |

TABLE 3-2-continued

| Components | Tg(° C.) | Detail of components (name(=trade name), maker) | CE4 | CE5 | CE6 |
| --- | --- | --- | --- | --- | --- |
| Hardness | | | 65 | 83 | 67 |
| Compression set (%) | | | 35 | 23 | 11 |
| test for checking stain of photosensitive member | | | ○ | x | ○ | where CE denotes comparison example.

TABLE 4

| Components | Tg(° C.) | Detail of components (name(=trade name), maker) | | CE7 | CE8 | CE9 | CE10 |
| --- | --- | --- | --- | --- | --- | --- | --- |
| EO-PO-AGE copolymer(EO:PO:AGE = 90:4:6, Mn = 80000, Mw = 400000) | −63 | ZSN8030 | Zeon Corporation | | | | |
| acrylonitrile-butadiene rubber (content of acrylonitrile: 18%) | −52 | Nipol 401LL | Zeon Corporation | 70 | 70 | 70 | 70 |
| Salt 3 | | potassium-bis (trifluoromethanesulfonyl) imide | | 0.6 | | | |
| Salt 4 | | hexyltrimethylammonium-bis (trifluoromethanesulfonyl) imide | Koei Chemical Co., Ltd. | | 0.6 | | |
| Salt 5 | | EMI-TFSI | Stella Chemifa Corporation | | | 0.6 | |
| Salt 6 | | EMI-BF$_4$ | Stella Chemifa Corporation | | | | 0.6 |
| EPDM | −50 | EPT4021 | Mitsui Chemicals | 30 | 30 | 30 | 30 |
| filler 2 (HAF carbon) | | Sheast 3 | Tokai Carbon Co., Ltd. | 9 | 9 | 9 | 9 |
| Hydrotalcite-like compound | | DHT-4A-2 | Kyowa Chemical Industry | | | | |
| Zinc oxide | | Ginrei R | Toho Aen | 5 | 5 | 5 | 5 |
| Stearic acid | | 4931 | Uniqema Australia | 1 | 1 | 1 | 1 |
| Vulcanizing agent 1 | | powdered sulfur | Tsurumi Kagaku Kogyo | 1.5 | 1.5 | 1.5 | 1.5 |
| Vulcanizing accelerator 1 | | Nocceler DM | Ouchishinko Chemical Industrial Co., Ltd. | 1.5 | 1.5 | 1.5 | 1.5 |
| Vulcanizing accelerator 2 | | Nocceler TS | Ouchishinko Chemical Industrial Co., Ltd. | 0.5 | 0.5 | 0.5 | 0.5 |
| Blowing agent 1 | | Neocellborn N#1000SW | Eiwa Chemical Ind. Co., Ltd. | | | | |
| $\log_{10} \rho v_1$ | | | | 14.8 | 14.8 | 14.8 | 14.8 |
| $\log_{10} \rho v_2$ | | | | 10.2 | 10.2 | 10.2 | 10.2 |
| $\log_{10} \rho v_3$ | | | | — | — | — | — |
| $\log_{10} \rho v_2 - \log_{10} \rho v_1$ | | | | −4.6 | −4.6 | −4.6 | −4.6 |
| volume specific resistance (@100 V) | | | | 9.2 | 9.0 | 8.8 | 9.0 |
| Roller resistance (@1000 V) | | | | 7.8 | 7.6 | 7.5 | 7.7 |
| dependence of roller resistance on environment | | | | 0.8 | 1.0 | 0.8 | 1.3 |
| rise of resistance during successive energization | | | | 0.85 | 1.1 | 1.0 | 1.1 |
| circumferential nonuniformity | | | | 1.08 | 1.09 | 1.09 | 1.09 |
| Hardness | | | | 62 | 62 | 60 | 61 |
| Compression set (%) | | | | 18 | 19 | 22 | 21 |
| test for checking stain of photosensitive member | | | | ○ | ○ | ○ | ○ | where CE denotes comarison example.

EXAMPLES 1 THROUGH 6

As the polymer composing the uncontinuous phase, the EO-PO-AGE copolymer was used in the examples 1 through 4 and the example 6, and the epichlorohydrin rubber was used in the example 5. The salt 1 consisting of lithium-bis (trifluoromethanesulfonyl) imide or the salt 2 consisting of lithium-tris (trifluoromethanesulfonyl)methide was distributed to the EO-PO-AGE copolymer and the epichlorohydrin rubber. The lithium-bis(trifluoromethanesulfonyl) imide and the lithium-tris (trifluoromethanesulfonyl)methide are the salt capable of dissociating into cations and anions. The low-nitrile NBR was used to form the continuous phase in the examples 1 through 6. In the examples 1 through 4, the EPDM was used to form the other uncontinuous phase (the second uncontinuous phase). Except the conductive roller of the example 2, the conductive rollers of the other examples was formed as rollers having a layer made of cellular material. The salt 2 had an electrical conductivity of 3.6 mS/cm, when the electrical conductivity was measured at a concentration of a salt of 0.1 mol/liter at 25° C. in a mixed solvent of propylene carbonate (PC) and dimethyl carbonate (DME) (mixing ratio between PC and DME is 1:2 in volume fraction).

EXAMPLE 7

Epichlorohydrin rubber (50 phr), NBR, calcium carbonate, hydrotalcite-like compound, zinc oxide, and stearic acid were kneaded by an enclosed kneader preheated at 120° C. While they were being kneaded, a master batch of a thiourea type crosslinking agent (vulcanizing agent 2) prepared in advance by mixed with the epichlorohydrin rubber (10 phr), and a vulcanizing accelerator (vulcanizing accelerator 3) for the thiourea crosslinking agent were supplied to the kneader to perform dynamic crosslinking. An operator watched a chart of a kneading torque during the crosslinking operation. When the crosslinking proceeded in the neighborhood of a torque peak, the kneading operation was suspended. The mixture was cooled to 50° C. Then sulfur, a vulcanizing accelerator 1, and a vulcanizing accelerator 2 were supplied to the kneader to perform a kneading operation. As a result, a dynamically crosslinked composition was obtained. The composition was tubularly extruded as in the case of the composition of the examples 1 through 6 to obtain a preform. The tubular preform was cut. The cut preform was vulcanized at 160° C. for 10 to 70 minutes to obtain a conductive layer.

EXAMPLES 8 THROUGH 11

The EO-PO-AGE copolymer was used as the polymer composing the uncontinuous phase in the examples 8 through 11. The salts 3 through 6 capable of dissociating into cations and anions were distributed to the EO-PO-AGE copolymer of the examples 8 through 11 respectively. The salt 3 was potassium-bis(trifluoromethanesulfonyl) imide. The salt 4 was hexyltrimethylammonium-bis(trifluoromethanesulfonyl) imide. The salt 5 was 1-ethyl-3-methylimidazolium-bis (trifluoromethanesulfonyl) imide (abbreviated as EMI-TFSI). The salt 6 was 1-ethyl-3-methylimidazolium-tetrafluoroborate (abbreviated as EMI-$BF_4$).

The other specifications were similar to that of the example 2. The conductive rollers of the examples 8 through 11 were solid (not cellular).

The salt 4 was a quaternary ammonium salt of trimethyl type (three of $R_1$ through $R_4$ are methyl group) whose cations are shown by the chemical formula 2. The salt 5 was an imidazolium salt in which one of $R_5$ and $R_6$ is a methyl group and the other is an ethyl group.

COMPARISON EXAMPLES 1 THROUGH 6

The salt capable of dissociating into cations and anions was not used in the comparison example 1. The conductive layer of each of the comparison examples 2 and 3 had the continuous phase composed of the low-nitrile NBR and the uncontinuous phase composed of the EPDM. The lithium-bis (trifluoromethanesulfonyl) imide (salt 1) which was capable of dissociating into cations and anions was distributed to the continuous phase. The conductive layer of each of the comparison examples 4 and 5 had only one phase composed of one kind of polymer. The lithium-bis(trifluoromethanesulfonyl) imide (salt 1) capable of dissociating into cations and anions was added to the polymer of the one phase. Similarly to the examples 1 through 4 and 6, the EO-PO-AGE copolymer was used as the polymer composing the uncontinuous phase in the comparison example 6.

The lithium-bis(trifluoromethanesulfonyl) imide (salt 1) capable of dissociating into cations and anions was added to the EO-PO-AGE copolymer. The continuous phase was composed of the EPDM having a high volume resistivity and a very low affinity for the salt 1. The conductive roller of each of the comparison examples 1 and 2 was formed as a roller having a layer made of cellular material.

COMPARISON EXAMPLES 7 THROUGH 10

The conductive layer of each of the comparison examples 7 through 10 had the continuous phase composed of the low-nitrile NBR and the uncontinuous phase composed of the EPDM. The salt 3 consisting of potassium-bis (trifluoromethanesulfonyl) imide, the salt 4 consisting of hexyltrimethylammonium-bis(trifluoromethanesulfonyl) imide, the salt 5 consisting of EMI-TFSI, and the salt 6 consisting of EMI-$BF_4$ were distributed to the continuous phase of the conductive layer of the comparison examples 7 through 10 respectively. The salts 3 through 6 were all capable of dissociating into cations and anions.

The salt 1 consisting of the lithium-bis(trifluoromethanesulfonyl) imide was synthesized by using known methods disclosed in Japanese Patent Publication No. 1-38781, Japanese Patent Application Laid-Open No. 9-173856, U.S. Pat. No. 3,117,369, Japanese Patent Application Laid-Open No. 11-209338, Japanese Patent Application Laid-Open No. 2000-86617, Japanese Patent Application Laid-Open No. 2001-139540, or Japanese Patent Application Laid-Open No. 2001-288193. The lithium-bis(trifluoromethanesulfonyl) imide used in the embodiment is 3M Fluorad HQ-115 produced by Sumitomo 3M Limited.

The salt 2 consisting of lithium-tris(trifluoromethanesulfonyl)methide was synthesized by using known methods disclosed in U.S. Pat. No. 5,554,664, Japanese Patent Application Laid-Open No. 2000-219692, or Japanese Patent Application Laid-Open No. 2000-226392. More specifically, the lithium-tris (trifluoromethanesulfonyl)methide was synthesized as follows: Methyllithium/ether solution was put in a flask and cooled to −55° C. After trifluoromethanesulfonyl chloride was dripped to the solution, with the solution being stirred strongly, the temperature of the solution was gradually raised to allow reaction at reflux for a long time. After the solution was cooled to the room temperature, hydrochloric acid was added to the solution while the solution was being cooled. A filtrate obtained by filtering lithium chloride and lithium hydroxide that crystallized out of the solution was extracted with ether and was then cleaned with a saturated water with sodium chloride. After anhydrous magnesium sulfate was added to the organic layer thereof, the solution was dried. Then the solution was filtered under reduced pressure with a membrane filter whose pore size is 0.2 μm to remove the solvent from the filtrate under reduced pressure. Thereafter toluene was added to perform azeotropic dewatering to obtain crystal. The crystal was dried.

The salt 3 consisting of potassium-bis (trifluoromethanesulfonyl) imide was synthesized by using known methods disclosed in patent publications in a method similar to that used for forming the salt 1 consisting of the lithium-bis(trifluoromethanesulfonyl) imide. More specifically, the potassium-bis(trifluoromethanesulfonyl) imide was produced by Morita Chemical Industries Co., Ltd. The potassium-bis(trifluoromethanesulfonyl) imide is commercially available as fluorine compounds for a lithium battery and a capacitor. An example of methods of obtaining the salt 1 consisting of the lithium-bis(trifluoromethanesulfonyl) imide and the salt 3 consisting of the potassium-bis(trifluoromethanesulfonyl) imide is described below. Acetonitrile, potassium fluoride, and trifluoromethanesulfonylamide ($CF_3SO_2NH_2$) were added to four-neck flask. A reaction container was dipped in a hot water bath having a temperature of 40° C. While the solution was being stirred sufficiently, trifluoromethanesulfonyl fluoride ($CF_3SO_2F$) was introduced into the solution. Then the reaction solution was filtered. The filtrate was condensed under reduced pressure to obtain potassium-bis(trifluoromethanesulfonyl) imide (salt 3). The potassium-bis(trifluoromethanesulfonyl) imide was put in a flask containing concentrated sulfuric acid. The solution was heated to fuse potassium-bis(trifluoromethanesulfonyl) imide. The solution was distilled under reduced pressure to obtain bis(trifluoromethanesulfonyl) imide acid ($HN(SO_2 CF_3)_2$). The bis(trifluoromethanesulfonyl) imide acid ($HN(SO_2 CF_3)_2$) was dissolved in purified water to allow it to react with lithium carbonate. Then the solution was filtered. The filtrate was condensed to obtain the lithium-bis(trifluoromethanesulfonyl) imide (salt 1). This method is disclosed in Japanese Patent Application Laid-Open No. 2001-288193 as a method of manufacturing the salt 1 efficiently and at a low cost. The salt 3 consisting of the potassium-bis(trifluoromethanesulfonyl) imide is generated as an intermediate product during the process of manufacturing the salt 1 consisting of the lithium-bis(trifluoromethanesulfonyl) imide.

Then the salt 3 can be obtained at lower cost than the salt 1.

The salt 4 consisting of the hexyltrimethylammonium-bis(trifluoromethanesulfonyl) imide used for the conductive roller of the example 9 was produced by Koei Chemical Co., Ltd.

The salt 5 consisting of the 1-ethyl-3-methylimidazolium-bis(trifluoromethanesulfonyl) imide (EMI-TFSI) used for the conductive roller of the example 10 was produced by Stella Chemifa Corporation. The salt 6 consisting of the 1-ethyl-3-methylimidazolium-tetrafluoroborate (EMI-BF$_4$) was produced by Stella Chemifa Corporation.

The salt capable of dissociating into cations and anions was used for the EO-PO-AGE copolymer and the epichlorohydrin rubber and kneaded therewith in advance. In the conductive polymer composition containing the carbon black and the EPDM, the former was kneaded into the EPDM in advance to form a master batch. In the example 6, the carbon black was kneaded into the NBR in advance to form a master batch. As the vulcanizing accelerator 1, dibenzothiazyldisulfide was used. As the vulcanizing accelerator 2, tetramethylthirammonosulfide was used. As the blowing agent 1, 4,4'-oxybis (benzene sulphonyl hydrazide) was used.

Measurement of the following volume resistivities were made without adding the salt capable of dissociating into cations and anions to the entire polymer component: The volume resistivity $\rho v_1$ of the polymer composing the uncontinuous phase to which the salt capable of dissociating into cations and anions was to be distributed, the volume resistivity $\rho v_2$ of the polymer composing the continuous phase, and the volume resistivity $\rho v_3$ of the polymer composing the second uncontinuous phase to which the salt capable of dissociating into cations and anions was not to be distributed.

For example, in the examples 1 and 2, the volume resistivity of the composition containing 100 parts by weight of ZSN8030, 9 parts by weight of "Sheast 3", 5 parts by weight of "Ginrei R", 1 part by weight of stearic acid 4931, 1.5 parts by weight of powdered sulfur, 1.5 parts by weight of "Nocceler DM", and 0.5 parts by weight of "Nocceller TS" was measured as the $\rho v_1$ at a temperature of 23° C. and a relative humidity of 55% by applying 100V to the composition.

Measurement of Volume Resistivity

The volume resistivity of each of sheets prepared as described above was measured at a constant temperature of 23° C. and a constant relative humidity of 55% by using an ultrahigh resistance meter R-8340A manufactured by Advantest Corporation. The measuring method conformed to the method of measuring the volume resistivity (volume specific resistance) specified in JIS K6911. The applied voltage was 100V. Tables show the volume resistivity of each sheet by common logarithm. The volume resistivity of the conductive belt of each of the examples 12 through 17 of the second embodiment and the comparison examples 11 through 16 was measured at four points in the circumferential direction of the belt and five points in its longitudinal direction (total 20 points) in the same manner as that described above. Tables show the average of $\log_{10} \rho v$ (Ω·cm). The examples 12 through 17 of the second embodiment and the comparison examples 11 through 16 will be described later.

Measurement of Electrical Resistance of Roller

Figure 4:
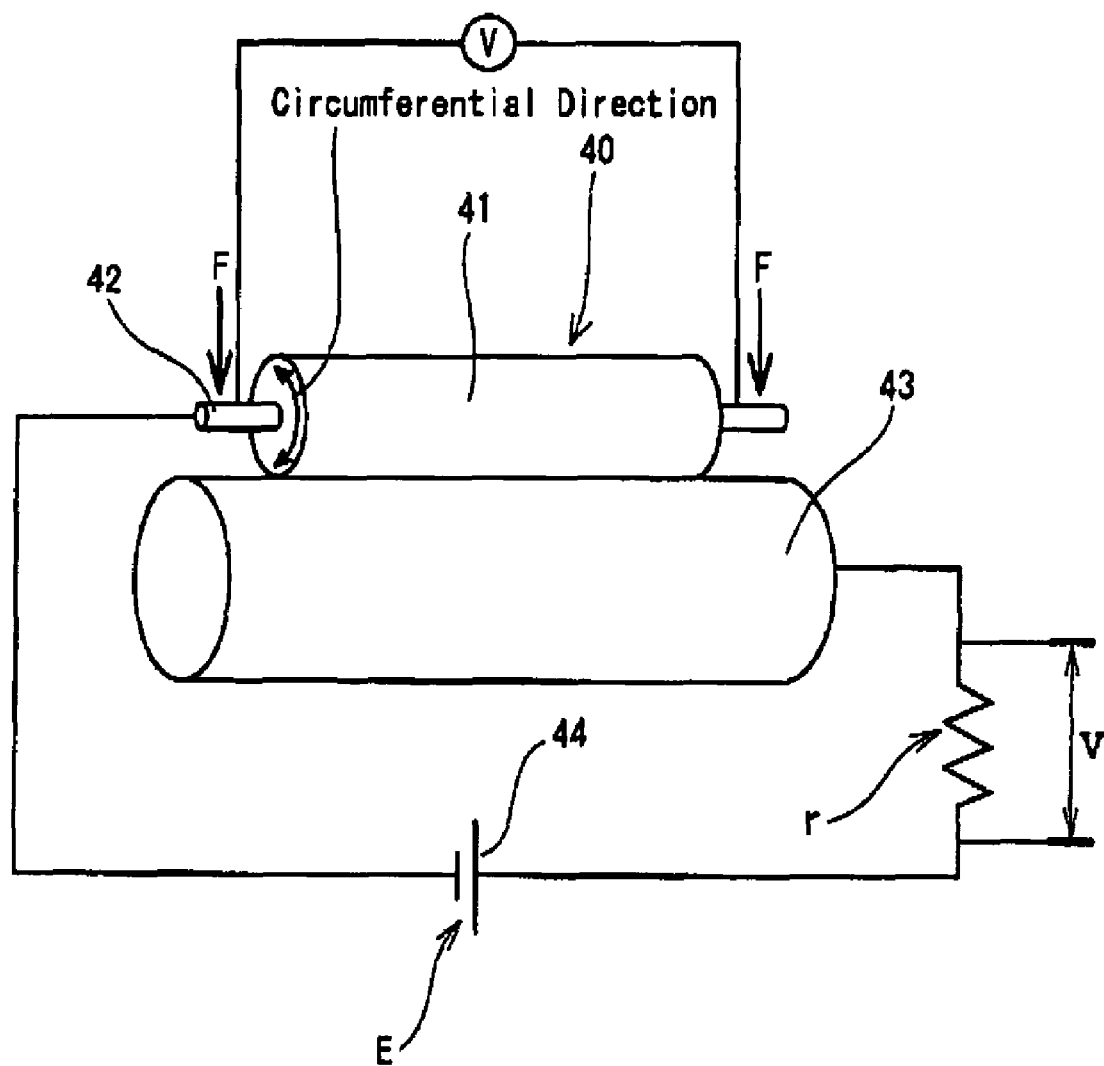
FIG. 4 is a schematic view showing an apparatus for measuring the electrical characteristics of the conductive roller such as its resistance value.

As shown in FIG. 4, at a temperature of 23° C. and a relative humidity of 55%, a conductive elastic layer 41 having a metal shaft 42 inserted therethrough was mounted on an aluminum drum 43, with the conductive elastic layer 41 in contact with the aluminum drum 43. The leading end of a conducting wire having an internal electrical resistance r (100Ω to 10 kΩ) was connected to the positive side of a power source 44 and to one end surface of the aluminum drum 43. The leading end of another conducting wire (with very small electrical resistance) was connected to the negative side of the power source 44 and to one end surface of the metal shaft 42. A load F of 500 gf was applied to both ends of the metal shaft 42. The aluminum drum 43 was rotated to rotate a conductive roller 40, while a voltage of 1000V was applied between the metal shaft 42 and the aluminum drum 43. At this time, the electrical resistance of the conductive roller 40 was measured 36 times circumferentially. The average of the 36 values of electrical resistance was computed. The value of the internal electrical resistance r was adjusted in such a way that the significant digits of measured values were as large as possible in conformity to the level of the electrical resistance of the conductive roller 40. Supposing that a voltage applied to the apparatus shown in FIG. 4 is E, the electrical resistance R of the rubber roller 40 is: $R = r \times E/(V-r)$. Because the term of $(-r)$ is regarded as being slight, $R = r \times E/V$. The electrical resistance value R of the conductive roller 40 was computed from a detected voltage V applied to the internal resistance r. Tables show the average of the electrical resistance values of the conductive roller by common logarithm.

Measurement of Degree of Dependence of Electrical Resistance on Environment

By placing the apparatus shown in FIG. 4 in each measuring environment, the electrical resistance value R(Ω) of each conductive roller was measured by applying a voltage of 1000V thereto at a temperature of 10° C. and a relative humidity of 15% and at a temperature of 32.5° C. and a relative humidity of 90%. The dependence of the electrical resistance on environment was computed by using an equation of $\Delta \log_{10} R = \log_{10} R$(electrical resistance at temperature of 10° C. and relative humidity of 15%) $- \log_{10} R$(electrical resistance at temperature of 32.5° C. and relative humidity of 90%). Tables show the dependence of the electrical resistance on environment in each roller by common logarithm. It is not preferable that this value of $\Delta \log_{10} R$ computed with above equation exceeds 1.7.

Circumferential Nonuniformity of Electrical Resistance

By using the apparatus shown in FIG. 4, a load F of 500 gf was applied to both ends of the metal shaft 42 at a temperature of 23° C. and a relative humidity of 55%. The aluminum drum was rotated at 30 rpm to rotate the conductive roller. While the conductive roller was rotating, a voltage of 1000V was applied between the metal shaft and the aluminum drum to compute circumferential nonuniformity (maximum electrical resistance value in circumferential direction/minimum electrical resistance value in circumferential direction) of the electrical resistance of the conductive roller. The value indicating the circumferential nonuniformity should be in the range of 1.0 to 1.3, more favorably in the range of 1.0 to 1.2, and most favorably in the range of 1.0 to 1.15.

Rise of Resistance of Conductive Roller during Successive Energization

EXAMPLES 1 THROUGH 11 AND COMPARISON EXAMPLES 1 THROUGH 10

At a temperature of 23° C. and a relative humidity of 55% and in the same condition as that of the measurement of electrical resistance of roller, a constant voltage of 1000V was applied to each conductive roller for 96 hours successively. The electrical resistance value R (t=0 hour) immediately after the constant voltage of 1000V was applied to the conductive roller and the electrical resistance value R (t=96 hours) 96 hours after the start time of the voltage application were measured in the same manner as that described above. By using these value, the rise amount of the electrical resistance R (Ω) during successive energization was computed as follows:

$$\Delta \log_{10} R(t=96 \text{ hours}-0 \text{ hour})(\Omega) = \log_{10} R(t=96 \text{ hours}) - \log_{10} R(t=0 \text{ hour}).$$

Tables 1 through 4 show the results. Because the number of rotations of the aluminum drum was 30 rpm and the diameter thereof was 30 mmφ, the linear velocity during its rotation was 94 mm/minute.

Compression Set

Using specimens obtained by cutting the obtained conductive roller at regular intervals of 10 mm parallel with the axial end surface thereof, the compression set of each conductive roller was measured at a temperature of 70° C. for 22 to 24 hours at a compression rate of 25% in accordance with Permanent set testing methods for rubber, vulcanized or thermoplastic specified in JIS K6262. If the value of the compression set exceeds 30%, the dimensional change thereof is so large that it seems difficult to be put into practical use.

Test for Checking Stain of Photosensitive Member

The conductive roller of each of the examples 1 through 11 and comparison examples 1 through 10 was examined by the following method:

Slab sheets of vulcanized rubber were stored for two weeks at 32.5° C. and at a relative humidity of 90%, with the slab sheets pressed against a photosensitive member set in a cartridge (cartridge type C4127X) of a laser beam printer of Laser Jet 4050 type produced by Hewlett-Packard. After each vulcanized rubber slab sheet was removed from the photosensitive member, half-tone printing was carried out by the printer accommodating the photosensitive member. Whether or not printed sheets of paper were stained was checked with the naked eye to make evaluation of the slab sheets by the following three criteria:

○: On printed paper no stain was observed with the naked eye.

Δ: Low degree of stain (After 5 or less sheets of paper were printed, stains on the paper were hardly observed and thus there is no problem in use).

X: High degree of stain (After not less than 5 sheets of paper were printed, stains on the paper could be still recognized with the naked eye)

Regarding the conductive belt of each of the examples 12 through 17 and the comparison examples 11 through 16, a cut piece of the obtained conductive belt, a laser beam printer DocuPrint 180 manufactured by Fuji Xerox Co., Ltd., and a photosensitive member set on a cartridge (commodity code: CT350035) of the printer were used to evaluate the degree of stain of the photosensitive member. The conductive belts with pressed against the photosensitive member were stored at 45° C. and a relative humidity of 80%.

Measurement of Hardness

The hardness of each conductive roller was measured (durometer E hardness) by using the durometer of type E specified JIS K6253 by applying a load of 500 gf to the conductive roller. A load of 1000 gf was applied to a solid roller.

The salt capable of dissociating into cations and anions was distributed to the first uncontinuous phase of the conductive roller of each of the examples 1 through 11. Therefore as shown in tables 1 and 2, the conductive roller of each of the examples 1 through 11 was superior in their electrical characteristics and did not have any problems in migration stain to the photosensitive member. In particular, they had a low degree of independence on environment in the electrical resistance thereof and did not have rise of the electrical resistance during successive energization. The conductive roller with cellular material layer had also a small rise in its electrical resistance during energization and was preferable.

Potassium-bis(trifluoromethanesulfonyl) imide was used as the salt capable of dissociating into cations and anions in the example 8. Because the number of steps of manufacturing the potassium-bis(trifluoromethanesulfonyl) imide is smaller than that of manufacturing the lithium-bis (trifluoromethanesulfonyl) imide, the manufacturing cost can be reduced in the example 8. Further since the potassium cation is heavier than the lithium cation, the rise of the electrical resistance during successive energization could be greatly reduced.

A quaternary ammonium salt was used as the salt capable of dissociating into cations and anions in the example 9. In this case, a sufficient electrical conduction could be obtained, in spite of its heavy cation. Thus the rise of the electrical resistance during successive energization could be reduced.

EMI-TFSI was used as the salt capable of dissociating into cations and anions in the example 10. In this case, it was possible to reduce the rise of the electrical resistance during successive energization and the degree of dependence of the electrical resistance on environment and was excellent.

EMI-BF$_4$ was used as the salt capable of dissociating into cations and anions in the example 11. In this case, a comparatively favorable result could be obtained.

As shown in tables 3 and 4, the salt capable of dissociating into cations and anions was not used in the comparison example 1. Thus the volume specific resistance and the electrical resistance were comparatively large as the transfer roller. Further the conductive roller had a higher degree of dependence on environment than the conductived rollers of the examples 1 through 11.

The salt capable of dissociating into cations and anions was distributed to continuous phase of the comparison example 2, 3, and 7-10. Thus rise of resistance of conductive roller during successive energization was large. In example 4 and 5, there was only one phase which was composed of only one kind of polymer.

The salt capable of dissociating into cations and anions was distributed to the phase. Thus rise of resistance of conductive roller during successive energization was large.

In comparison example 6, EPDM was used as continuous phase. Because EPDM is electrical insulation, volume specific resistance and electrical resistance of roller were high. Circumferential nonuniformity was very large, because of the poor compatibility EPDM and EO-PO-AGE copolymer and the poor affinity between EPDM and the salt.

Figure 5:
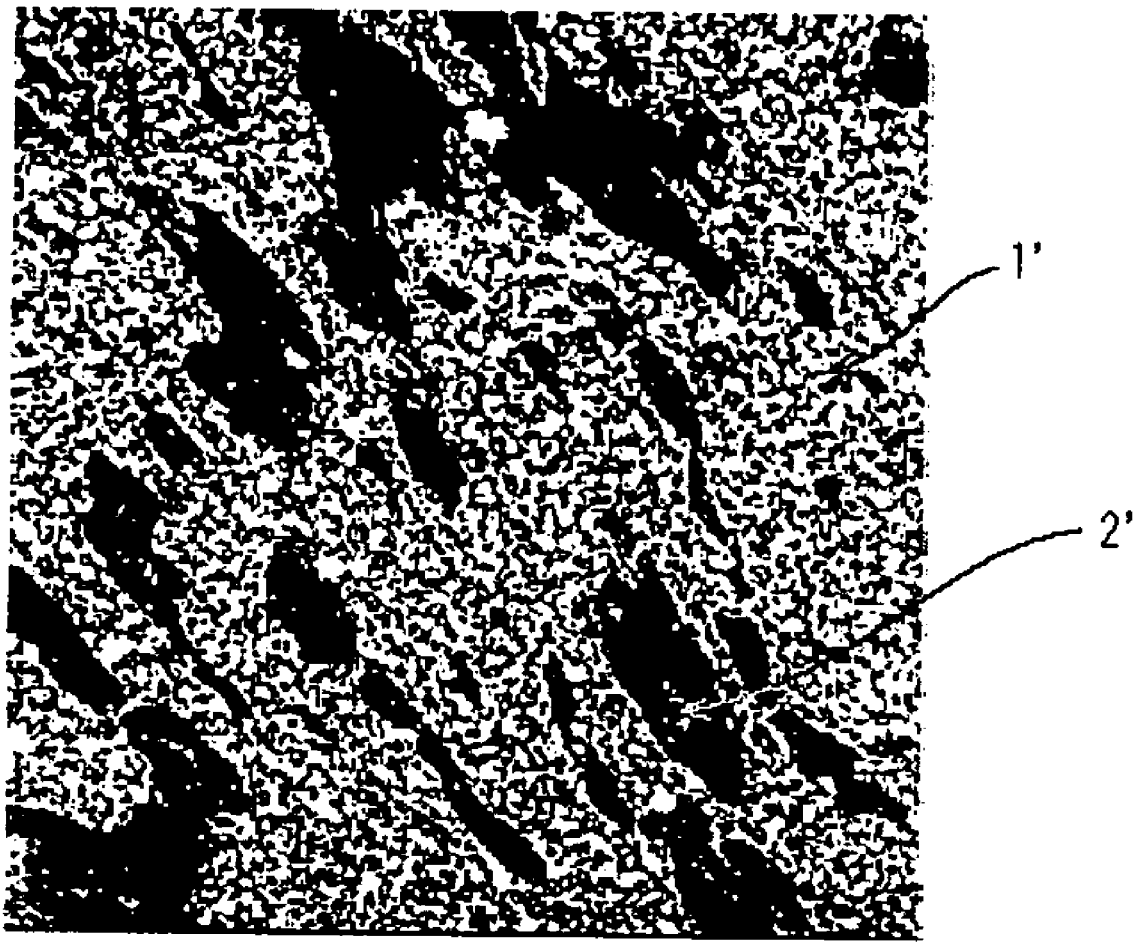
FIG. 5 shows the phase structure (morphology) of a conductive polymer composition forming a conductive member of a comparison example 3.

As described previously, FIG. 3 shows the morphology of the conductive polymer composition of the example 2 observed in the phase mode of the scanning probe microscope (SPM) of the atomic force microscope (AFM) type. FIG. 5 shows the morphology of the conductive polymer composition of the comparison example 3. Length of one side of FIG. 3 and FIG. 5 is 10 μm. The conductive polymer composition of the comparison example 3 had one continuous phase and one uncontinuous phase. The salt capable of dissociating into cations and anions was distributed to the continuous phase.

Figure 6:
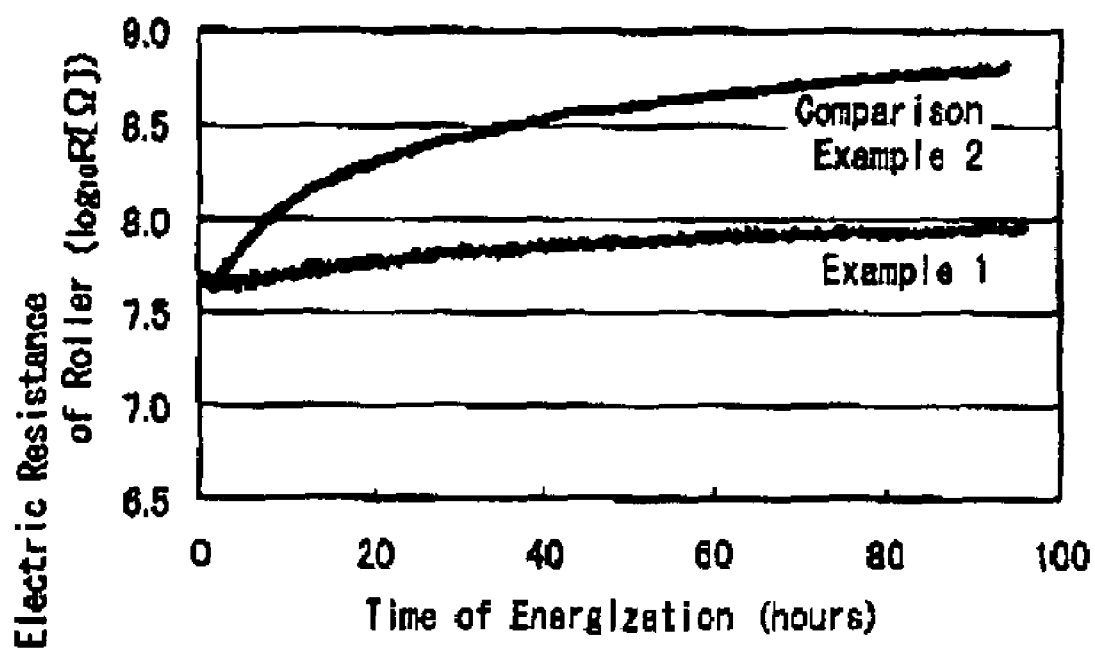
FIG. 6 is a graph showing the change of a resistance of a roller of an example 1 and that a comparison example 2 during successive energization.

FIG. 6 shows the change of the electrical resistance of the roller of the example 1 and the comparison example 2 during successive energization. The abscissa axis is the energization time and the ordinate is the electrical resistance of the roller. As shown in FIG. 6, the electrical resistance rose outstandingly during successive energization in the comparison example 2, whereas the electrical resistance rose slightly in the example 1.

Figure 7:
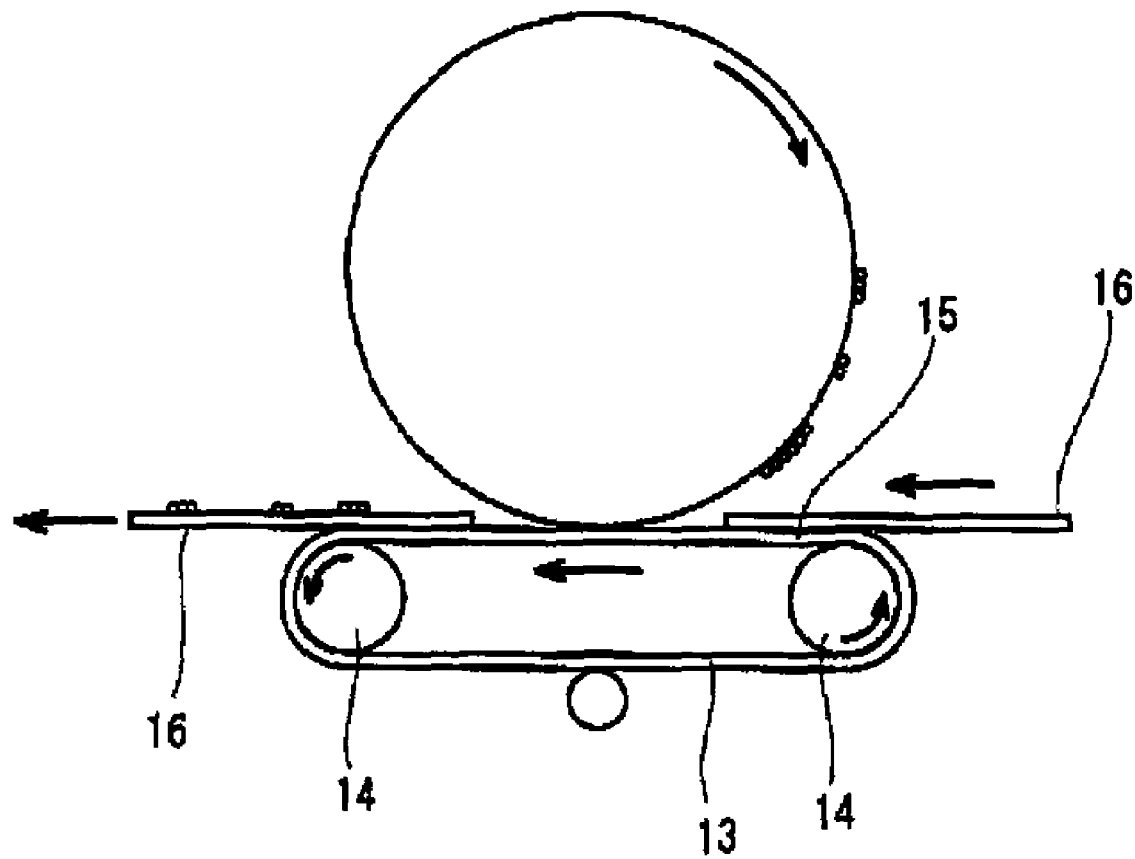
FIG. 7 is a schematic view showing a conductive belt composed of a conductive polymer composition of a second embodiment of the present invention.
Figure 8:
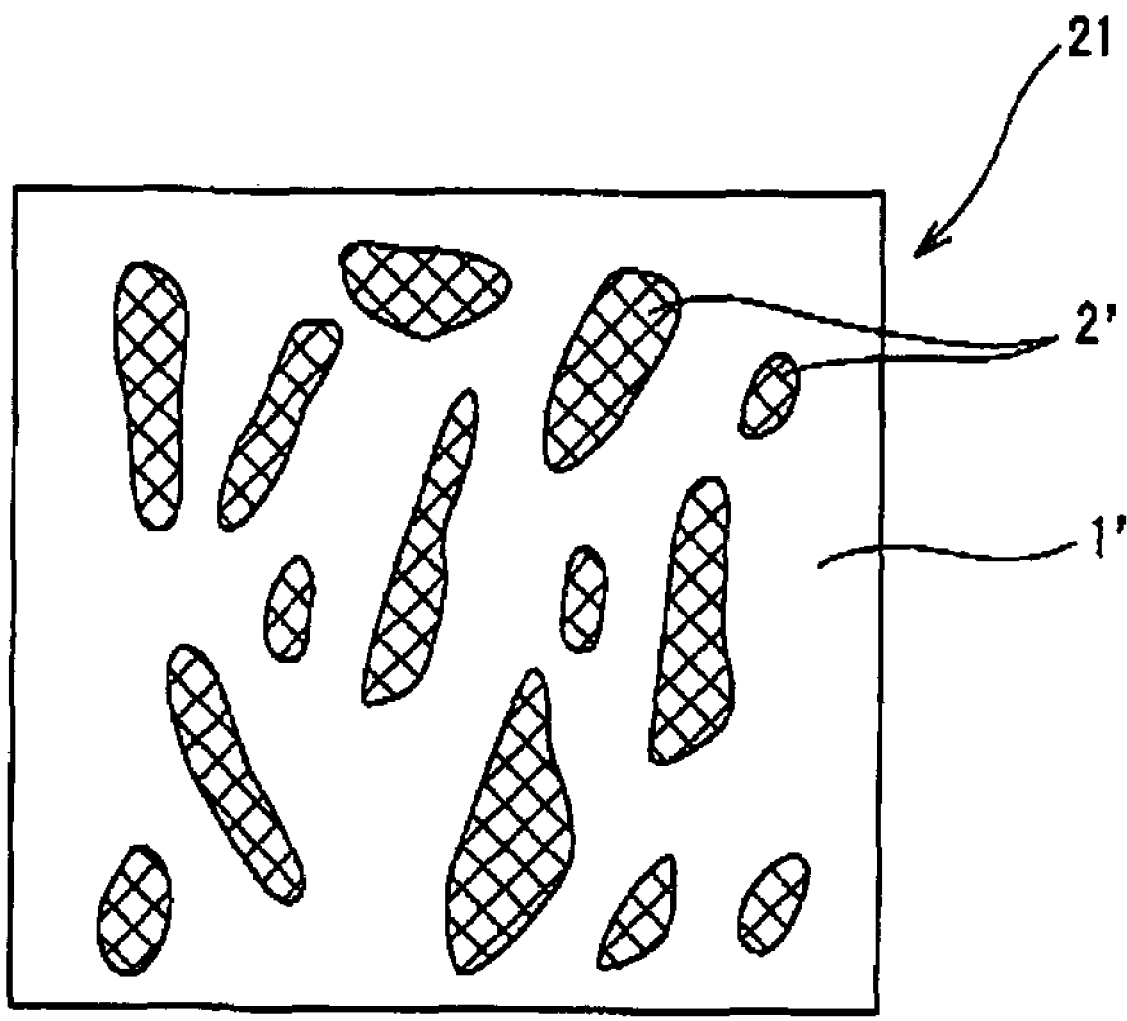
FIG. 8 is an illustrative view showing the structure of the conductive polymer composition of the second embodiment.

FIGS. 7 and 8 show the second embodiment of the present invention. A conductive belt 13 formed of the conductive polymer composition of the present invention is used as a transfer belt.

The conductive belt 13 is tight-stretched by two pulleys 14. The conductive belt 13 serves as a means for delivering a sheet 16 such as paper and a toner image by movably holding it on a straight portion 15 thereof disposed at its upper side. The conductive belt 13 transfers a toner image to paper from a photosensitive member.

Although the mode of the conductive belt 13 is not limited to that described below, it consists of a seamless and belt-shaped conductive layer 21 formed of a conductive polymer composition. As shown in FIG. 8, the conductive layer 21 has one continuous phase 1' and one first uncontinuous phase 2'. The continuous phase 1' and the first uncontinuous phase 2' constitute the sea-island structure.

The salt is distributed only to the first uncontinuous phase 2'. The affinity between the salt and the polymer of the first uncontinuous phase 2' is higher than that between the salt and the polymer of the continuous phase 1'.

As the polymer composing the first uncontinuous phase 2' to which the salt capable of dissociating into cations and anions is distributed, 30 parts by weight of a resin-type antistatic agent containing polyethylene oxide block nylon 12 is used. As the polymer composing the continuous phase 1', 100 parts by weight of a polyester thermoplastic elastomer containing a soft segment consisting of polyether and a hard segment consisting of polyester is used.

Supposing that the volume resistivity of the resin-type antistatic agent composing the first uncontinuous phase is $\rho v_1$ and that of the polyester thermoplastic elastomer composing the continuous phase is $\rho v_2$, $\log_{10}\rho v_1$ is 9.0 and $\log_{10}\rho v_2$ is 13.4. Thus the value of $(\log_{10}\rho v_2 - \log_{10}\rho v_1)$ is 4.4. The ratio between the weight of the polymer composing the first uncontinuous phase 2' and the polymer composing the continuous phase 1' is 23:77.

As the salt capable of dissociating into anions and cations which is added to the polymer component, 1.5 parts by weight of lithium-bis(trifluoromethanesulfonyl) imide which is an anion-containing salt having the fluoro group and the sulfonyl group is used. The salt has a dielectric constant of not less than 4.0 mS/cm, when the dielectric constant is measured at a concentration of a salt of 0.1 mol/liter at 25° C. in a mixed solvent of propylene carbonate (PC) and dimethyl carbonate (DME) (mixing ratio between PC and DME is 1:2 in volume fraction). The salt is added to the polymer component without the intermediary of a medium which consists of a low molecular weight polyether-containing compound whose molecular weight is not more than 10000 or a low molecular weight polar compound whose molecular weight is not more than 10000.

The conductive belt 13 is manufactured by using the following method:

The salt capable of dissociating into anions and cations and the resin-type antistatic agent are dry-blended with a tumbler. Thereafter the mixture is promptly supplied to a biaxial extruder to knead it at 170 to 210° C. for 2 minutes. Thereafter the mixture is cooled to pelletize it. The obtained pellet and a pellet of a polyester thermoplastic elastomer are dry-blended in a manner similar to the above. After the pellets are kneaded at 210° C. to 270° C. for 2 minutes by using the biaxial extruder, the mixture is cooled to form a pellet of the conductive polymer composition. The pellet of the conductive polymer composition is belt-shaped by a extrusion molding apparatus.

The conductive belt 13 has a volume resistivity of $10^{9.6}$ ($\Omega \cdot cm$), when the volume resistivity is measured by applying a voltage of 100V thereto in accordance with the method specified in JIS K6911.

When a volume resistivity $\rho v$ ($\Omega \cdot cm$) of the conductive belt 13 having a thickness of 0.25 mm is measured by applying a constant voltage of 1000V thereto for five hours successively at a temperature of 23° C. and a relative humidity of 55%, $\Delta \log_{10}\rho v = \log_{10}\rho v(t=5 \text{ hours}) - \log_{10}\rho v(t=0 \text{ hour})$ indicating the rise amount of the volume resistivity is 0.36. When a volume resistivity $\rho v$ ($\Omega \cdot cm$) of the conductive belt 13 is measured at a temperature of 10° C. and a relative humidity of 15% and at a temperature of 32.5° C. and a relative humidity of 90%, $\Delta \log_{10}\rho v = \log_{10}\rho v(\text{temperature of } 10° \text{ C. and relative humidity of } 15\%) - \log_{10}\rho v(\text{temperature of } 32.5° \text{ C. and relative humidity of } 90\%)$ indicating a dependence degree of the volume resistivity on environment is 1.4.

The conductive belt 13 has the conductive layer 21 having the first uncontinuous phase 2' to which the salt capable of dissociating into cations and anions is distributed. The conductive polymer composition composing of above conductive layer includes the salt which can decrease electrical resistance with a small amount. Further the polymer for each phase is appropriately selected. Therefore it is possible to prevent the salt from shifting to the outside of the conductive belt 13 and the electrical resistance from rising during successive energization. Furthermore the conductive belt 13 has a low electrical resistance necessary for putting it into practical use. The conductive belt 13 has a proper degree of flexibility in its thickness direction and extends very little longitudinally. Since the conductive polymer composition of the conductive belt of the examples 12 through 17 does not contain chlorine nor bromine, the conductive belt does not pollute environment and can be practically used as a conductive seamless belt.

Although the belt of the second embodiment is used as the transfer belt, it can be used as the intermediate transfer belt, the fixing belt, the developing belt, and the transport belt for use in the image-forming apparatus. It is preferable to use a white belt as the intermediate transfer belt, because if toner attaches thereto, it can be easily observed. Thus the white belt is favorable for evaluating cleaning performance. Thus the transfer belt of the second embodiment can be suitably used as the intermediate transfer belt.

Examples 12 through 17 and the comparison examples 11 through 16 of the conductive belt were formed to measure the properties thereof.

After the components shown in tables 5 through 7 were kneaded by using a tumbler and a biaxial extruder, each mixture was extruded by using an extrusion molding apparatus for thermoplastic resin to obtain a conductive transfer belt of each of the examples 12 through 17 and the comparison examples 11 through 16. The conductive belt had an inner diameter of 168 mm, an average thickness of 0.25 mm, and a width of 350 mm. Tables 5 through 7 show the results of evaluations and evaluations of the belts. Tables 5 through 7 also show the glass transition temperature (Tg (° C.)) of each polymer obtained by measurement conducted by a manner similar to that of the first embodiment.

TABLE 5

| | Tg(° C.) | Detail of components (component name or trade name) | Maker | E12 | E13 | CE11 | CE12 |
|---|---|---|---|---|---|---|---|
| Thermoplastic elastomer | −56 | Pelprene P90BD | Toyobo Co., Ltd. | 100 | 100 | 100 | 100 |
| Salt 1 | | lithium-bis(trifluoromethanesulfonyl)imide | | | | | 0.5 |
| resin-type antistatic agent 1 | −57 | IRGASTAT P16 | Ciba Specialty Chemicals | 30 | | | |
| Salt 1 | | lithium-bis(trifluoromethanesulfonyl)imide | | 1.5 | | | |
| resin-type antistatic agent 2 | −43 | Pelestat NC6321 | Sanyo Chemical Industries | | 30 | | |
| Salt 1 | | lithium-bis(trifluoromethanesulfonyl)imide | | | 1.5 | | |
| Adipate type ion-conductive additive (Salt 1) | | Sankonol 0862-20R | Sanko Chemical Industry | | | | 2.5 (0.5) |
| $\log_{10} \rho v_1$ | | | | 9.0 | 9.1 | — | — |
| $\log_{10} \rho v_2$ | | | | 13.4 | 13.4 | 13.4 | 13.4 |
| $\log_{10} \rho v_3$ | | | | — | — | — | — |
| $\log_{10} \rho v_2 - \log_{10} \rho v_1$ | | | | 4.4 | 4.3 | — | — |
| volume specific resistance (@100 V) | | | | 9.6 | 9.8 | 8.1 | 8.7 |
| dependence of volume specific resistance on environment | | | | 1.4 | 1.6 | 1.1 | 1.8 |
| rise of volume resistivity during successive energization | | | | 0.36 | 0.32 | 1.15 | 0.96 |
| in-plane nonuniformity | | | | 1.03 | 1.04 | 1.04 | 1.03 |
| test for checking stain of photosensitive member | | | | ○ | ○ | x | ○ | where E denotes example and where CE denotes comparison example.

TABLE 6

| | Tg(° C.) | Detail of components (component name or trade name) | Maker | E14 | E15 | E16 | E17 |
|---|---|---|---|---|---|---|---|
| Thermoplastic elastomer | −56 | Pelprene P90BD | Toyobo Co., Ltd. | 100 | 100 | 100 | 100 |
| Salt 1 | | lithium-bis(trifluoromethanesulfonyl)imide | | | | | |
| resin-type antistatic agent 1 | −57 | IRGASTAT P16 | Ciba Specialty Chemicals | 30 | 30 | 30 | 30 |
| Salt 3 | | potassium-bis(trifluoromethanesulfonyl)imide | | 1.5 | | | |
| Salt 4 | | hexyltrimethylammonium-bis(trifluoromethanesulfonyl)imide | Koei Chemical Co., Ltd. | | 1.5 | | |
| Salt 5 | | EMI-TFSI | Stella Chemifa Corporation | | | 1.5 | |
| Salt 6 | | EMI-BF$_4$ | Stella Chemifa Corporation | | | | 1.5 |
| $\log_{10} \rho v_1$ | | | | 9.0 | 9.0 | 9.0 | 9.0 |
| $\log_{10} \rho v_2$ | | | | 13.4 | 13.4 | 13.4 | 13.4 |
| $\log_{10} \rho v_3$ | | | | — | — | — | — |
| $\log_{10} \rho v_2 - \log_{10} \rho v_1$ | | | | 4.4 | 4.4 | 4.4 | 4.4 |
| volume specific resistance (@100 V) | | | | 9.8 | 9.4 | 9.3 | 9.7 |
| dependence of volume specific resistance on environment | | | | 1.1 | 1.5 | 1.1 | 1.6 |
| rise of volume resistivity during successive energization | | | | 0.31 | 0.37 | 0.35 | 0.41 |
| in-plane nonuniformity | | | | 1.03 | 1.04 | 1.03 | 1.04 |
| test for checking stain of photosensitive member | | | | ○ | ○ | ○ | ○ | where E denotes example.

TABLE 7

| | Tg(° C.) | Detail of components (component name or trade name) | Maker | CE13 | CE14 | CE15 | CE16 |
|---|---|---|---|---|---|---|---|
| Thermoplastic elastomer | −56 | Pelprene P90BD | Toyobo Co., Ltd. | 100 | 100 | 100 | 100 |
| Salt 3 | | potassium-bis | | 0.5 | | | |

TABLE 7-continued

| | Tg(° C.) | Detail of components (component name or trade name) | Maker | CE13 | CE14 | CE15 | CE16 |
|---|---|---|---|---|---|---|---|
| Salt 4 | | (trifluoromethanesulfonyl) imide hexyltrimethylammonium-bis (trifluoromethanesulfonyl) imide | Koei Chemical Co., Ltd. | | 0.5 | | |
| Salt 5 | | EMI-TFSI | Stella Chemifa Corporation | | | 0.5 | |
| Salt 6 | | EMI-BF$_4$ | Stella Chemifa Corporation | | | | 0.5 |
| $\log_{10} \rho v_1$ | | | | — | — | — | — |
| $\log_{10} \rho v_2$ | | | | 13.4 | 13.4 | 13.4 | 13.4 |
| $\log_{10} \rho v_3$ | | | | — | — | — | — |
| $\log_{10} \rho v_2 - \log_{10} \rho v_1$ | | | | — | — | — | — |
| volume specific resistance (@100 V) | | | | 8.7 | 8.8 | 8.7 | 8.9 |
| dependence of volume specific resistance on environment | | | | 1.5 | 1.9 | 1.6 | 2.0 |
| rise of volume resistivity during successive energization | | | | 1.1 | 1.2 | 1.2 | 1.2 |
| in-plane nonuniformity | | | | 1.03 | 1.03 | 1.04 | 1.04 |
| test for checking stain of photosensitive member | | | | ○ | x | ○ | ○ | where CE denotes comparison example.

As the polymer composing the uncontinuous phase, a resin-type antistatic agent consisting of polyethylene oxide block nylon 12, having a very high affinity for the salt capable of dissociating into cations and anions, copolymer and a polyether ester amide copolymer was used. The lithium-bis (trifluoromethanesulfonyl) imide capable of dissociating into cations and anions was added to the resin-type antistatic agent. As the continuous phase, a polyester thermoplastic elastomer consisting of a soft segment consisting of polyether and a hard segment consisting of polyester was used. A master batch containing the lithium-bis(trifluoromethanesulfonyl) imide and the resin-type antistatic agent was prepared by setting the concentration of the lithium-bis (trifluoromethanesulfonyl) imide to 5 wt % and was used in order to make the conductive belt. The fact that the volume resistivity $\rho v_2$ of the data of the comparison example 12 and the volume specific resistance of the conductive polymer composition are comparatively low indicates that the thermoplastic elastomer ("pelprene") used in the examples has a certain degree of affinity for the salt to be used in the present invention.

COMPARISON EXAMPLES 11 THROUGH 16

In the comparison example 11, 20 wt % of the lithium-bis (trifluoromethanesulfonyl) imide (salt 1) dissolved in dibutoxyethoxyethyl adipate was added to a polyester thermoplastic elastomer (polyether-polyester block copolymer: "pelprene P90BD"). 2.5 parts by weight of this adipate type ion-conductive additive was used to set the amount of the salt 1 to 0.5 parts by weight.

In the comparison example 12, the lithium-bis (trifluoromethanesulfonyl) imide (salt 1) was directly dispersed in the polyester thermoplastic elastomer without the intermediary of a medium consisting of a low molecular weight polyether-containing compound or a low molecular weight polar compound.

In the comparison examples 13 through 16, similarly to the comparison example 12, the salts 3 through 6 were directly dispersed in the polyester thermoplastic elastomer without the intermediary of the medium consisting of the low molecular weight polyether-containing compound or the low molecular weight polar compound.

A resin-type antistatic agent 1 contained polyethylene oxide block nylon 12 as its main component. A resin-type antistatic agent 2 contained a polyether ester amide copolymer as its main component.

Dependence of Volume Specific Resistance on Environment

The volume resistivity of the conductive belt of each of the examples and comparison examples was measured at a low temperature of 10° C. and a low relative humidity of 15% (environment LL) and at a high temperature of 32.5° C. and a high relative humidity of 90% (environment HH) by applying 100V thereto.

In accordance with the equation of $\Delta \log_{10}\rho v$(LL-HH) ($\Omega \cdot$cm)=$\log_{10}\rho v$(temperature of 10° C. and relative humidity of 15%)–$\log_{10}\rho v$(temperature of 32.5° C. and relative humidity of 90%), the numerical value of the dependence degree of the volume resistivity on environment was computed. Tables 5 through 7 show the results. It is not so preferable that the value exceed 1.7.

The measurement of the volume specific resistance and the test of the stain to the photosensitive member were conducted by the measuring method used for the conductive roller.

Rise of Volume Resistivity During Successive Energization

EXAMPLES 12 THROUGH 17 AND COMPARISON EXAMPLES 11 THROUGH 16

The volume resistivity of each conductive belt was measured at a constant temperature of 23° C. and a constant relative humidity of 55% in the same state as the state in which the volume specific resistance is measured. A constant voltage of 1000V was applied successively for five hours to a point inside the conductive belt having a thickness of 0.25 mm by using the ultrahigh resistance meter R-8240A manufactured by Advantest Corporation. The volume resistivity $\rho v$ (t=0 hour) of the belt immediately after a constant voltage of 1000V is applied to the belt is measured. The volume resistivity $\rho v$ (t=five hours) after the voltage is applied to the belt for five hours successively is also measured. By using the obtained values, the rise amount of the volume resistivity during successive energization was computed in accordance with the following equation:

$$\Delta \log_{10}\rho v(t=5-0 \text{ hour})(\Omega\cdot\text{cm})=\log_{10}\rho v(t=\text{five hours})-\log_{10}\rho v(t=0 \text{ hour}).$$ Tables 5 through 7 show the results.

In-Plane Variation of Conductive Belt

In the measurement of the volume resistivity (volume specific resistance) of the conductive belt, a maximum value of the volume specific resistance of each of 20 points inside the belt (one piece) was divided by a minimum value thereof. Tables 5 through 7 show numerical values obtained by the computation. As shown in tables 5 through 7, the belt of each of the examples and the comparison examples has very little variations and is uniform. On the other hand, a belt whose composition contains carbon black as its conductive component may have 2 to 10 or possibly 100 in the value indicating the variation inside the belt.

As shown in Table 5, the belt of each of the examples 12 and 13 had excellent electrical characteristic and did not have the problem of migration stain to the photosensitive member because the salt capable of dissociating into cations and anions was distributed to the first uncontinuous phase. Especially, each belt had a low degree of dependence of its electrical resistance on environment and a small value in the rise of the electrical resistance during energization.

As shown in table 6, the example 14 was similar to the example 12 in its components except that as the salt capable of dissociating into cations and anions, instead of the lithium-bis(trifluoromethanesulfonyl) imide used as the salt 1 in the example 12, potassium-bis(trifluoromethanesulfonyl) imide (salt 3) was used in the example 14. The belt of the example 14 had a smaller value in the rise of the volume resistivity during successive energization than the example 12, because the cation, namely, the potassium ion of the salt 3 is heavier than the lithium ion of the salt 1. As described above, the salt 3 is less expensive than the salt 1. If the addition amount of the salt 3 contained in the example 14 is equal to that of the salt 1 contained in the example 12, both belts have the almost same level of volume resistivity. Thus the belt of the example 14 can be produced at a cost less expensive than the belt of the example 12. Further the example 14 had a low degree of dependence of its volume specific resistance on environment.

The example 15 was similar to the example 12 in its specification except that as the salt capable of dissociating into cations and anions, instead of the salt 1 used in the example 12, the salt 4 was used in the example 15. The belt of the example 15 had a lower degree of dependence of its volume resistivity on environment, had a smaller value in the rise of its volume resistivity during successive energization, and had more favorable in the stain of the photosensitive member than the belt of the comparison example 14.

The example 16 was similar to the example 12 in its specification except that as the salt capable of dissociating into cations and anions, instead of the salt 1 used in the example 12, the salt 5 was used in the example 16. Though the cation of the salt 5 is heavier than that of the salt 1, the belt of the example 16 had a sufficient electrical conduction similarly to the example 14. Then the belt of the example 16 had a small value in the rise of its volume resistivity during successive energization. Further the volume specific resistance of the belt of the example 16 had a low degree of dependence on environment.

The example 17 was similar to the example 12 in its specification except that as the salt capable of dissociating into cations and anions, instead of the salt 1 used in the example 12, the salt 6 was used in the example 17. The degree of dependence on environment was a little higher than that of the other examples. However, the belt of the example 17 had a smaller value in the rise of the volume resistivity during successive energization than that of comparison example 16.

In the belt of the comparison example 11, there was only one phase in the polymer system. Then the salt capable of dissociating into cations and anions was used in the phase. The salt was dispersed by using a medium consisting of a low molecular weight polar compound. Thus the belt had a large value in the rise of the volume resistivity during successive energization. In the comparison example 14, the belt stained the photosensitive member.

The belt of the comparison example 12 had a large value in the rise of the volume resistivity during successive energization and a high degree of dependence on environment.

Similarly to the comparison example 12, in the belt of each of the comparison examples 13 through 16, there was only one phase in the system. Then the salt capable of dissociating into cations and anions was used in the phase. Thus each belt had a large value in the rise of the volume resistivity during successive energization. In the comparison example 14, the belt stained the photosensitive member.

Figure 9:
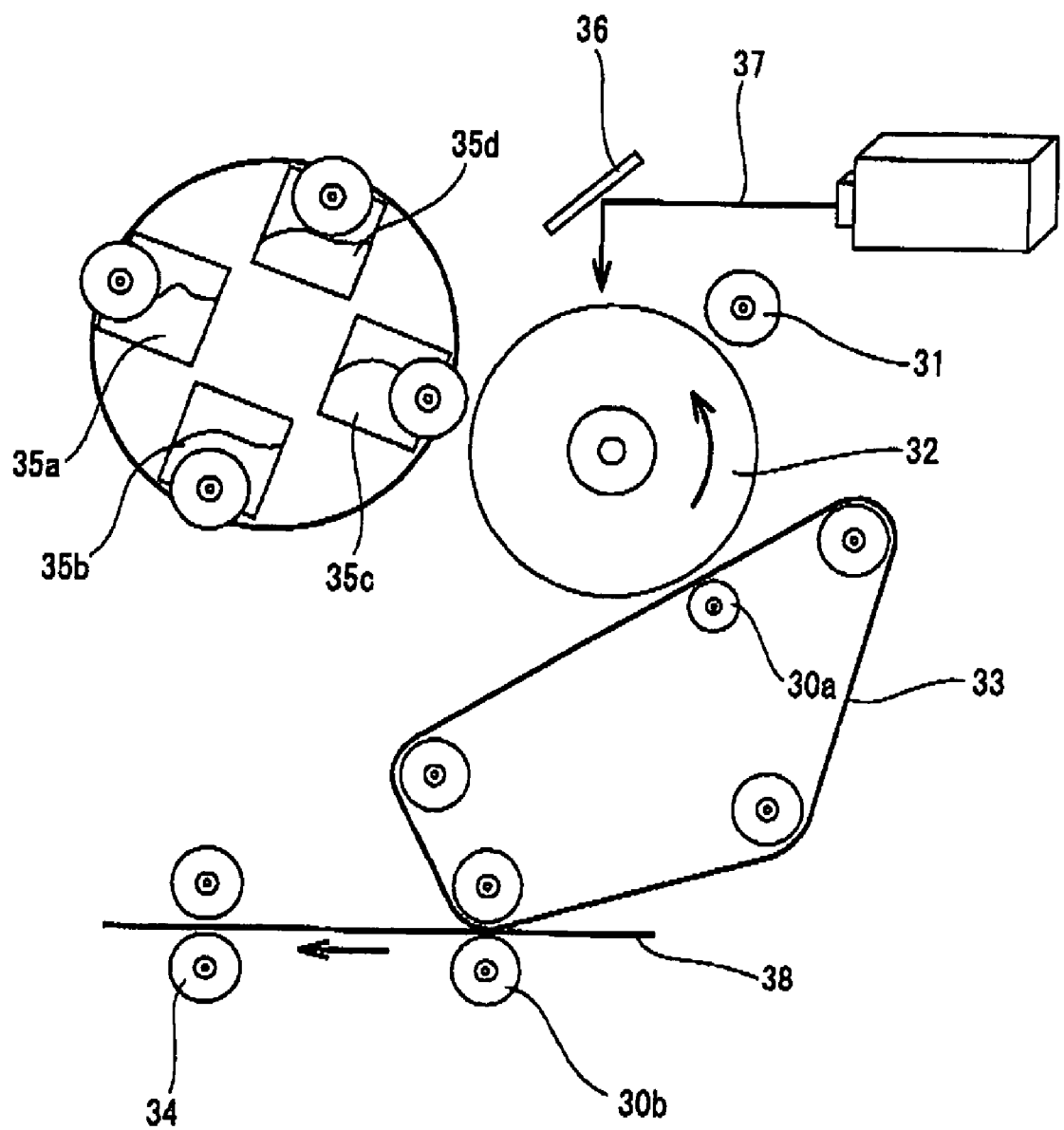
FIG. 9 is an illustrative front view showing a color image-forming apparatus having a flame-retardant belt of a third embodiment of the present invention.

FIG. 9 shows an image-forming apparatus, namely, a color printer having an intermediate transfer roller 33 consisting of a flame-retardant seamless belt of a third embodiment of the present invention. The color printer has transfer rollers 30a and 30b, a charging roller 31, a photosensitive member 32, an intermediate transfer belt 33, a fixing roller 34, toner 35 in four colors (35a, 35b, 35c, and 35d), and a mirror 36.

In forming an image by the color image-forming apparatus, initially, the photosensitive member 32 rotates in the direction shown with the arrow of FIG. 9. After the photosensitive member 32 is charged by the charging roller 31, a laser 37 exposes a non-imaging portion of the photosensitive member 32 via the mirror 36. As a result, the non-imaging portion is destaticized. The portion of the photosensitive member 32 corresponding to an imaging portion is charged. Thereafter the toner 35a is supplied to the photosensitive member 32 and attaches to the charged imaging portion to form a first-color toner image. An electrical field is applied to the primary transfer roller 30a to transfer the toner image to the intermediate transfer belt 33. In the same manner, a toner image of each of the other toners 35b to 35d formed on the photosensitive member 32 is transferred to the intermediate transfer belt 33. A full-color image composed of the four-color toners 35a through 35d is formed on the intermediate transfer belt 33. An electrical field is applied to the secondary transfer roller 30b to transfer the full-color image to a to-be-transferred material (normally, paper) 38. When the to-be-transferred material 38 passes between a pair of the fixing rollers 34 heated to a predetermined temperature, the full-color image is transferred to the surface thereof. In performing double-side printing, the paper 38 or the like that has passed the fixing roller 34 is inverted inside the printer. Then the above-described image-forming processes are repeated. Thereby an image is formed on the rear surface of the paper 38.

In the flame-retardant seamless intermediate transfer belt 33, the conductive polymer composition is composed of a thermoplastic composition containing a polyester thermoplastic elastomer as its main component, 25 wt % of melamine cyanurate for the whole weight of the conductive polymer composition, 1.2 parts by weight of lithium-bis(trifluoromethanesulfonyl) imide which is an anion-containing salt, shown by a chemical formula 1, added to 100 parts by weight of the entire polymer component, and 30 parts by weight of a polyethylene oxide block nylon 12 copolymer (glass transition temperature Tg: −57° C.), having a polyether block, added to 100 parts by weight of the polyester thermoplastic elastomer. The conductive polymer composition had a volume resistivity of $10^{9.6}$ Ω·cm. After the thermoplastic composition is kneaded by using a biaxial extruder, it is shaped by extrusion.

The volume resistivity ρv (Ω·cm) of a sample belt having a thickness of 250 μm is measured by applying a constant voltage of 1000V thereto for five hours successively at a temperature of 23° C. and a relative humidity of 55%. The volume resistivity ρv (t=0 hour) of the sample belt immediately after a constant voltage of 1000V is applied thereto is measured. The volume resistivity ρv (t=five hours) after the voltage is applied thereto for five hours successively is also measured. The relationship between the two measured volume resistivities is as follows: $\Delta \log_{10}\rho v = \log_{10}\rho v(t=5\text{ hours}) - \log_{10}\rho v(t=0 \text{ hour})$ indicating the rise amount of the volume resistivity is 0.36.

The volume resistivity ρv (Ω·cm) of the sample belt is measured at a low temperature of 10° C. and a low relative humidity of 15%. The volume resistivity ρv (Ω·cm) thereof is measured at a high temperature of 32.5° C. and a high relative humidity of 90%. The relationship between the two measured volume resistivities is as follows: $\Delta \log_{10}\rho v = \log_{10}\rho v$ (temperature of 10° C. and relative humidity of 15%)$-\log_{10}\rho v$ (temperature of 32.5° C. and relative humidity of 90%)=1.6.

In the third embodiment, the weight of the copolymer having the polyether block is 19.2 times as large as that of anion-containing salt shown by the chemical formula 1. The lithium-bis(trifluoromethanesulfonyl) imide is dispersed in the copolymer without the intermediary of the medium consisting of a low molecular weight polyether-containing compound or a low molecular weight polar compound whose molecular weight is not more than 10000.

The intermediate transfer belt 33 of the present invention has excellent fire retardance and does not stain the photosensitive member. Further the intermediate transfer belt 33 has a proper degree of flexibility in its thickness direction and extends very little longitudinally. In addition, it pollutes environment very little. Thus it is a superior seamless belt. Further fire retardance is imparted to the intermediate transfer belt 33 without adversely affecting the volume resistivity thereof. Furthermore the intermediate transfer belt 33 has a low degree of in-plane variation in its electrical resistance value, has a low degree of dependence on environment in its volume resistivity, and a small value in its electrical resistance during successive energization. In addition, the intermediate transfer belt 33 has a smooth extruded surface. Accordingly the flame-retardant seamless belt of the present invention can be used for the image-forming apparatus such as a copying apparatus, a facsimile, a printer, and the like without restriction in its use state, even if it is used in environment having a high voltage and a high temperature.

The method of producing the flame-retardant seamless belt that can be used as the intermediate transfer belt is described in detail below.

Initially, a conductive master batch containing a copolymer having the polyether block as its main component and five wt % of the anion-containing salt, shown by the chemical formula 1, added thereto is prepared. Then a flame-retardant master batch containing a polyester thermoplastic elastomer and melamine cyanurate whose amount is equal to that of the polyester thermoplastic elastomer is prepared. The conductive master batch, the flame-retardant master batch, and the polyester thermoplastic elastomer obtained in this manner are supplied in an necessary amount to the biaxial extruder and kneaded to obtain a material consisting of the thermoplastic composition, to be molded into the belt, which contains a specified amount of each component.

The conductive master batch should be kneaded at 200° C. to 270° C. and favorably at 200° C. to 250° C. The kneading time period is favorably 1 to 20 minutes. The flame-retardant master batch should be kneaded at 200° C. to 270° C. and favorably at 200° C. to 250° C. The kneading time period is favorably 1 to 20 minutes.

Figure 10:
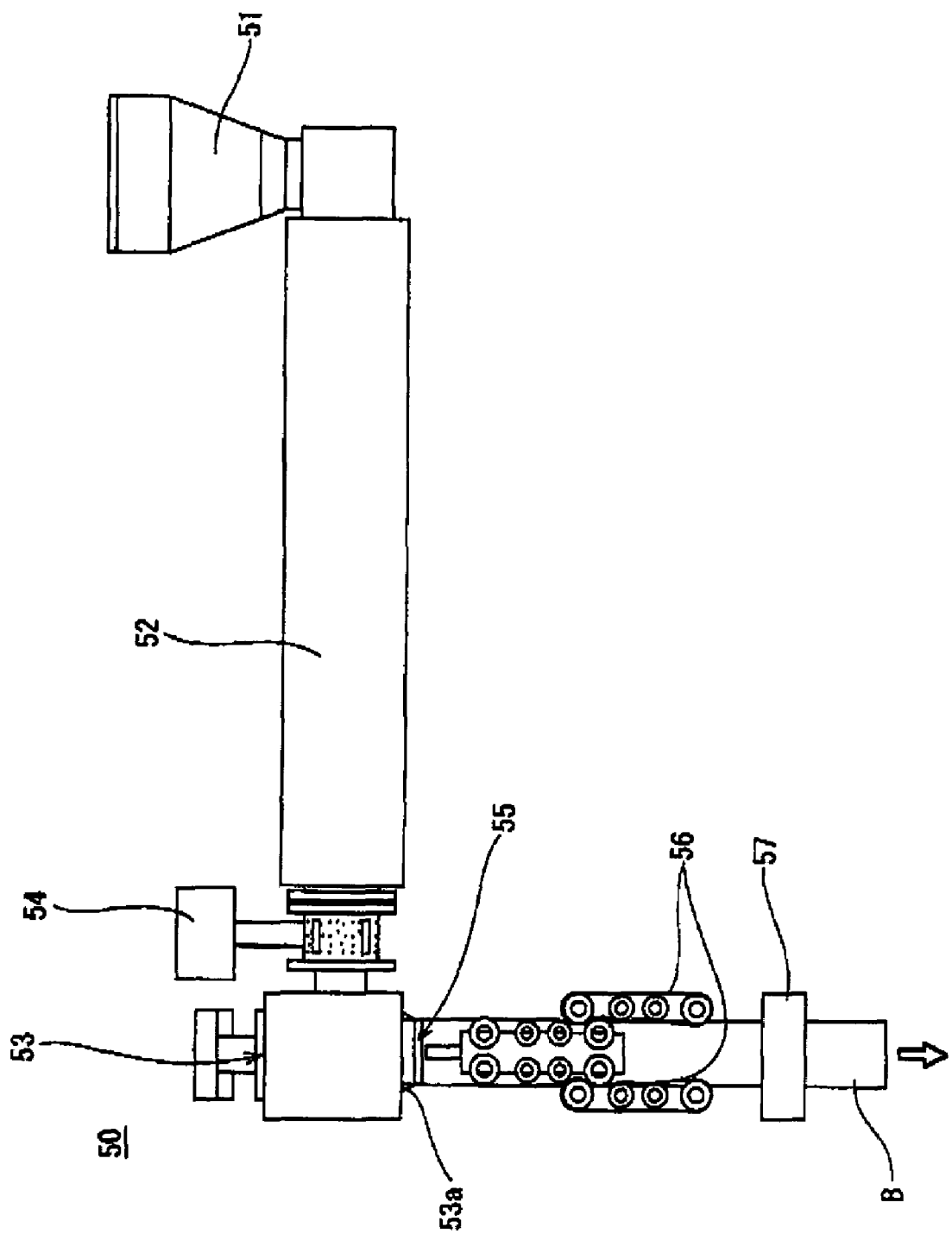
FIG. 10 is schematic view showing an apparatus for manufacturing the flame-retardant belt.

FIG. 10 shows a belt-manufacturing apparatus 50. The belt-manufacturing apparatus 50 has a hopper 51 to which a material is supplied; an extrusion unit 52 for extruding the supplied material in a fused state; a cross head die 53, having an annular construction, whose axis is perpendicular to the axis of the extrusion unit 52; a gear pump 54, disposed between the extruder 52 and the cross head die 53, for adjusting the extrusion amount; an inside sizing unit 55 for shaping an extruded annular material B in the direction from the inner peripheral side thereof; a take-off unit 56 for vertically taking off the shaped annular material B; and an automatic cutting unit 57 for cutting the annular material B continuously shaped to a predetermined length. The cross head die 53 extrudes the fused material vertically downward from a die lip 53a thereof.

The material for the belt is supplied to the hopper 51 and fused at 200° C. to 270° C. and favorably at 200° C. to 250° C. The fused material is fed to the cross head die 53, with the gear pump 54 adjusting the extrusion amount of the material. The fused material is extruded annularly and vertically downward from the die lip 53a of the annular cross head die 53 at an extrusion speed of 133 mL/minute. The annular material B extruded from the die lip 53a is fed downward along the inside sizing unit 55, with the annular material B being cooled to 70° C. to 100° C. to form it into the shape of a belt. The belt-shaped material is fed vertically downward and received by the take-off unit 56. Then the automatic cutting unit 57 cuts the belt-shaped material to a predetermined length. In this manner, the flame-retardant seamless belt is produced.

Although the flame-retardant belt of the third embodiment is used as the intermediate transfer belt, it can be used as the fixing belt, the developing belt, and the transport belt for use in the image-forming apparatus. It is preferable to use a white belt as the intermediate transfer belt, because if toner attaches thereto, it can be easily detected. Thus the white belt is favorable for evaluating cleaning performance. Therefore the flame-retardant belt of the third embodiment can be suitably used as the intermediate transfer belt.

The belt of the third embodiment has only one layer composed of the thermoplastic composition. However, the belt may have at least one coating layer on the peripheral surface on the one layer. The coating layer may consist of two or three layers and can be disposed on the peripheral or/and inner peripheral surface of the seamless belt.

As the polyester thermoplastic elastomer, polyester polyether or polyether polyester can be used. The anion-containing salt is not limited to the above-described salts, provided that the anion-containing salt has the anion shown by the chemical formula 1. The kind of the cation may be altered. The copolymer having the polyether block can be altered appropriately. In addition to the extrusion, injection molding may be adopted. Further the material can be molded without using the master batch.

The examples of the flame-retardant belt of the third embodiment and the comparison examples are described in detail below.

EXAMPLE 18

5 wt % of the lithium-bis(trifluoromethanesulfonyl) imide which is the anion-containing salt shown by the chemical formula 1 was dry-blended with a copolymer ("Irgastat P16" produced by Ciba Specialty Chemicals: polyethylene oxide block nylon 12 copolymer (glass transition temperature Tg: −57° C.) having the polyether block. The mixture was supplied to a hopper, namely, a biaxial extruder to knead it at 210° C. Thereby a conductive master batch was obtained. The temperature of the resin measured at this time was 230° C.

50 wt % of melamine cyanurate (MC640 produced by Nissan Chemical Industries, Ltd.) was dry-blended with a polyester thermoplastic elastomer ("Pelprene P90BD" produced by ToyoBo Co., Ltd.: polyester polyether type (glass transition temperature Tg: −56° C.)). The mixture was supplied to the hopper, namely, the biaxial extruder to knead it at 210° C. Thereby a flame-retardant master batch was obtained. The temperature of the resin measured at this time was 230° C.

A pellet of each of the polyester thermoplastic elastomer, the conductive master batch, and the flame-retardant master batch were dry-blended. In the dry blending, the content of the lithium-bis(trifluoromethanesulfonyl) imide was 1.2 parts by weight for the entire polymer component, namely, for the total of the copolymer having the polyether block and the polyester thermoplastic elastomer. The content of the copolymer having the polyether block was 30 parts by weight for 100 parts by weight of the polyester thermoplastic elastomer. The content of the melamine cyanurate was 25 wt % of the entire weight. The mixture was supplied to the hopper, namely, the biaxial extruder to knead it at 210° C. Thereby the material to be molded into the belt was obtained. The temperature of the resin measured at this time was 230° C.

The material for the belt was supplied to the hopper (51) of the extrusion unit of the belt-manufacturing apparatus shown in FIG. 10. The extrusion unit was operated to fuse the material. The fused material was extruded vertically downward from the annular die having a temperature of 235° C. The annular die has an inner diameter of 185 mm and a gap of 0.5 mm. The fused material was fed along the inside sizing unit having an outer diameter of 170 mm to cool it at 80° C. As a result, the material was formed into a tube by cooling. Then the material was drawn vertically downward at a take-off speed of 1m/minute. Then the material was cut by the automatic cutting unit. As a result, the material had a width of 40 mm. In this manner, the flame-retardant seamless belt is successively obtained. The belt had an inner diameter of 169.5 mm, a thickness of 250 μm, and a width of 400 mm.

The performance of the belt of the example 18 is shown below. Each performance was measured by a method which will be described later.

Volume resistivity: $10^{9.6}$ (Ω·cm)

Rise of resistivity during successive energization: 0.36

In-plane variation: 0.3

Degree of dependence on environment: 1.6

Surface roughness: Rz=1.1 μm

Image formation: favorable

Flame retardance: ○

Measurement of Volume Resistivity and Rise of Volume Resistivity During Successive Energization The volume resistivity of the belt was measured at a constant temperature of 23° C. and a constant relative humidity of 55% by using the ultrahigh resistance meter R-8340 manufactured by Advantest Corporation. The measurement was conducted in accordance with the method of measuring the volume resistivity specified in JIS K 6911. The voltage applied to the belt was 500V.

Regarding the rise of the electrical resistance during successive energization, the volume resistivity ρv (Ω·cm) of a sample belt was measured by applying a voltage of 1000V to the sample belt having a thickness of 250 μm for five hours successively at a temperature of 23° C. and a relative humidity of 55%. The value of an equation $\Delta \log_{10}\rho v = \log_{10}\rho v(t=5 \text{ hours}) - \log_{10}\rho v(t=0 \text{ hour})$ is favorably not more than 0.5.

Figure 11:
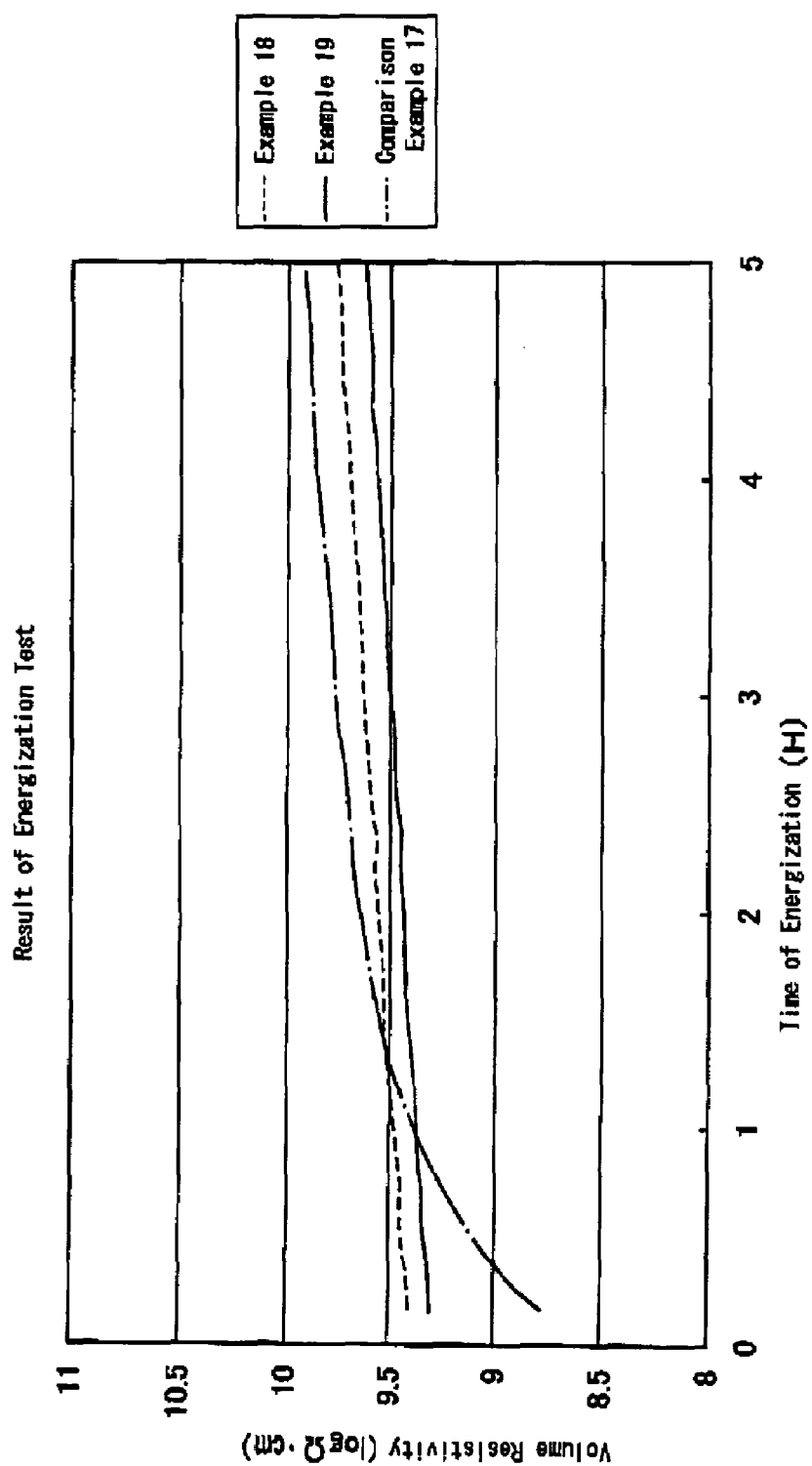
FIG. 11 is a graph showing the change of a volume resistivity of a material for use in examples 18 and 19 and a comparison example 17 with time during successive energization.

FIG. 11 shows the volume resistivity of the belt of each of the examples 18 and 19 and the comparison example 17 with time, when the belt was successively energized.

In-Plane Variation

The volume resistivity (Ω·cm) at 30 points inside each belt was measured. Value of common logarithm of a maximum value of volume resistivities (Ω·cm) at 30 points−value of common logarithm of a minimum value thereof=in-plane variation (measuring environment: 23° C.×55%, measuring method: "Highresta, URS probe, 10 s, 250V). The value of the in-plane variation is preferably not more than 0.5.

Measurement of Degree of Dependence of Electrical Resistance Value on Environment The degree of dependence on environment is evaluated by the difference between the value of common logarithm of the volume resistivity in a condition LL (10° C., relative humidity: 15%) and the value of common logarithm of the volume resistivity in a condition HH (32.5° C., relative humidity: 90%). The value indicating the degree of dependence on environment is favorably not more than 2.5 and more favorably not more than 1.7.

Surface Roughness

Based on JIS B0601, the surface roughness Rz was measured. As the measuring conditions, cut-off value: 0.25 mm, measuring length: 2.0 mm, and a measuring speed: 0.3 mm/s.

Image Formation (Print-Out)

Each belt was mounted on a full-color electrophotographic apparatus (produced by Seiko Epson, "Inter-color LP-8300C) as an intermediate transfer belt thereof to perform print-out. The transfer performance was evaluated.

Flame Retardance

Flame Retardance Test: VTM2

UL-94: Conformed to a burning test of a plastic material. A test of a thin film sample was conducted in accordance with a method "vertical burning test of thin material: VTM-0, VTM-1, VTM-2". The belt that attained the level of VTM-2 was marked by ○, whereas the belt that did not attain it was marked by X.

Measurement of Glass Transition Temperature

The glass transition temperature Tg was measured by using the differential scanning calorimeter DSC2910 manufactured by T.A.Instrument.Japan Inc, with temperature being raised from −100° C. to 100° C. at the rate of 10° C./minute.

EXAMPLE 19

The belt of the example 19 was similar to that of the example 18 in its specification except that the copolymer having the polyether block was altered to a polyether ester amide copolymer ("Perestat NC6321: produced by Sanyo Kasei Kogyo Inc., glass transition temperature Tg: −43° C.). The other specifications were similar to those of the example 18.

Volume resistivity: $10^{9.4}(\Omega\cdot cm)$

Rise of resistance during successive energization: 0.32

In-plane variation: 0.4

Degree of dependence on environment: 2.1

Surface roughness: Rz=1.6 μm

Image formation: favorable

Fire retardance: ○

COMPARISON EXAMPLE 17

A conductive master batch containing polyester thermoplastic elastomer ("Pelprene P90BD" and 10 wt % of lithium-bis(trifluoromethanesulfonyl) dry-blended with the polyester thermoplastic elastomer was used. The copolymer having the polyether block was not used.

The content of the lithium-bis (trifluoromethanesulfonyl) imide was 0.5 parts by weight for 100 parts by weight of the entire polymer component. The other specifications were similar to those of the example 18.

Volume resistivity: $10^{8.7}(\Omega\cdot cm)$

Rise of resistance during successive energization: 1.14

In-plane variation: 0.4

Degree of dependence on environment: 2.0

Surface roughness: Rz=1.6 μm

Image formation: favorable

Fire retardance: ○

As shown in FIG. 11, the volume resistivity of the belt of each of the examples 18 and 19 rose very little when the voltage was applied thereto, which indicates that the belts have stable electrical properties. On the other hand, the volume resistivity of the belt of the comparison example 17 rose rapidly at the initial stage in the successive energization and rose gradually with time. Thus it is necessary to control the volume resistivity minutely when the belt of the comparison example 17 is used for an image-forming apparatus. Therefore the flame-retardant belt of the comparison example 17 cost high.

As described above, it was confirmed that the belt of each of the examples 18 and 19 was evaluated favorably. That is, each belt is a superior flame-retardant seamless belt that can be practically used. On the other hand, the belt of the comparison example 17 had a large value in its volume resistivity because it did not contain the copolymer having the polyether block nor the two-phase structure in which the salt is distributed to the island phase.

What is claimed is:

1. A conductive member, for use in an image-forming apparatus, which includes a conductive roller or a conductive belt, comprising a conductive layer formed of a conductive polymer composition containing an ionic-conductive addition salt capable of dissociating into cations and anions, said conductive layer comprising a continuous polymer phase and a discontinuous polymer phase which comprises a first discontinuous polymer phase and a second discontinuous polymer phase;

said continuous polymer phase and said discontinuous polymer phase forming a sea-island structure;

the polymer composing said first discontinuous polymer phase having a higher degree of affinity for said salt capable of dissociating into cations and anions than the polymer composing said continuous polymer phase;

wherein said salt capable of dissociating into cations and anions is preferentially distributed in said first discontinuous polymer phase, and is only minimally distributed in said second discontinuous polymer phase and said continuous polymer phase;

wherein an affinity between said salt and said polymer composing said first discontinuous polymer phase is higher than an affinity between said salt and said polymer composing said continuous polymer phase, and said affinity between said salt and said polymer composing said continuous polymer phase is higher than an affinity between said salt and said polymer composing said second discontinuous polymer phase;

wherein a volume resistivity or electrical resistance of said first discontinuous polymer phase is lower than an electrical resistance or volume resistivity of said continuous polymer phase, and said electrical resistance of said continuous polymer phase is lower than an electrical resistance of said second discontinuous polymer phase; and wherein said conductive layer has a volume resistivity not less than $10^4$ Ω·cm nor more than $10^{12}$ Ω·cm, when said volume resistivity is measured at a voltage of 100V applied to said conductive polymer composition in accordance with the method specified in JIS K6911.

2. The conductive member according to claim 1, wherein a volume resistivity of said first discontinuous polymer phase in which said salt capable of dissociating into cations and anions is preferentially distributed is $\rho v_1$ and said continuous polymer phase is $\rho v_2$, and $\rho v_1$ and $\rho v_2$ relate as follows:

$$0.2 < \log_{10}\rho v_2 - \log_{10}\rho v_1 \leq 5.$$

3. The conductive member according to claim 1, wherein a weight ratio of said discontinuous polymer phase to said continuous polymer phase is 5:95 to 75:25.

4. The conductive member according to claim 1, wherein said salt capable of dissociating into cations and anions has an electrical conductivity of not less than 2.3 mS/cm, when said electrical conductivity is measured at a concentration of a salt of 0.1 mol/liter at 25° C. in a mixed solvent of propylene carbonate and dimethyl carbonate, wherein a ratio between propylene carbonate and dimethyl carbonate is 1:2 in volume fraction.

5. The conductive member according to claim 1, wherein said salt capable of dissociating into cations and anions is a lithium salt, a potassium salt, a quaternary ammonium salt or an imidazolium salt.

6. The conductive member according to claim 1, wherein said conductive polymer composition is a vulcanized or a thermoplastic elastomer composition.

7. The conductive member according to claim 1, wherein each of polymers in said continuous polymer phase and said discontinuous polymer phase has a glass transition temperature Tg not more than −40° C.

8. The conductive member according to claim 1, wherein said continuous polymer phase contains low nitrile acrylonitrile-butadiene rubber; said first discontinuous polymer phase contains polyether polymer; and said second discontinuous phase contains ethylene-propylene-diene copolymer; and said salt is preferentially distributed in said polyether polymer of said first discontinuous polymer phase.

9. The conductive member according to claim 8, wherein said polyether polymer comprises a copolymer of ethylene oxide-propylene oxide-allyl glycidyl ether.

10. The conductive member according to claim 1, wherein said continuous polymer phase contains low nitrile acrylonitrile-butadiene rubber; said first discontinuous polymer phase contains polyether polymer; and said second discontinuous polymer phase contains ethylene-propylene-diene copolymer; and a volume fraction of said continuous phase is higher than a volume fraction of said second discontinuous polymer phase; and said volume fraction of said second discontinuous polymer phase is higher than a volume fraction of said first discontinuous polymer phase.

11. The conductive member, according to claim 10, comprising 50 wt % to 90 wt % of said low-nitrile acrylonitrile-butadiene rubber; 10 wt % to 40 wt % of said ethylene-propylene-diene copolymer; 0.5 wt % to 25 wt % of said polyether polymer; and 0.1 wt % to 2 wt % of said salt.

12. The conductive member according to claim 1, wherein said conductive polymer composition has a compression set not more than 30%, when said compression set is measured at a temperature of 70° C. for 22 hours to 24 hours at a compression rate of 25% in accordance with permanent set testing methods for rubber, vulcanized or thermoplastic specified in JIS K6262.

13. The conductive member according to claim 1, wherein the conductive layer comprises a roller having said conductive layer or a belt having said conductive layer.

14. The conductive member according to claim 1, wherein the conductive member comprises a conductive roller having an electric resistance R in Ω measured by applying a constant voltage of 1000V thereto for 96 hours successively at a temperature of 23° C. and a relative humidity of 55%, wherein Δ log $_{10}$R=log$_{10}$R(t=96 hours)−log$_{10}$R(t=0 hour) indicating a rise amount of said electrical resistance R in Ω is not more than 0.5.

15. The conductive member consisting of a conductive roller according to claim 1, wherein when an electrical resistance R in Ω of said conductive roller is measured at a temperature of 10° C. and a relative humidity of 15% and at a temperature of 32.5° C. and a relative humidity of 90%, wherein Δ log$_{10}$R=log$_{10}$R(temperature of 10° C. and relative humidity of 15%)−log$_{10}$R(temperature of 32.5° C. and relative humidity of 90%) indicating a dependence degree of said electrical resistance on environment is not more than 1.7.

16. The conductive member according to claim 1, wherein said conductive layer is a conductive roller or a conductive belt formed as a cellular material layer having an expansion ratio of not less than 100% nor more than 500% and a hardness of not more than 60 degrees, when said hardness is measured by the durometer of type E specified in JIS K6253.

17. The conductive member according to claim 1, wherein the conductive member is a conductive belt having a volume resistivity ρv in Ω·cm of a sample of said conductive belt that is measured by applying a constant voltage of 1000V to said sample having a thickness of 0.25 mm for five hours successively at a temperature of 23° C. and a relative humidity of 55%, Δ log$_{10}$ρv=log$_{10}$ρv(t=5 hours)−log$_{10}$ρv(t=0 hour) indicating a rise amount of said volume resistivity is not more than 0.5.

18. The conductive member according to claim 1, wherein the conductive member is a conductive belt having a volume resistivity ρv in Ω·cm of said conductive belt is measured at a temperature of 10° C. and a relative humidity of 15% and at a temperature of 32.5° C. and a relative humidity of 90%, Δ log$_{10}$ρv=log$_{10}$ρv(temperature of 10° C. and relative humidity of 15%)−log$_{10}$ρv(temperature of 32.5° C. and relative humidity of 90%) indicating a dependence degree of said volume resistivity on environment is not more than 1.7.

19. The conductive member according to, claim 1, wherein the conductive member is a flame retardant seamless belt having said conductive polymer composition that comprises 50 to 95 parts by weight of a polyester thermoplastic elastomer added to 100 parts by weight of an entire polymer component; 15 wt % to 40 wt % of melamine cyanurate serving as a flame-retardant additive added to 100 wt % of said conductive polymer composition; 0.01 parts by weight to 3 parts by weight of said salt, which can dissociate into cations and at least an anion shown by a chemical formula 1, added to 100 parts by weight of said entire polymer component; and not less than 5 parts by weight nor more than 50 parts by weight of a copolymer, having a polyether block, added to 100 parts by weight of said polyester thermoplastic elastomer; and said conductive polymer composition has a volume resistivity of not less than $1.0 \times 10^6$ Ω·cm nor more than $1.0 \times 10^{12}$ Ω·cm

Chemical Formula 1 where $X_1$ and $X_2$ denote functional group which contains C, F—, and —SO$_2$— and in which the number of carbon atoms is one to eight.

20. The conductive member according to claim 19, wherein a volume resistivity of said belt measured immediately after a constant voltage of 1000V is applied to a sample of said belt having a thickness of 250 μm at a temperature of 23° C. and a relative humidity of 55% is ρv at t=0 hour and that a volume resistivity measured after said voltage is applied to said sample for five hours successively is ρv at t=five hours, and the ρv at t=five hours and the ρv at t=0 hour relate as follows:

$$\log_{10}\rho v(t=5 \text{ hours})-\log_{10}\rho v(t=0 \text{ hour}) \leq 0.5.$$

21. The conductive member according to claim 19, wherein a glass transition temperature Tg of said copolymer having said polyether block is not more than −40° C.; and a weight of said copolymer, having said polyether block, contained in a material of said belt is 1.6 to 3333 times as large as that of said salt, which can dissociate into cations and at least an anion shown by said chemical formula 1.

22. The conductive member according to claim 19, wherein said $X_1$— of said chemical formula 1 is $C_{n1}H_{m1}F_{(2n1-m1+1)}$—SO$_2$—, and $X_2$— of said chemical formula 1 is $C_{n2}H_{m2}F_{(2n2-m2+1)}$—SO$_2$— where $n_1$ and $n_2$ are integers not less than 1, and m1 and m2 are integers not less than 0; and a cation making a pair with said anion, shown by said chemical formula 1, which constitutes said salt is a cation of any one of alkali metals including lithium, group 2A metals, and transition metals, and amphoteric metals.

23. The conductive member according to claim 19, wherein when a volume resistivity of said conductive member is measured at a temperature of 10° C. and a relative humidity of 15% and at a temperature of 32.5° C. and a relative humidity of 90%, and the volume resistivities relate as follows:

$\log_{10}\rho v$(temperature of 10° C. and relative humidity of 15%)$-\log_{10}\rho v$(temperature of 32.5° C. and relative humidity of 90%)$\leq 2.5$, where $\rho v$ is the volume resistivity.

24. The conductive member according to claim 19, having at least one layer formed on a peripheral surface thereof.

25. A method of manufacturing a belt, comprising the steps of:

fusing and kneading, by an extruder, a conductive master batch containing a copolymer having a polyether block and 1 to 20 wt % of said an anion-containing salt shown by a chemical formula 1, a flame-retardant additive, and a thermoplastic composition containing not less than 50 wt % of a polyester thermoplastic elastomer to form a mixture; and extruding said mixture from an annular die and molding said mixture into a shape of a seamless belt by using a sizing die

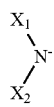

Chemical Formula 1 where $X_1$ and $X_2$ denote functional group which contains C, F—, and —SO$_2$— and in which the number of carbon atoms is one to eight, wherein the belt is the conductive member according to claim 19.

26. The method of manufacturing a belt according to claim 25, wherein said flame-retardant additive and thermoplastic composition containing said polyester thermoplastic elastomer are kneaded and supplied to said extruder as a flame-retardant master batch; and said mixture of said conductive master batch and said flame-retardant master batch and other components are extruded vertically from said annular die.

27. The conductive member according to claim 1, wherein said salt capable of dissociating into cations and anions has an electrical conductivity of not less than 3.5 mS/cm when said electric conductivity is measured at a concentration of a salt of 0.1 mol/liter at 25° C. in a mixed solvent of propylene carbonate and dimethyl carbonate, wherein a ratio between propylene carbonate and dimethyl carbonate is 1:2 in volume fraction.

28. The conductive member according to claim 1, wherein said conductive polymer composition is not given conductivity by an electroconductive filler, such that a circumferential nonuniformity or in-plane nonuniformity of the electrical resistance of the conductive member is from 1.0 to 1.15.

29. The conductive member according to claim 1, wherein said volume resistivity of said first discontinuous polymer phase in which said salt capable of dissociating into cations and anions is preferentially distributed is $\rho v_1$ and said continuous polymer phase is $\rho v_2$, and $\rho v_1$ and $\rho v_2$ relate as follows:

$$0.2 < \log_{10}\rho v_2 - \log_{10}\rho v_1 \leq 5;$$

wherein a weight ratio of said discontinuous polymer phase to said continuous polymer phase is 5:95 to 75:25;

wherein said salt capabiel of dissociating into cations and anions has an electrical conductivity of not less than 2.3 mS/cm, when said electrical conductivity is measured at a concentration of a salt of 0.1 mol/liter at 25° C. in a mixed solvent of propylene carbonate and dimethyl carbonate, wherein a ratio between propylene carbonate and dimethyl carbonate is 1:2 in volume fraction.

30. An image-forming apparatus comprising the conductive member according to claim 1.

31. A method of manufacturing the conductive member according to claim 1, comprising the steps of:

kneading or blending said salt capable of dissociating into cations and anions uniformly with said polymer comprising said first discontinuous polymer phase in which said salt capable of dissociating into cations and anions is preferentially distributed to form a compound or a mixture of said salt and said polymer;

adding said polymer comprising said continuous polymer phase and said polymer composing said second discontinuous polymer phase to said compound or said mixture; and kneading a mixture of said all components to form a conductive polymer composition; and molding or forming said conductive polymer composition by heating said conductive polymer composition into whole or a part of said conductive member for use in said image-forming apparatus.

* * * * *